US011279227B2

(12) United States Patent
Gaither et al.

(10) Patent No.: US 11,279,227 B2
(45) Date of Patent: Mar. 22, 2022

(54) ROTATABLE DRIVE AXLE ASSEMBLY FOR AN ELECTRIC VEHICLE

(71) Applicant: Toyota Motor Engineering & Manufacturing North America, Inc., Plano, TX (US)

(72) Inventors: Geoffrey David Gaither, Brighton, MI (US); Robert C. MacArthur, Ypsilanti, MI (US); Justin J. Chow, Los Angeles, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 166 days.

(21) Appl. No.: 16/591,829

(22) Filed: Oct. 3, 2019

(65) Prior Publication Data

US 2021/0101477 A1 Apr. 8, 2021

(51) Int. Cl.
*B60K 17/02* (2006.01)
*B60K 11/08* (2006.01)
(Continued)

(52) U.S. Cl.
CPC ............... *B60K 17/02* (2013.01); *B60K 1/02* (2013.01); *B60K 11/085* (2013.01); *B60K 17/20* (2013.01);
(Continued)

(58) Field of Classification Search
CPC ...... B60K 17/02; B60K 11/085; B60K 17/20; B60K 17/346; B60K 17/356; B60K 1/02; B60K 2001/006; B60K 6/36; B60K 6/26; B60K 6/383; B60K 6/52; B60K 6/46; B60K 2006/4808; B60K 6/48; B60K 6/387; B60K 17/16; B60K 17/165; B60K 11/06; B60K 2001/001; B60K 1/00; F16D 41/00;
(Continued)

(56) References Cited

U.S. PATENT DOCUMENTS 1,543,044 A 6/1925 Anglada
5,356,337 A 10/1994 Dauvergne
(Continued)

FOREIGN PATENT DOCUMENTS

FR 3021257 A1 11/2015
WO 199709192 3/1997
(Continued)

*Primary Examiner* — David J Hlavka
(74) *Attorney, Agent, or Firm* — Christopher G. Darrow; Darrow Mustafa PC

(57) ABSTRACT

A rotatable drive axle assembly for an electric vehicle comprises a rotatable vehicle drive axle configured to be disposed along a transverse axis of an electric vehicle and having an axle end that is configured for attachment to a drive wheel. The rotatable drive axle assembly also comprises a selectively movable differential configured to be disposed on the rotatable vehicle drive axle and configured to operatively couple motive power of a selectively movable electric propulsion motor comprising a rotatable motor shaft rotatable about a motor axis to the rotatable vehicle drive axle and the drive wheel, the selectively movable electric propulsion motor and the motor axis configured to be oriented in a substantially vertical direction and movable with reference to the rotatable vehicle drive axle.

20 Claims, 25 Drawing Sheets

(51) Int. Cl.
*B60K 17/16* (2006.01)
*B60K 17/346* (2006.01)
*B60K 17/356* (2006.01)
*F16D 41/00* (2006.01)
*B60K 1/02* (2006.01)
*B60K 1/00* (2006.01)
*B60L 50/51* (2019.01)
*B60L 50/52* (2019.01)
*B60L 50/60* (2019.01)
*B60K 6/36* (2007.10)
*B60K 6/26* (2007.10)
*B60K 6/383* (2007.10)
*B60K 6/52* (2007.10)

(52) U.S. Cl.
CPC .......... *B60K 17/346* (2013.01); *B60K 17/356* (2013.01); *F16D 41/00* (2013.01); *B60K 6/26* (2013.01); *B60K 6/36* (2013.01); *B60K 6/383* (2013.01); *B60K 6/52* (2013.01); *B60K 2001/006* (2013.01); *B60L 50/51* (2019.02); *B60L 50/52* (2019.02); *B60L 50/60* (2019.02); *B60Y 2200/91* (2013.01); *B60Y 2200/92* (2013.01); *B60Y 2400/82* (2013.01)

(58) Field of Classification Search
CPC .......... B60L 50/51; B60L 50/52; B60L 50/60; B60Y 2200/91
See application file for complete search history.

(56) References Cited

U.S. PATENT DOCUMENTS

| | | |
|---|---|---|
| 6,276,474 B1 | 8/2001 | Ruppert et al. |
| 7,134,517 B1 | 11/2006 | Kaiser et al. |
| 7,854,674 B2 | 12/2010 | Freudenreich |
| 7,870,918 B2 | 1/2011 | Muller et al. |
| 8,858,379 B2 | 10/2014 | Keeney et al. |
| 9,212,599 B2 | 12/2015 | Gao et al. |
| 9,317,039 B2 | 4/2016 | Araki et al. |
| 9,533,672 B2 | 1/2017 | Christ |
| 9,550,406 B2 | 1/2017 | Chen et al. |
| 9,604,533 B2 | 3/2017 | Itoh |
| 9,616,743 B1 | 4/2017 | Mays et al. |
| 9,914,348 B2 * | 3/2018 | Koval .................. B60K 7/0007 |
| 10,017,047 B2 | 7/2018 | Dudar |
| 10,396,631 B2 * | 8/2019 | Herb ....................... H02K 5/20 |
| 2001/0011611 A1 * | 8/2001 | Poerschmann ...... B60K 7/0007 |
| | | 180/65.1 |
| 2002/0110452 A1 | 8/2002 | Jurado et al. |
| 2003/0116313 A1 | 6/2003 | O'Donnell |
| 2003/0226653 A1 | 12/2003 | Takedomi et al. |
| 2006/0173590 A1 | 8/2006 | Zillmer et al. |
| 2008/0190677 A1 * | 8/2008 | Muller .................. B60G 15/07 |
| | | 180/65.51 |
| 2010/0025131 A1 | 2/2010 | Gloceri et al. |
| 2010/0155168 A1 * | 6/2010 | Mies ...................... B60G 7/001 |
| | | 180/300 |
| 2011/0204149 A1 | 8/2011 | Prior |
| 2012/0049664 A1 | 3/2012 | Yokoyama et al. |
| 2013/0178320 A1 | 7/2013 | Suzuki et al. |
| 2015/0060160 A1 | 3/2015 | Kerschl et al. |
| 2016/0311310 A1 | 10/2016 | Muenst |
| 2017/0253144 A1 | 9/2017 | Arima et al. |
| 2018/0339583 A1 | 11/2018 | Hirai |
| 2019/0009679 A1 | 1/2019 | Gaither et al. |

FOREIGN PATENT DOCUMENTS

| | | |
|---|---|---|
| WO | 2010046905 A1 | 4/2010 |
| WO | 2011118266 A1 | 9/2011 |
| WO | 2016063515 A1 | 4/2016 |
| WO | 2018163765 A1 | 9/2018 |

* cited by examiner

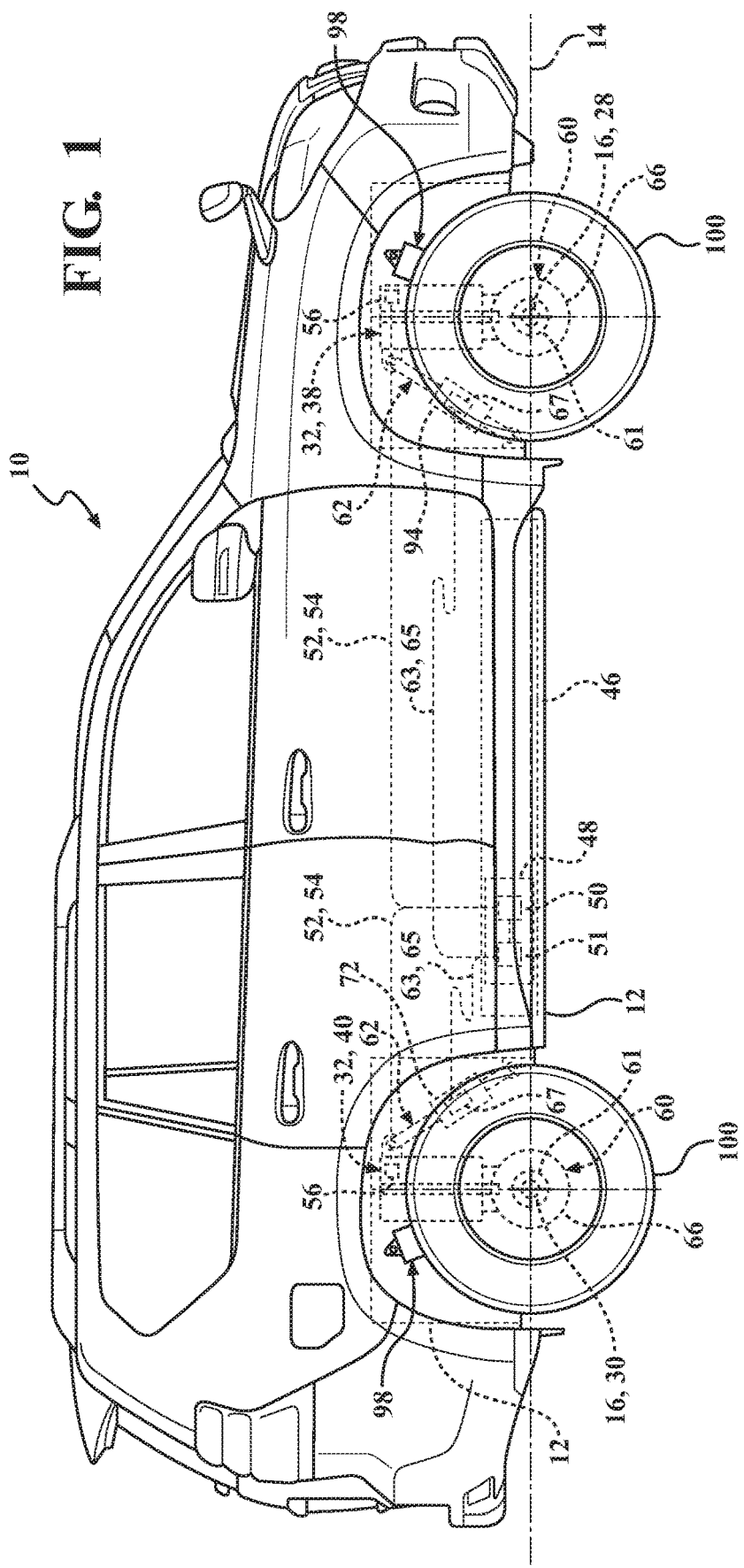

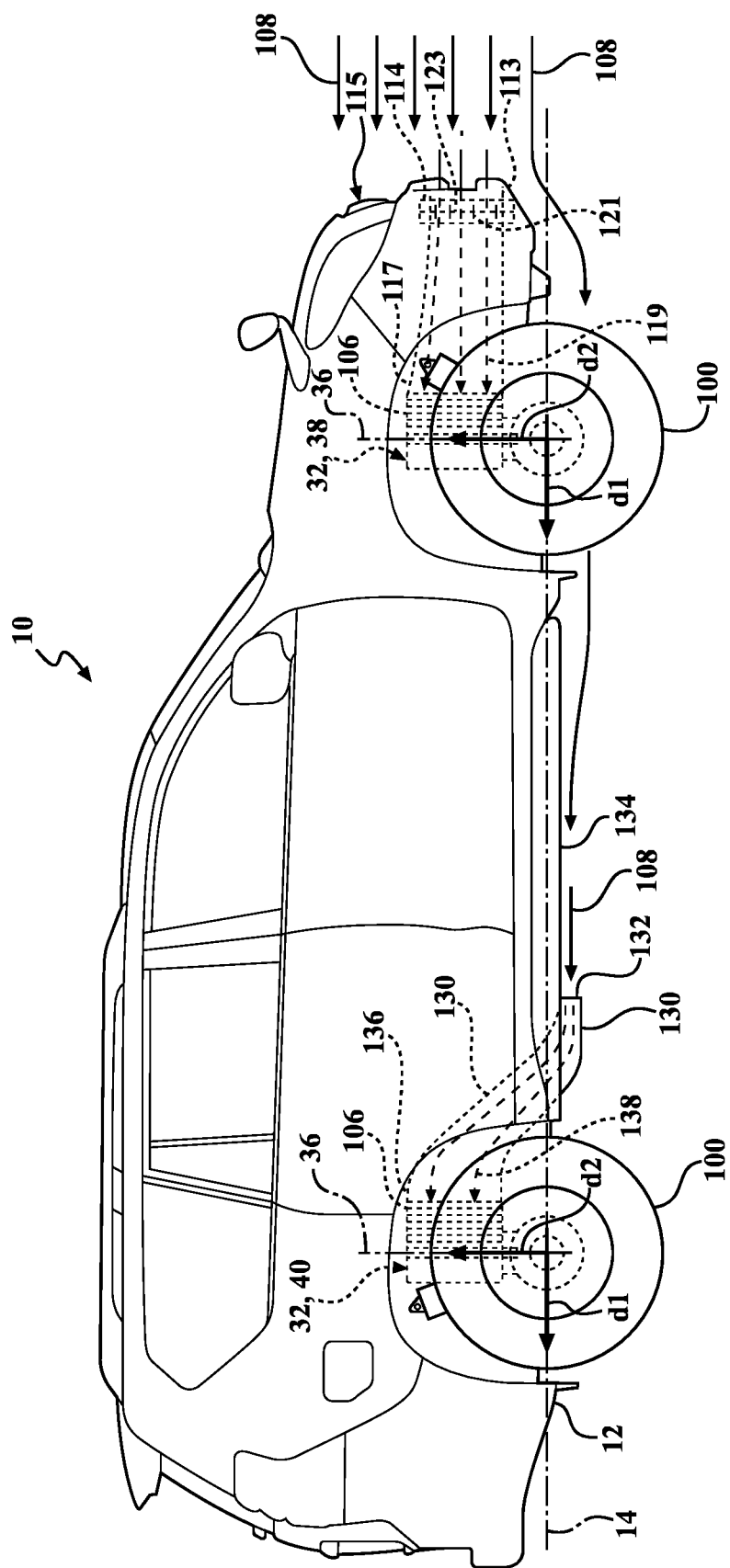

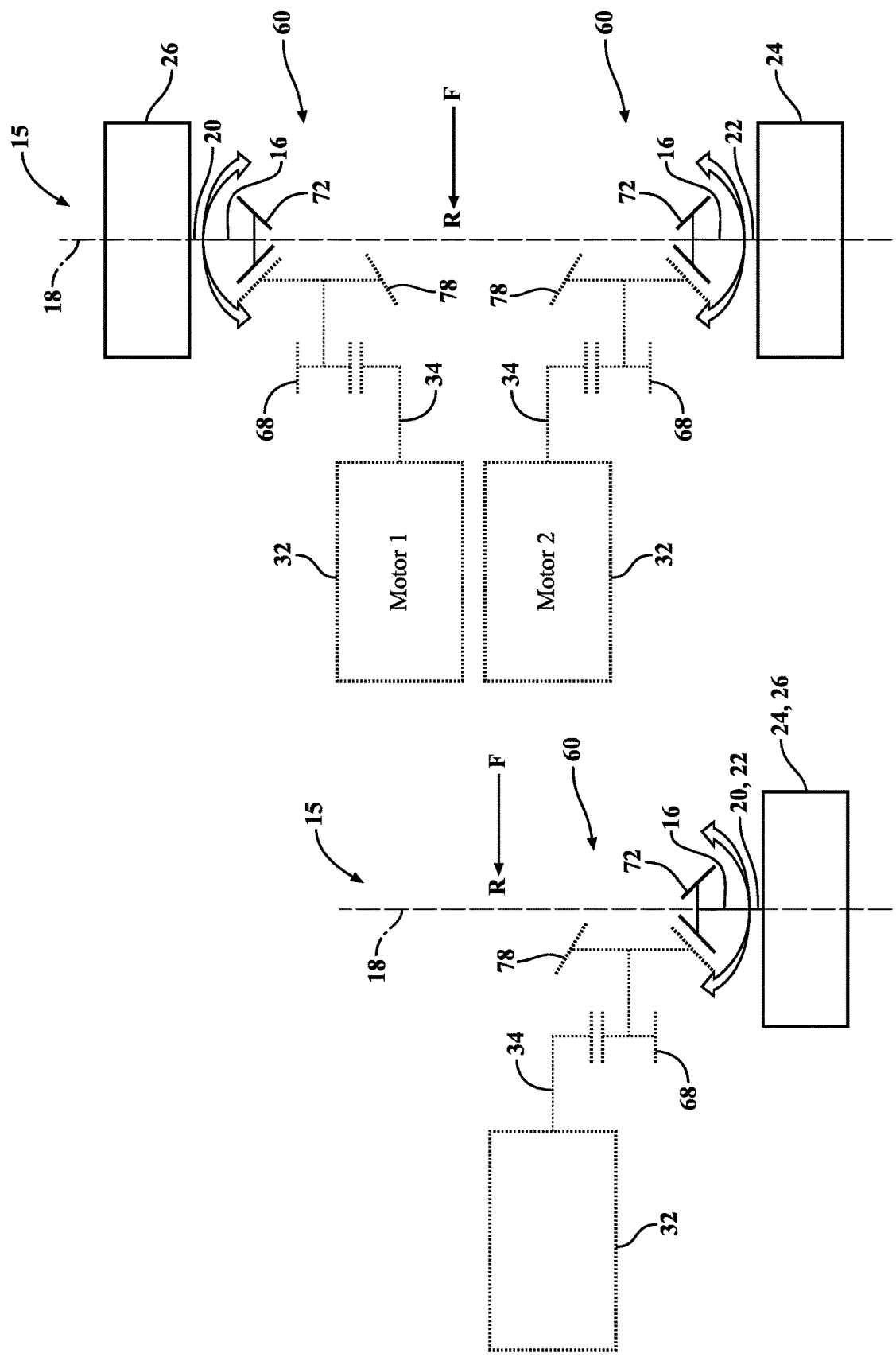

| Case | Torque | | | Position | | | |
|---|---|---|---|---|---|---|---|
| | M1 | M2 | M3 | SF1 | SF2 | SF3 | SF4 |
| Hard Right Turn | + | - | + | ON | OFF | ON | ON |
| | + | - | - | OFF | ON | ON | ON |
| Hard Left Turn | - | + | + | OFF | ON | ON | ON |
| | - | + | - | ON | OFF | ON | ON |
| Hard Acceleration | + | + | + | ON | ON | ON | ON |

FIG. 23

ROTATABLE DRIVE AXLE ASSEMBLY FOR AN ELECTRIC VEHICLE

FIELD OF THE INVENTION

The embodiments disclosed herein relate generally to a rotatable drive axle assembly for an electric vehicle comprising a selectively movable electric propulsion motor and motor axis configured for mounting in a substantially vertical direction, including a fully vertical direction. More particularly, it relates to a rotatable drive axle assembly for an electric vehicle comprising a selectively movable electric propulsion motor and motor axis configured for mounting in a substantially vertical direction, including a fully vertical direction, and movable from a first position and first direction of the motor axis to a second position and a second direction of the motor axis.

BACKGROUND

Thermal management for electric powered vehicles (EVs) comprising electric propulsion motors, including hybrid electric vehicles (HEVs), has a direct influence on driving range and vehicle efficiency. The electric propulsion motors, also referred to electric machines or e-machines, produce heat when they are operated. As the electric motor temperatures rises, the motor efficiency decreases reducing the vehicle driving range and the overall vehicle efficiency. Therefore, effective thermal management of EV motors is a very important design consideration.

Current EV designs position the electric propulsion motors in the same horizontal plane as the drive wheels in nearly all applications. The electric propulsion motors are mounted in fixed positions in the EV with the motor axis oriented longitudinally or transversely in the vehicle in a horizontal plane defined by the EV drive wheels.

The current positioning of the electric propulsion motors is not ideal for cooling because many suspension, chassis, and body components block a direct path for cooling air intake from the front of the vehicle thereby necessitating the use of other cooling systems. A direct path for air cooling is very desirable because an amount of air cooling is generally available when the EV is in motion with minimal, or in some case no, reduction in vehicle efficiency.

Furthermore, as illustrated in FIG. 24, the prior art horizontal positioning of the electric propulsion motors 32' and motor shafts 34' with their horizontal motor axes 36' results in the motor torque (T') being applied in a substantially vertical plane, which is the same vertical plane in which the vehicle suspension operates. As such, torques generated by operation of the electric propulsion motors act on and affect the suspension 98' and the sprung masses of the vehicle chassis that are supported thereon. Therefore, operation of the electric propulsion motor or motors 32' may result in forces acting on the suspension that are perceptible by the vehicle operator and passengers and that are generally very undesirable. In fact, prior art electric vehicles have included various systems and methods of operation that are designed to reduce or mask these forces.

In view of the above, it is desirable to provide EVs and HEVs with rotatable drive axle assemblies that are configured to operatively couple the motive power of electric propulsion motors in an orientation that provides more ideal air cooling to improve vehicle driving range and the overall vehicle efficiency as well as providing other synergistic benefits to vehicle operation. It is also desirable to provide EVs and HEVs with rotatable drive axle assemblies that are configured to operatively couple the motive power of electric propulsion motors that do not produce forces acting on the suspension that are perceptible by the vehicle operator and passengers.

SUMMARY OF THE INVENTION

In one embodiment, a rotatable drive axle assembly for an electric vehicle is disclosed. The embodiment comprises a rotatable vehicle drive axle configured to be disposed along a transverse axis of an electric vehicle and having an axle end that is configured for attachment to a drive wheel. The rotatable drive axle assembly for an electric vehicle also comprises a selectively movable differential configured to be disposed on the rotatable vehicle drive axle and configured to operatively couple motive power of a selectively movable electric propulsion motor comprising a rotatable motor shaft rotatable about a motor axis to the rotatable vehicle drive axle and the drive wheel, the selectively movable electric propulsion motor and the motor axis configured to be oriented in a substantially vertical direction and movable with reference to the rotatable vehicle drive axle.

In another embodiment, a rotatable drive axle assembly for an electric vehicle is disclosed. The embodiment comprises a rotatable vehicle drive axle configured to be disposed along a transverse axis of an electric vehicle and having an axle end that is configured for attachment to a drive wheel; a selectively movable differential configured to be disposed on the rotatable vehicle drive axle and configured to operatively couple motive power of a selectively movable electric propulsion motor comprising a rotatable motor shaft rotatable about a motor axis to the rotatable vehicle drive axle and the drive wheel, the selectively movable electric propulsion motor and the motor axis configured to be oriented in a substantially vertical direction and movable with reference to the rotatable vehicle drive axle; a second rotatable vehicle drive axle configured to be disposed along the transverse axis and having a second axle end that is configured for attachment of a second drive wheel, the second drive wheel disposed opposite the drive wheel along the transverse axis; a second selectively movable differential configured to be disposed on the second rotatable vehicle drive axle and configured to operatively couple motive power of a second selectively movable electric propulsion motor comprising a second rotatable motor shaft rotatable about a second motor axis to the rotatable vehicle drive axle and the drive wheel, the selectively movable electric propulsion motor and the motor axis configured to be oriented in a substantially vertical direction and movable with reference to the second rotatable vehicle drive axle; a selectable two-way clutch configured to be disposed between the selectively movable differential and the second selectively movable differential comprising a coupling and an opposed second coupling; a rotatable transfer axle configured to be disposed along the transverse axis comprising an outer end that is operatively coupled to the selectively movable differential and an inner end that is operatively coupled to the coupling of the selectable two-way clutch; and a second rotatable transfer axle configured to be disposed along the transverse axis comprising a second outer end that is operatively coupled to the second selectively movable differential and a second inner end that is operatively coupled to the second coupling of the selectable two-way clutch, wherein the selectable two-way clutch is configured to be selectively engaged and disengaged to couple and decouple the rotatable transfer axle and the second rotatable transfer axle.

In yet another embodiment, a rotatable drive axle assembly for an electric vehicle is disclosed. The embodiment comprises a rotatable vehicle drive axle configured to be disposed along a transverse axis of an electric vehicle and having a wheel end that is configured for attachment to a drive wheel; a selectively movable differential configured to be disposed on the rotatable vehicle drive axle and configured to operatively couple motive power of a selectively movable electric propulsion motor comprising a rotatable motor shaft rotatable about a motor axis to the rotatable vehicle drive axle and the drive wheel, the selectively movable electric propulsion motor and the motor axis configured to be oriented in a substantially vertical direction and movable with reference to the rotatable vehicle drive axle; a second rotatable vehicle drive axle configured to be disposed along the transverse axis and having a second axle end that is configured for attachment of a second drive wheel, the second drive wheel disposed opposite the drive wheel along the transverse axis; a second selectively movable differential configured to be disposed on the second rotatable vehicle drive axle and configured to operatively couple motive power of a second selectively movable electric propulsion motor comprising a second rotatable motor shaft rotatable about a second motor axis to the rotatable vehicle drive axle and the drive wheel, the second selectively movable electric propulsion motor and the second motor axis configured to be oriented in a substantially vertical direction and movable with reference to the second rotatable vehicle drive axle; a rotatable transfer axle configured to be disposed along the transverse axis and operatively coupled to a selectable one-way clutch comprising an outer end that is operatively coupled to the selectively movable differential and an inner end; a second rotatable transfer axle configured to be disposed along the transverse axis and operatively coupled to a second selectable one-way clutch comprising a second outer end that is operatively coupled to the second selectively movable differential and an inner end; a third selectively movable differential configured to be disposed on and operatively coupled on one side to the inner end of the rotatable transfer axle and disposed on and operatively coupled on an opposed side to the second inner end of the second rotatable transfer axle, the third selectively movable differential configured to operatively couple motive power of a third selectively movable electric propulsion motor comprising a third rotatable motor shaft rotatable about a third motor axis to the rotatable transfer axle and the second rotatable transfer axle, the third selectively movable electric propulsion motor and the third motor axis configured to be oriented in a substantially vertical direction and movable with reference to the rotatable transfer axle and the second rotatable transfer axle, the selectively movable electric propulsion motor and the motor axis also configured to be movable with reference to the rotatable transfer axle and the second selectively movable electric propulsion motor and the second motor axis also configured to be movable with reference to the second rotatable transfer axle, wherein the selectable one-way clutch is configured to be selectively engaged and disengaged to couple and decouple the rotatable transfer axle and the second selectable one-way clutch is configured to be selectively engaged and disengaged to couple and decouple the rotatable transfer axle second rotatable transfer axle, wherein the selectable one-way clutch and the second selectable one-way clutch are configured to be selectively engaged and disengaged to couple and decouple the rotatable transfer axle and the second rotatable transfer axle, respectively.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 1 is a schematic side view of an embodiment of an electric vehicle comprising a selectively movable vertical electric propulsion motor as described herein;

FIG. 4A is schematic side view of an embodiment of an electric vehicle comprising a selectively movable vertical electric propulsion motor, selectively movable differential, air duct, airflow and heat dissipater, as described herein;

FIG. 18 is a schematic diagram of an embodiment of a rotatable drive axle assembly for an electric vehicle, as described herein;

FIG. 19 is a schematic diagram of a second embodiment of a rotatable drive axle assembly for an electric vehicle, as described herein;

FIG. 23 is a table of an embodiment of a method of using the rotatable drive axle assembly for an electric vehicle of FIG. 20.

DESCRIPTION OF THE EMBODIMENTS

Figure 2A:
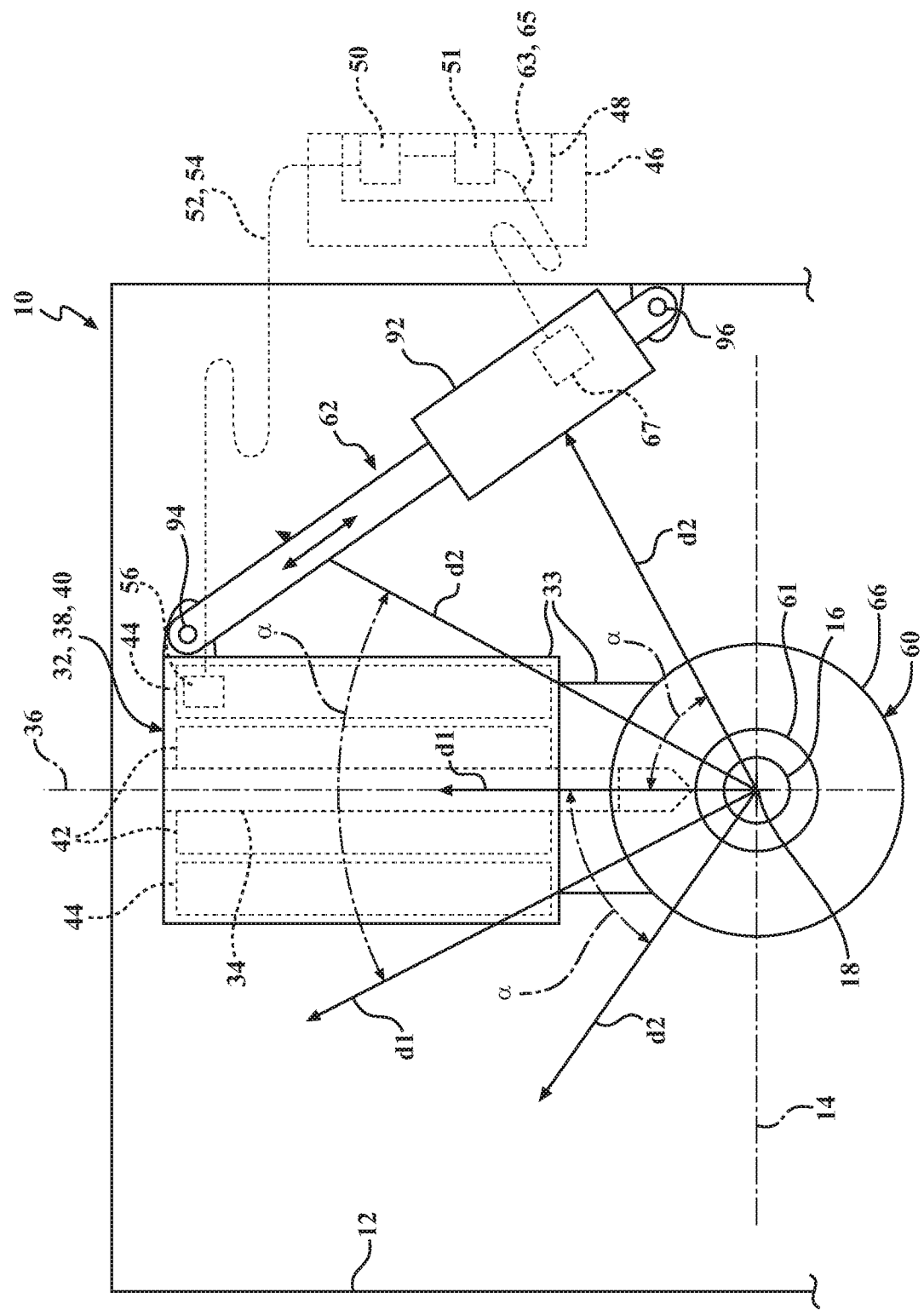
FIG. 2A-2C are schematic side views of embodiments of selectively movable vertical electric propulsion motors and selectively movable differentials and actuators, as described herein, illustrating the ranges of movement of thereof, as described herein.

The invention comprises rotatable drive axle assembly configurations for electric vehicles and hybrid electric vehicles, particularly electric vehicles and hybrid electric vehicles comprising a selectively movable electric propulsion motor that is configured to be oriented in a substantially vertical direction and movable with reference to the rotatable vehicle drive axle.

One embodiment comprises a rotatable drive axle assembly configuration comprising a selectively movable differential configured to be disposed on the rotatable vehicle drive axle and configured to operatively couple motive power of one selectively movable electric propulsion motor directly to one rotatable vehicle drive axle and drive wheel, and is extendable in other embodiments to a plurality (e.g., 2, 3, 4, etc.) of selectively movable differentials configured to be disposed on a corresponding plurality of rotatable vehicle drive axles and configured to operatively couple motive power of a corresponding plurality of selectively movable electric propulsion motors directly to the respective rotatable vehicle drive axles and drive wheels.

Another embodiment comprises a rotatable drive axle assembly configuration comprising a selectively movable differential configured to be disposed on the rotatable vehicle drive axle and configured to operatively couple motive power of two selectively movable electric propulsion motors through the rotatable vehicle drive axles to a pair of opposed drive wheels using a selectable one-way clutch that is configured to be selectively engaged and disengaged to operatively couple and decouple one of the selectively movable electric propulsion motors.

Another embodiment comprises two selectively movable differentials configured to be disposed on two corresponding rotatable vehicle drive axles laterally spaced along a transverse (or axle) axis and configured to operatively couple motive power of two corresponding selectively movable electric propulsion motors directly to the respective rotatable vehicle drive axles and opposed drive wheels, and the two selectively movable differentials are configured to be operatively coupled to one another through corresponding transfer axles that are joined to a selectable two-way clutch that enables the transfer of motive power of either or both of the selectively movable electric propulsion motors to both of the opposed drive wheels. This embodiment may also optionally include a selectable one-way clutch operatively coupled to either or both of the motor shafts that may be selectively engaged and disengaged to operatively couple or decouple the motor shafts from the respective selectively movable differentials.

Another embodiment comprises two selectively movable differentials configured to be disposed on two corresponding rotatable vehicle drive axles laterally spaced along a transverse or axle axis and configured to operatively couple motive power of two corresponding selectively movable electric propulsion motors directly to the respective rotatable vehicle drive axles and opposed drive wheels. A third selectively movable differential is configured to be disposed between the two selectively movable differentials to operatively couple motive power of a third selectively movable electric propulsion motor to the drive axles. The third selectively movable differential is configured to be operatively coupled to the two selectively movable differentials through two corresponding transfer axles between them that are joined to two corresponding selectable one-way clutches that enable the transfer of motive power of the third selectively movable electric propulsion motor through the third differential to either or both of the other two selectively movable differentials and to either or both of the opposed drive wheels. This embodiment may also optionally include a selectable one-way clutch operatively coupled to either or both of the two motor shafts of the two corresponding selectively movable electric propulsion motors that may be selectively engaged and disengaged to operatively couple or decouple the motor shafts from the two corresponding selectively movable differentials.

Figure 24:
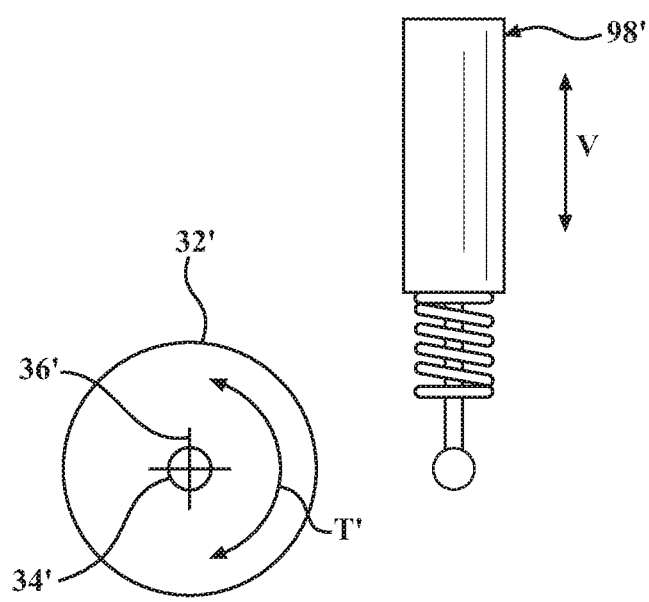
FIG. 24 is a schematic side view illustrating the orientation of a prior art electric propulsion motor and vehicle suspension as described herein.

The invention comprises an electric vehicle and/or a hybrid electric vehicle comprising a selectively movable electric propulsion motor that is configured to be oriented in a substantially vertical direction and movable with reference to the rotatable vehicle drive axle, and a method of making and using the electric vehicle and selectively movable electric propulsion motor. As illustrated in FIG. 24, horizontal positioning of electric propulsion motors 32' can be disadvantageous because they are frequently positioned adjacent to horizontally extending portions of the vehicle structure, such as steering systems and components and powertrain systems and components, including transaxles and differentials, which may impede the ability to direct a cooling airflow from the front of the vehicle onto the motor for air cooling during vehicle operation. By positioning the selectively movable electric propulsion motor vertically, limitations due to horizontally extending portions of the vehicle are reduced or avoided, and more of the body of the electric propulsion motor is available for exposure to a cooling airflow from the front of the vehicle, thereby enabling the electric motor to be cooled without the use of additional cooling systems. Vertical positioning of the electric propulsion motor advantageously enables the design of unique vertically-extending cooling ducts to direct air at/around the electric propulsion motor. The selectively movable electric propulsion motor in the vertical orientation may also comprise primary heat dissipating components in a vertically-extending orientation facing the front of the electric vehicle to take advantage of the vertically-extending cooling ducts.

Figure 5:
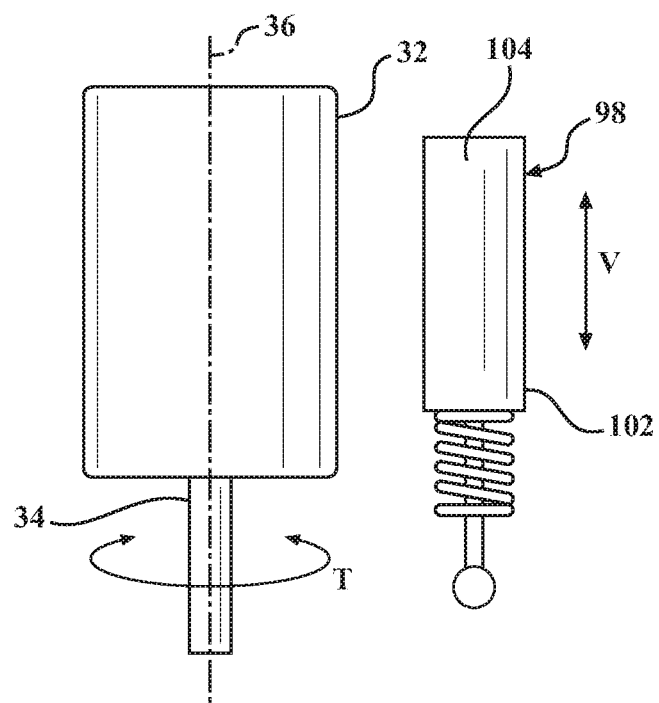
FIG. 5 is a schematic side view illustrating the orientation of a selectively movable vertical electric propulsion motor and vehicle suspension as described herein.

As illustrated in FIG. 5, vertical positioning of the selectively movable electric propulsion motor 32 also advantageously provides a propulsion system where the torque acting on the drive train and chassis is not acting on the suspension in a way perceivable to the driver and/or passengers. That is, the motor torques (T) during operation of the electric propulsion motor when it is oriented vertically are not acting in a vertical plane like much of the suspension system and many of the suspension components, but rather they are acting in a horizontal plane. Thus, the motor torques are less perceptible to the driver and/or passengers and the need to compensate for torques (T) acting in the vertical plane, whether for human users or other vehicle systems, is reduced or eliminated. Decoupling the motor torques from the suspension system also provides noise, vibration, and harshness (NVH) benefits by reducing or eliminating sources of vertical vibration within the vehicle chassis of the electric vehicle.

The electric vehicle of this invention orients the electric propulsion motor in the vertical direction. The rotatable motor shaft and motor axis is oriented downwardly and configured for attachment to a power transmission coupling, such as a differential, to power the driven wheels.

In certain embodiments, the electric propulsion motor of the electric vehicle may be rotated about the rotatable vehicle drive axle and may be rotated longitudinally towards the front and/or rear of the vehicle, or alternately laterally towards the left side or right side of the vehicle, about the rotatable vehicle drive axle. For example, the motor can be in a horizontal (e.g., down) position rotated toward either the front or rear, or left side or right side, of the vehicle and can heat up faster during a cold start condition for peak efficiency in a start mode. As the motor heats up, it can be rotated back to the vertical orientation for more efficient cooling in an operation mode. In other words, the electric propulsion motor can be efficiently rotated from a start mode to an operation mode to optimize a motor characteristic, such as the internal motor operating temperature, or toward or away from the vehicle cabin to affect a vehicle cabin characteristic, such as providing more or less heat to the vehicle cabin. In other embodiments, the rotatable motor orientation can also take advantage of dampening out motor harmonics. For example, the motor can be rotated from a first position and direction (e.g., frontward facing at an acute angle from vertical) to a second position and direction (e.g., rearward facing at an acute angle from vertical) dynamically as a function of the motor speed (e.g., RPM) to simultaneously dampen out a motor characteristic, such as a motor vibrational harmonic and/or a vehicle characteristic, such as a suspension harmonic. In one embodiment, the drive train (e.g., electric propulsion motor and drive train components to which the electric propulsion motor is coupled) harmonics may be used to dampen or cancel suspension harmonics.

In certain embodiments, the electric propulsion motor can be rotated from a first position to a second position as a function of or to affect (i.e., change) a vehicle characteristic, such as the vehicle center of mass. The orientation of the electric propulsion motor can be changed, thus changing the center of mass of the vehicle, which may improve traction in the event of a terrain change, such as when traversing different terrain or attempting to get the vehicle unstuck, etc. If the vehicle is in an off-balance condition or encountering an undesirable or unstable vehicle stability condition during operation (e.g., cornering and/or braking), the change in motor orientation may be used to affect stability control and the distribution of mass of the vehicle. The selectively movable electric propulsion motor can also be rotated from one position (e.g., a first position/direction) to another position (e.g., a second position/direction), thus changing the center of mass of the vehicle, as a function of an environmental characteristic, such as a temperature of the external environment, or precipitation (e.g., rain, snow, or ice external), or wind speed and direction, or other characteristics of the environment.

As used herein, the terms front or forward or rear or rearward or aft refer to the front or rear of the article or vehicle, or to a direction toward the front or rear of the article or vehicle, respectively. The term longitudinal or along the length refers to a direction that extends along or generally parallel to an article or vehicle centerline between the front and the rear, or from one end to an opposed end. The term transverse, or lateral, or along the width, or left or right refers to a direction that is orthogonal, or substantially orthogonal, to the longitudinal direction. The terms up or upward or down or downward refer to the top or bottom of the article or vehicle, or to a direction substantially toward the top or bottom of the article or vehicle, respectively. The terms in or inner or inward refer to a direction toward the center of the article or vehicle, and out or outer or outward refer to the opposite direction away from the center or central portion of the article or vehicle.

Referring to FIGS. 1-23, and particularly FIGS. 1, 4A, 4B, 7A, 7B, and 8-15, an electric vehicle 10 is disclosed. The electric vehicle 10 may comprise all manner of wheeled electric vehicles. The electric vehicle 10 may include all manner of electric automotive vehicles, including all manner of cars, sport and other types of utility vehicles (SUVs), and trucks, including light-duty, medium-duty, and heavy-duty trucks. The electric vehicle 10 may also include all manner of all-terrain vehicles (ATVs) and side-by-side vehicles, including utility or utility task vehicles (UTVs) and multipurpose off-highway utility vehicles (MOHUVs). The electric vehicle 10 may comprise an electric vehicle (EV), where all of the motive power of the vehicle wheels is provided by a selectively movable electric propulsion motor 32 as described herein, or a hybrid electric vehicle where the motive power to a portion of the vehicle wheels is provided by electric motors as described herein and the motive power to another portion of the vehicle wheels is provided by other sources of motive power, such as, for example, an internal combustion engine 35.

The electric vehicle 10 comprises a vehicle chassis 12 extending along a longitudinal axis 14 of the electric vehicle and a rotatable vehicle drive axle (i.e., motive or powered axle) 16 or rotatable driven axle (i.e., non-motive or unpowered axle) 17 disposed along a transverse (i.e., lateral) axis 18 or axle axis that has opposed axle ends 20, 22 and that is configured for attachment of a pair of opposed drive wheels 24, 26 in the case of rotatable vehicle drive axle 16, and attachment of a pair of opposed driven wheels 24', 26' in the case of rotatable vehicle driven axle 17. As used herein, the vehicle chassis 12 may comprise any fixed portion of the electric vehicle 10 and may comprise the vehicle frame or body, particularly in vehicles that employ uni-body construction, or a combination thereof. The selectively movable electric propulsion motor 32 may be used on the electric vehicle 10 in conjunction with a rotatable vehicle drive axle 16 in any desired manner or location, including as a front axle 28 (e.g., in an FWD) vehicle) with opposed front drive wheels 24, 26, a rear axle 30 (e.g., in an RWD vehicle) with opposed rear drive wheels 24, 26, or as a front axle 28 with opposed front drive wheels 24, 26, and rear axle 30 with opposed rear drive wheels 24, 26 (e.g., in an AWD or 4WD vehicle).

The electric vehicle 10 also comprises a selectively movable electric propulsion motor 32 comprising a rotatable motor shaft 34 that is reversibly rotatable in either direction about a motor axis 36. The selectively movable electric propulsion motor 32 may comprise any suitable number or type of electric propulsion motor. In one embodiment, the selectively movable electric propulsion motor 32 comprises a pair of selectively movable electric propulsion motors, a front selectively movable electric propulsion motor 38 and a rear selectively movable electric propulsion motor 40. The front selectively movable electric propulsion motor 38 and rear selectively movable electric propulsion motor 40 may be identical to one another and may comprise the same motor type, as described herein, and/or utilize the same motor construction (e.g., stator and rotor configuration), and/or may have the same motive power output (e.g., torque output). Alternately, the front selectively movable electric propulsion motor 38 and rear selectively movable electric propulsion motor 40 may be different from one another and may comprise different motor types, as described herein, and/or utilize different motor constructions (e.g., stator and rotor configurations), and/or may have different motive power outputs (e.g., torque outputs).

In one embodiment, as illustrated in FIGS. 1 and 2A-2C, a front selectively movable electric propulsion motor 38 and/or rear selectively movable electric propulsion motor 40 each comprise a stator 44 that has an axially-extending cylindrical shape and is configured to be fixed and stationary and a selectively reversibly rotatable rotor 42 that is configured for selectively reversible rotation and is disposed radially inwardly of and concentric with the stator 44 and that also has an axially-extending cylindrical shape. The selectively movable electric propulsion motor 32 may comprise any suitable type of electric motor comprising a fixed stator 44 and a selectively reversibly rotatable rotor 42 disposed within the stator 44, including various alternating current (AC) and direct current (DC) powered electric motors, including both brushed (BDC) and brushless (BLDC) electric propulsion motors. In one embodiment, the selectively movable electric propulsion motor 32 comprises an AC electric propulsion motor and conventional power electronics including a current inverter and a voltage converter. The DC power and current from the vehicle battery 46 is converted to AC power and current using the power inverter and the voltage from the vehicle battery 46 is stepped up to a high voltage (e.g., about 210 VDC to about 650 VAC) using the voltage converter. The power electronics may be disposed within the selectively movable electric propulsion motor 32, particularly proximate the stator 44, or elsewhere in the electric vehicle 10, including as a part of a vehicle controller 48 which may comprise a plurality of vehicle controllers, including the motor controller 50, or as part of the vehicle battery 46, or on a standalone basis. The high voltage AC power may be supplied to the selectively movable electric propulsion motor 32 by any suitable inner electrical power and/or signal communication device 52, such as a motor power bus 54 that comprises an electrical conductor configured to electrically communicate high voltage from the power electronics, which may be electrically connected to the selectively movable electric propulsion motor 32 by any suitable electrical power attachment, including an electrical connector 56. The selectively movable electric propulsion motor 32 is configured to be mounted within the vehicle chassis 12 and operatively coupled to the rotatable vehicle drive axle 16 and opposed drive wheels 24, 26 as described herein. In one embodiment, the rotatable vehicle drive axle 16 and opposed drive wheels 24, 26 may comprise a conventional rotatable vehicle drive axle 16, which may include rotatable vehicle drive axle half shafts or axle portions extending from a selectively movable differential 60 and operatively coupled to the opposed drive wheels 24, 26 in a conventional manner, including the use of axle housings 61, axle bearings, wheel bearings, wheel hubs, and the like, as well as operative coupling to brake systems and components, steering systems and components, and suspension systems and components as are known in the art. The selectively movable electric propulsion motor 32 and motor axis 36 are configured to be oriented in a substantially vertical direction and movable with reference to the rotatable vehicle drive axle 16. As used herein, substantially vertical means that the selectively movable electric propulsion motor 32 and motor axis 36 are configured to be mounted in, and/or may be selectively moved into, a position where they are nearly vertical, for example, within 0-15°, more particularly 0-10°, and more particularly 0-5° of a vertical orientation, and including a vertical orientation. The ranges associated with substantially vertical may be fore or aft for selectively movable electric propulsion motors 32 that are selectively movable in the longitudinal plane, and left or right for those that are selectively movable in the transverse plane. As used herein, selectively movable means movable by an electrically powered motor actuator 62 by any suitable electrical power and/or signal communication device 63, such as an actuator power bus 65 that comprises an electrical conductor configured to electrically communicate voltage and current from the vehicle battery 46, which may be electrically connected to the electrically powered motor actuator by any suitable electrical power attachment, including an electrical connector 67, for example. The electrically powered motor actuator 62 may be actuated to selectively move and change the position of the selectively movable electric propulsion motor 32 and motor axis 36 in any suitable manner, including manually or automatically. In one embodiment (not shown), the electrically powered motor actuator 62 may be actuated manually in a conventional manner by a human user by operation of a switch, for example. In another embodiment, the electrically powered motor actuator 62 may be actuated using a control signal from the signal communication device 63 through actuator power bus 65 to the motor actuator 62 in a conventional manner in conjunction with a control algorithm that is executed as a computer program by a vehicle controller 48, such as the motor controller 50, or a separate actuator controller 51 that is in signal communication with the motor controller 48, as illustrated schematically in FIGS. 1 and 2A-2C.

Figure 2B:
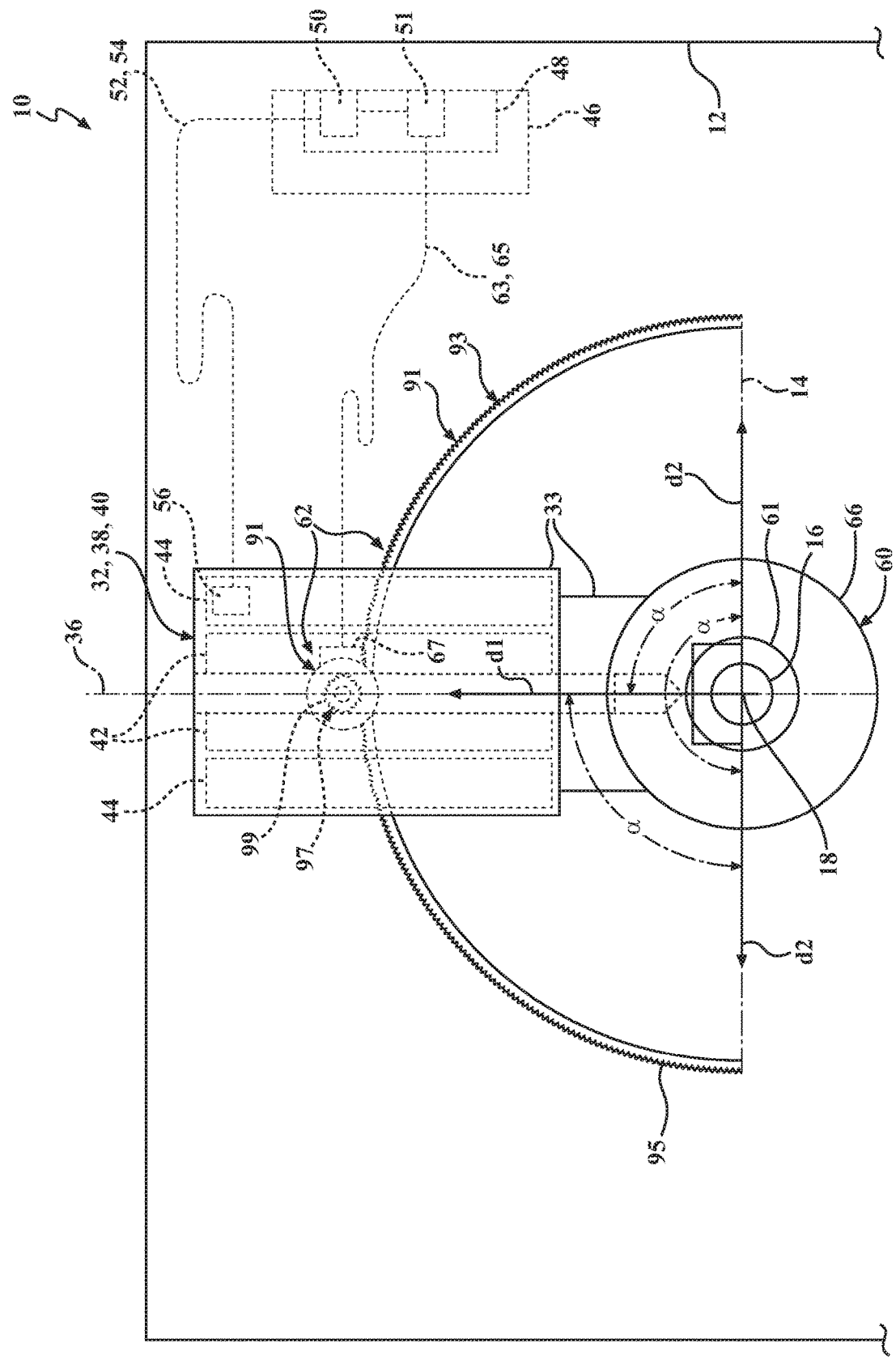
Figure 2C:
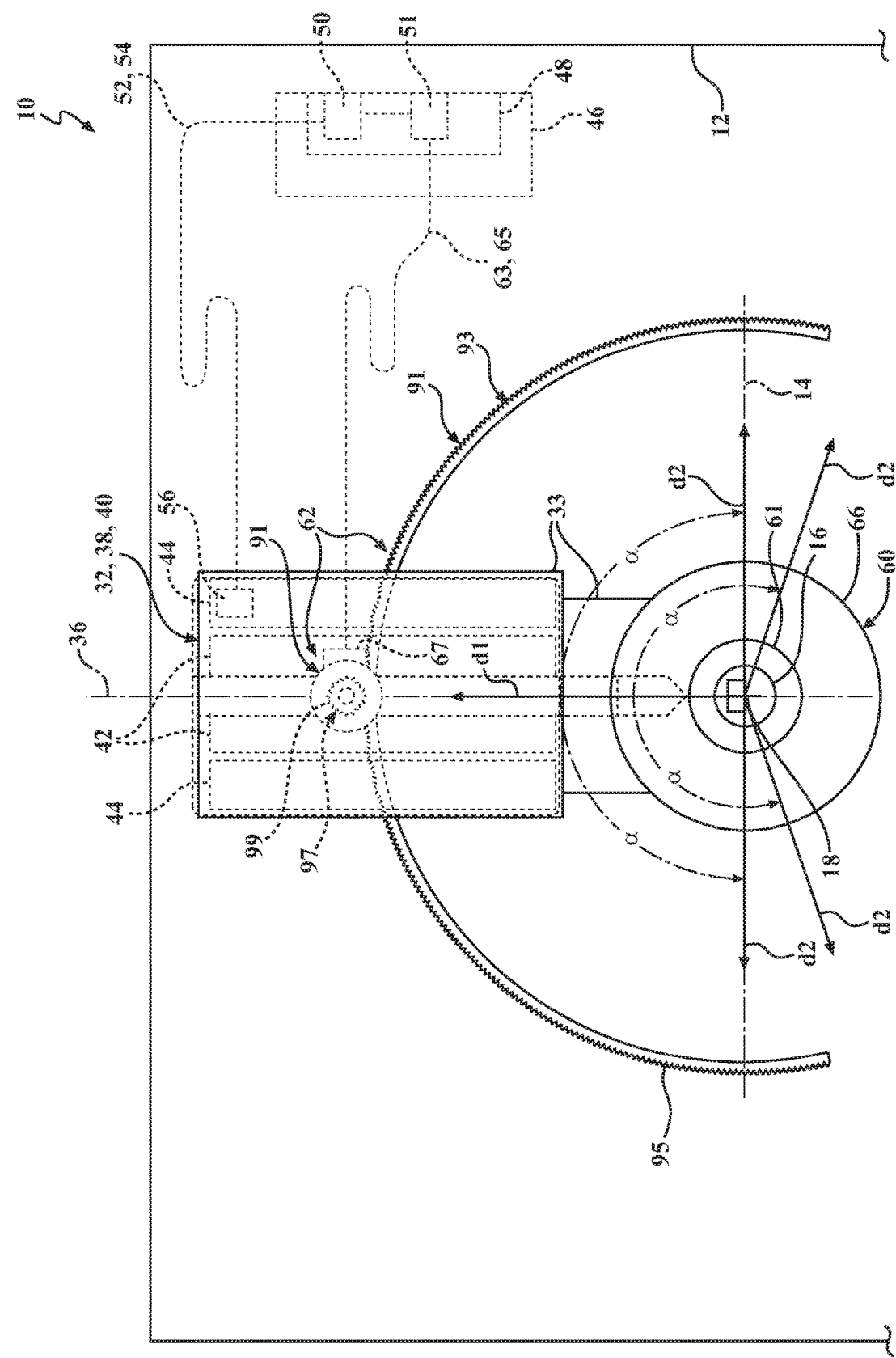
Figure 3:
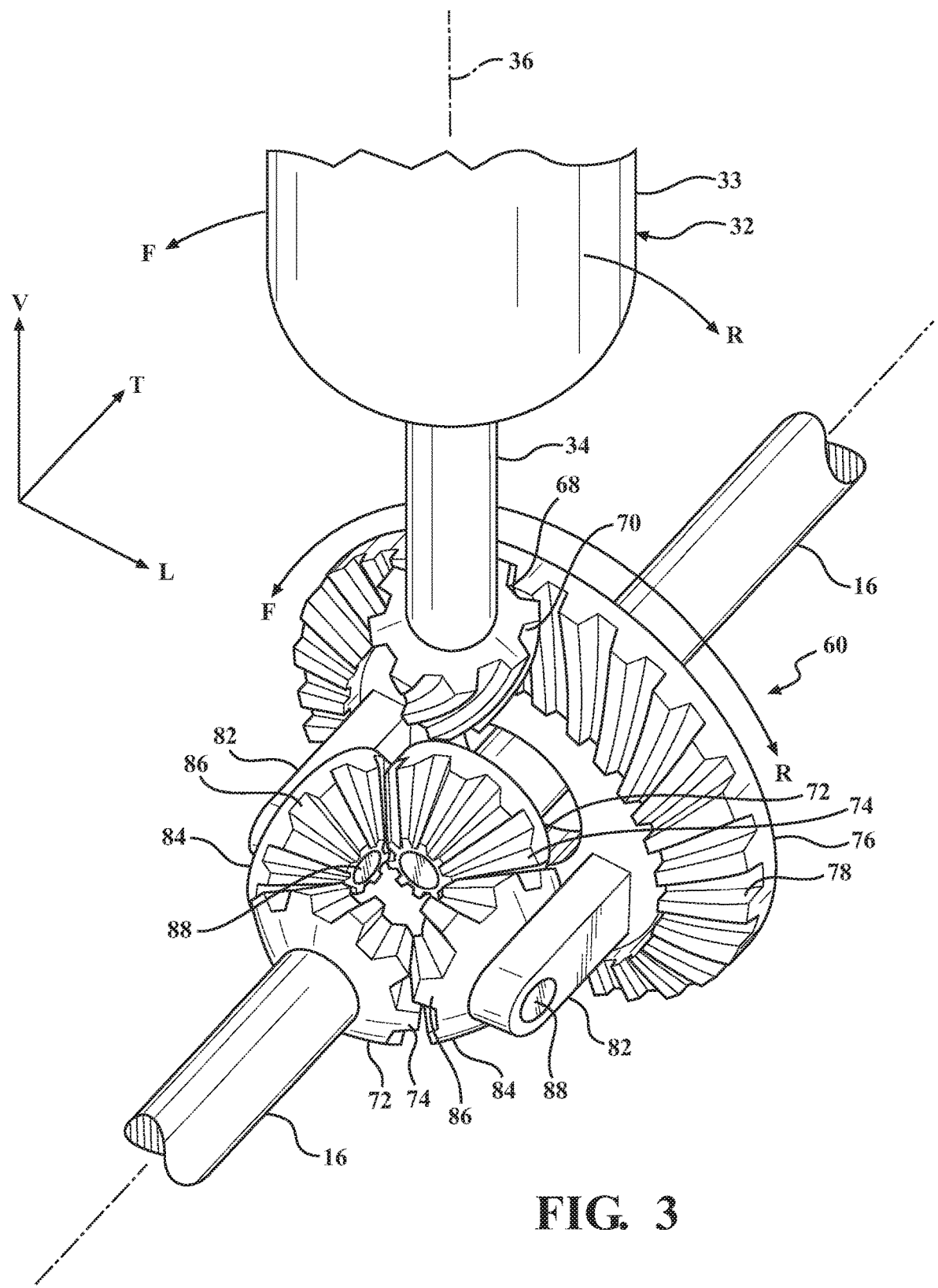
FIG. 3 is a perspective view of an embodiment of a selectively movable substantially vertical electric propulsion motors and selectively moveable differential with the differential housing removed, as described herein.

In one embodiment, as shown in FIGS. 1-3 and 6, for example, the selectively movable differential 60 is disposed on the rotatable vehicle drive axle 16 and is configured to operatively couple the motive power of the selectively movable electric propulsion motor 32 that is transmitted to the rotatable motor shaft 34 to the rotatable vehicle drive axle 16. The selectively movable differential 60 comprises a differential housing 66, which in one embodiment may be substantially spherical, or spherical, and may comprise opposed hemispheres that are selectively attachable to and detachable from one another, such by the use of a plurality of threaded fasteners (not shown) that extend through a corresponding plurality of housing bores 69. In one embodiment, the selectively movable differential 60 comprises a differential housing 66, a shaft gear 68, which in one embodiment comprises a pinion gear having a plurality of shaft gear teeth 70, attached to the rotatable motor shaft 34 and disposed within the differential housing 66, and a drive axle gear 72 or gears having a plurality of axle gear teeth 74 attached to the rotatable vehicle drive axle 16 and disposed within the selectively movable differential 60, wherein the shaft gear 68 and associated gear teeth 70 are operatively coupled to the drive axle gear(s) 72 and associated axle gear teeth 74. In one embodiment, the shaft gear 68 is operatively coupled to the drive axle gears 72 through a ring gear 76 having a plurality of ring gear teeth 78 that is concentrically and rotatably disposed on the rotatable vehicle drive axle 16, such as through a ring gear bearing (not shown) as is known in the art. The ring gear 76 and ring gear teeth 78 are configured for reversible rotatable meshed engagement with the shaft gear 68 and shaft gear teeth 70, such that rotation of the rotatable motor shaft 34 and shaft gear 68 produces rotation of the ring gear in a forward (F) or rearward (R) direction as shown in FIG. 3. The ring gear 76 comprises a spider comprising a pair of orthogonally protruding spider arms 82 that are configured to rotatably support a pair of inwardly facing spider gears 84 having a plurality of spider gear teeth 86 that are rotatably disposed on inwardly extending pins 88 by spider bearings (not shown) as is known in the art. The spider gears 84 and spider gear teeth 86 are configured for reversible rotatable meshed engagement with the drive axle gears 72 and axle gear teeth 74. Thus, selectively reversible rotation of the rotatable motor shaft 34 of the selectively movable electric propulsion motor 32 produces rotation of the ring gear 76 and spider gears 84 resulting in rotation of the drive axle gears 72 and the rotatable vehicle drive axle 16, thereby resulting in rotation of the opposed drive wheels 24, 26 and selectively reversible propulsion of the electric vehicle 10 in a forward or rearward direction.

In one embodiment, the selectively movable electric propulsion motor 32 comprises, and the motor components thereof described herein are housed within, a motor housing 33 that has a cylindrical shape and extends axially along the motor axis 36. The motor housing 33 is configured for selective attachment to and detachment from the differential housing 66. The motor housing 33 may be selectively attached to and detached from the differential housing 66 by any suitable attachment device, which in one embodiment (not shown) comprises a plurality of threaded fasteners that are inserted through plurality of circumferentially spaced bores through a circumferential attachment flange disposed on an open end of the motor housing 33 disposed toward the selectively movable differential 60, and which for attachment are threaded into (or for detachment out of) a corresponding plurality of circumferentially spaced threaded bores in the differential housing 66.

Figure 6:
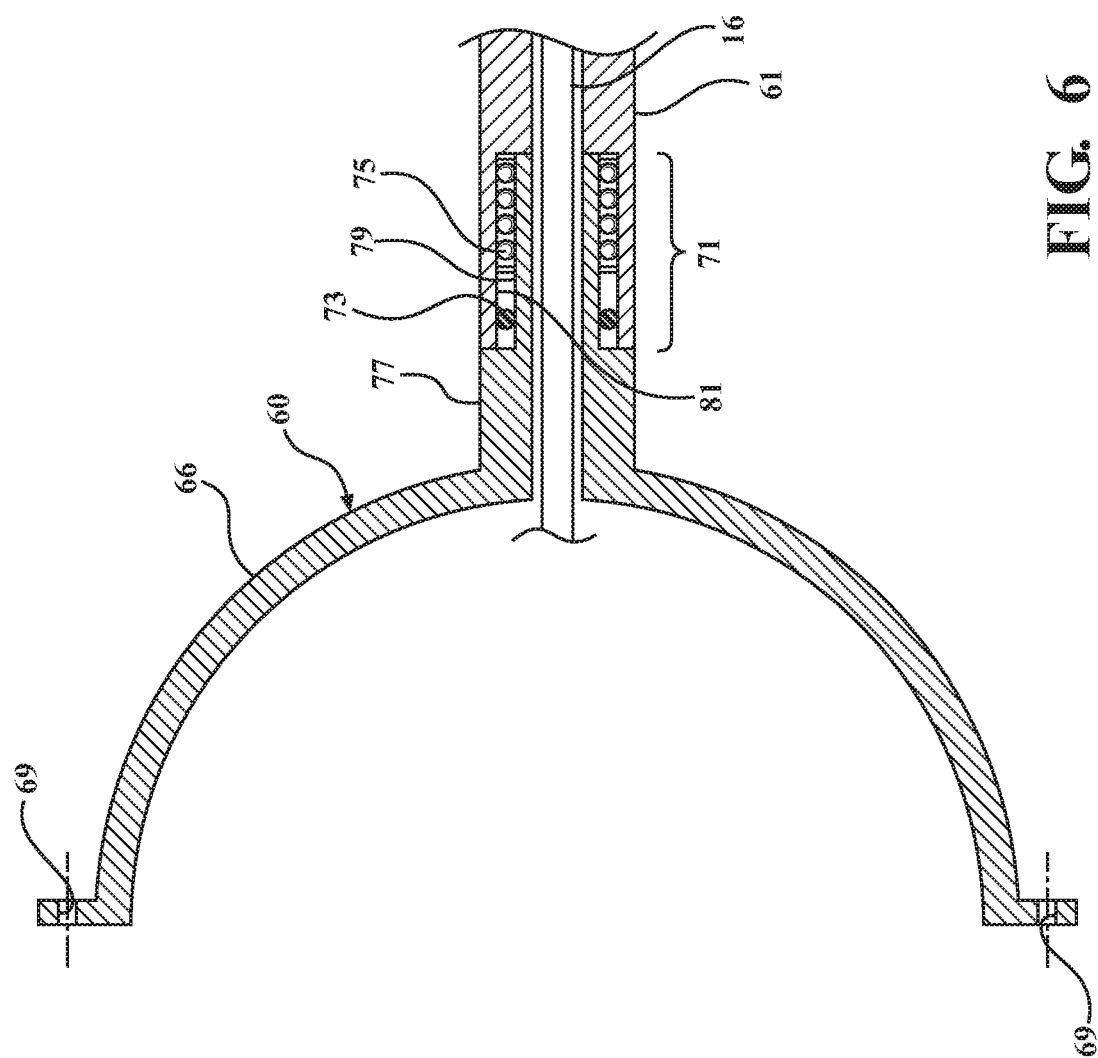
FIG. 6 is a schematic top cross-sectional view of an embodiment of a differential housing of a selectively movable vertical electric propulsion motor, a selectively movable vehicle differential, and a vehicle axle as described herein.

Referring to FIG. 6, the selectively movable differential 60 is movable in that it is rotatable about the rotatable vehicle drive axle 16 and transverse or axle axis 18 as described herein. The selectively movable differential 60 is configured to rotate about the rotatable vehicle drive axle 16 and transverse or axle axis 18 through the use of a sealed rotatable coupling 71 disposed between the selectively movable differential 60 and the axle housing 61, wherein the axle housing is fixed to the vehicle chassis 12 in a known manner, such as by one or more bolted connections (not shown), and the differential housing 66 is rotatable about the axle housing 61 via the sealed rotatable coupling 71. Any suitable sealed rotatable coupling 71 may be employed. In one embodiment, the sealed rotatable coupling 71 comprises a seal 73, such as an O-ring seal, to prevent the ingress of water, dirt, road salt, or other external contaminants, and to retain any lubricants (e.g., oil or greases) disposed within the differential housing 66 or axle housing 61. The sealed rotatable coupling 71 also comprises a bearing 75 disposed between the differential housing 66 and axle housing 61 and configured to enable the movement (i.e., rotation) of the selectively movable differential 60 about the axle housing 61. In one embodiment, opposed halves of the differential housing 66 each include a protruding cylindrical axle portion 77 with a shoulder 79 that is configured to receive the seal 73 and bearing 75 in sealed and pressed engagement. The axle housing 61, such as a cylindrical axle housing, also comprises a cylindrical counterbore 81 and is also configured to receive the seal 73 and bearing 75 in sealed and pressed engagement.

It will be understood that for the selectively movable electric propulsion motor 32, a selectively movable differential may be used on the electric vehicle 10 in conjunction with a rotatable vehicle drive axle 16 in any desired manner or location, including as a front axle 28 (e.g., in an FWD vehicle), or a rear axle 30 (e.g., in an RWD vehicle), or as a front axle 28 and rear axle 30 (e.g., in an AWD vehicle or a 4WD vehicle). In one embodiment, both the front axle 28 and the rear axle 30 comprise a selectively movable electric propulsion motor 32 and FWD, RWD, and AWD driving modes may be accomplished by powering and using the selectively movable electric propulsion motor 32 disposed on the front axle 28, or the selectively movable electric propulsion motor 32 disposed on the rear axle 30, or both the selectively movable electric propulsion motor 32 disposed on the front axle 28 and the selectively movable electric propulsion motor 32 disposed on the rear axle 30, respectively. In one embodiment, the front axle 28 comprise a selectively movable electric propulsion motor 32 and a rear axle 30 is an unpowered axle, such as a solid unpowered axle, comprising driven wheels and the electric vehicle 10 comprises an FWD vehicle. In another embodiment, the rear axle 30 comprises a selectively movable electric propulsion motor 32 and a front axle 28 is an unpowered axle, such as a solid unpowered axle, comprising steerable driven wheels and the electric vehicle 10 comprises an RWD vehicle.

In one embodiment, as shown in FIGS. 1 and 2A, the electric vehicle 10 also comprises a motor actuator 62 operatively coupled to the selectively movable electric propulsion motor 32 and the vehicle chassis 12. The motor actuator 62 may comprise any suitable actuator that may be configured to move the selectively movable electric propulsion motor 32 and motor axis 36 radially about the transverse (axle) axis 18. In one embodiment, the motor actuator 62 may comprise an electrically powered linear actuator 92 that is pivotably attached to the selectively movable electric propulsion motor 32 by a motor pivot 94 and to the vehicle chassis 12 by a chassis pivot 96. Any suitable electrically powered linear actuator 92 configured to provide linear motion sufficient to change the length of the actuator (i.e. selectively increase and decrease the length of the actuator) and thereby cause the selectively movable electric propulsion motor 32 and motor axis 36 to rotate about the transverse axis 18 by operation of the motor pivot 94 and chassis pivot 96. The electrically powered linear actuator 92 may be electrically connected and controlled as described herein. The electrically powered linear actuator 92 may comprise any suitable type of electrically powered linear actuator, including electrical, electromechanical, electropneumatic, and electrohydraulic linear actuators, such as various electromechanical ball screw, leadscrew, and rack and pinion type linear actuators. The positions of motor pivot 94 on the selectively movable electric propulsion motor 32 and chassis pivot 96 on vehicle chassis 12 and the range of movement of the motor actuator 62 may be selected to provide a predetermined angular range of motor movement, which in one embodiment may be angle ($\alpha$), as described herein. The range of movement of selectively movable electric propulsion motor 32 and motor axis 36 will be selected to include a substantially vertical position, including a vertical position, as described herein.

In another embodiment, as shown in FIGS. 2B and 2C, the motor actuator 62 may comprise an electrically powered rack and pinion actuator 91. The electrically powered rack and pinion actuator 91 comprises a circumferentially extending rack 93 that is concentrically circumferentially disposed about the transverse axis 18. The circumferentially extending rack 93 comprises a plurality of rack teeth 95 disposed on an outer edge. In one embodiment, the circumferentially extending rack 93 may be attached to the vehicle chassis 12. The electrically powered rack and pinion actuator 91 also comprises a rack gear 97, such as a pinion gear, comprising a plurality of rack gear teeth 99 that are configured for meshed engagement with the rack teeth 95. The rack gear 97 is attached to a rotatable rack gear shaft of a selectively reversibly rotatable electric rack motor, which is attached to the motor housing 33. The electrically powered rack and pinion actuator 91 and the rotatable electric rack motor may be electrically connected and controlled as described herein. The operation of the rotatable electric rack motor rotates the rack gear 97 and rack gear teeth 99 and their meshed engagement with the rack teeth 95 causes the translation of the rotatable electric rack motor and motor housing 33 along the rack 93 and rotation of the selectively movable electric propulsion motor 32 about the transverse axis 18. The electrically powered rack and pinion actuator 91 may be configured to provide any predetermined angular range of motor movement, which in one embodiment may be angle ($\alpha$), as described herein. As shown in FIGS. 2B and 2C, the electrically powered rack and pinion actuator 91 is particularly configured to provide large ranges of angle ($\alpha$). This includes angle ($\alpha$) up to and including right angles (e.g. 0-90°) forward or rearward (i.e. 0-180° overall) as shown in FIG. 2B. This also includes angle ($\alpha$) up to and including obtuse angles (e.g. 0-120°) forward or rearward (i.e. 0-240° overall) as shown in FIG. 2C. The range of movement of electric propulsion motor 32 and motor axis 36 will be selected to include a substantially vertical position, including a vertical position, as described herein.

Referring to FIGS. 1-2C, the motor actuator 62 is configured to move the selectively movable electric propulsion motor 32 and motor axis 36 from a first position comprising the first direction ($d_1$) of the motor axis 36 to a second position comprising a second direction ($d_2$) of the motor axis, the second position being separated from the first position by the angle ($\alpha$). In one embodiment, the motor actuator 62 is configured to move the selectively movable electric propulsion motor 32 and motor axis 36 from a first radial position about the transverse axis 18 comprising a first radial direction ($d_1$) of the motor axis 36 to a second radial position comprising a second radial direction ($d_2$) of the motor axis 36, the second position being separated from the first position by the angle ($\alpha$). In one embodiment, the selectively movable electric propulsion motor 32 and motor axis 36 is selectively movable from the first position comprising the first direction ($d_1$) of the motor axis to the second position comprising the second direction ($d_2$) of the motor axis where the second position is separated from the first position by the angle ($\alpha$) both while the electric vehicle 10 is stationary or in motion. In one embodiment, the first radial direction ($d_1$) and first radial position and the second radial direction ($d_2$) and second radial position correspond to a starting position and an ending position, respectively, of a particular movement of the selectively movable electric propulsion motor 32 and the angle ($\alpha$) comprises an angular range of motor movement, and the starting position and an ending position may be reversed. Furthermore, the first radial direction ($d_1$) and first radial position and the second radial direction ($d_2$) and second radial position may be selected to be any positions within the range of motor movement of selectively movable electric propulsion motor 32. In one embodiment, the angle ($\alpha$) may comprise an acute angle (FIG. 2A), or in another embodiment a right angle (FIG. 2B), or in yet another embodiment an obtuse angle (FIG. 2C). In one embodiment, the angle ($\alpha$) opens forward of the rotatable vehicle drive axle 16, and in another embodiment rearward of the rotatable vehicle drive axle, and in yet another embodiment both forward and rearward of the rotatable vehicle drive axle. It will be understood that the first radial directions ($d_1$) and first radial positions and the second radial directions ($d_2$) and second radial positions may be reversed from those illustrated herein.

Referring to FIGS. 2A-2C and FIGS. 4A and 4B, in one embodiment, the first radial direction ($d_1$) corresponds to a motor start mode and the second radial direction ($d_2$) comprises a motor operation mode, wherein the radial direction comprises a horizontal vector and a vertical vector, and wherein the vertical vector in the motor start mode is less than the vertical vector in the motor operation mode. Thus, in the motor start mode where the selectively movable electric propulsion motor 32 is generally at ambient temperature, which in many climates may comprise a cold start mode, the selectively movable electric propulsion motor is more horizontally oriented (e.g., substantially horizontal) where it receives less of a vertically oriented airflow cooling 108 as described herein and will therefore warm up more quickly to an operating temperature. In one embodiment, substantially horizontal comprises a range of 0°-≤15° from horizontal, and in another embodiment substantially horizontal comprises a range of 0°-10° from horizontal, and in another embodiment substantially horizontal comprises a range of 0°-5° from horizontal. The ranges associated with substantially horizontal may be fore or aft for selectively movable electric propulsion motors 32 that are selectively movable in the longitudinal plane, and left or right for those that are selectively movable in the transverse plane. Furthermore, in the motor operation mode where operation of the selectively movable electric propulsion motor 32 is generating heat, the selectively movable electric propulsion motor 32 is more vertically oriented (e.g., substantially vertical) compared to the motor radial direction and position in the motor start mode where it receives more of the vertically oriented cooling airflow 108 resulting from vehicle movement, as described herein, and will therefore receive a greater cooling airflow, or be able to provide more motor heat removed by the cooling airflow to the passenger compartment, for example.

In one embodiment, as illustrated in FIGS. 1 and 5, for example, the electric vehicle 10 also comprises a vehicle suspension 98 configured to resiliently or springingly support the mass of the electric vehicle 10, including the mass of the vehicle chassis 12, as a sprung mass as is known in the art. The vehicle suspension 98 and vehicle wheels 100 comprise an unsprung mass of the electric vehicle 10 as is known in the art. The vehicle suspension 98 may comprise any suitable suspension component 102, including a plurality of shock absorbers 104 or struts corresponding to the plurality of vehicle wheels 100, and is configured to dampen impacts that result as the electric vehicle 10 is operated and moves over uneven ground surfaces, including various types of roadways or off-road paths or trails. In one embodiment, the electric vehicle 10 comprises a vehicle suspension 98 that includes a suspension component 102, such as a shock absorber 104 or strut, configured for motion in a substantially vertical plane, and the selectively movable electric propulsion motor 32 is configured to rotate the rotatable motor shaft 34 about the motor axis 36 to provide a motor torque in a plane that is substantially orthogonal to the substantially vertical plane.

Operation of the vehicle suspension 98, particularly while the electric vehicle 10 is loaded and moving, produces vibrations of various amplitudes and frequencies, which also result in harmonic (i.e., frequency) multiples of these frequencies, and which are referred to herein as vehicle suspension harmonics. Vehicle suspension harmonics may occur throughout the vehicle chassis 12, including within various of the vehicle components and systems disposed therein, and have resulted in a vehicle engineering discipline devoted to elimination or reduction of the noise, vibration and harshness (NVH) within electric vehicles 10. Similarly, operation of the selectively movable electric propulsion motor 32 or motors, particularly while the electric vehicle 10 is loaded and moving, also produces vibrations of various amplitudes and frequencies, which also resulting in harmonic (i.e., frequency) multiples of these frequencies, and which are referred to herein as electric propulsion motor harmonics. Electric propulsion motor harmonics may occur throughout the vehicle chassis 12 including within any of the various components and systems disclosed herein. In one embodiment, the selectively movable electric propulsion motor 32 is selectively movable from the first position and first direction ($d_1$) to the second position and second direction ($d_2$) to dampen (i.e., reduce and/or eliminate) an electric propulsion motor harmonic and/or a vehicle suspension harmonic.

In one embodiment, the electric vehicle 10 comprises a selectively movable electric propulsion motor 32 that is selectively movable from the first position and the first direction ($d_1$) to the second position and the second direction ($d_2$) as a function of a motor characteristic, a vehicle characteristic, a vehicle cabin characteristic, or a vehicle environmental characteristic. Any suitable motor characteristic of the selectively movable electric propulsion motor 32 may be used as a basis for moving from the first position and the first direction ($d_1$) to the second position and the second direction ($d_2$), including, for example, a motor current, a motor temperature, a motor load (e.g., torque output requirement), a motor speed or a motor speed command, a motor start condition (e.g., off/on) or a motor start condition command, or the like. Any suitable vehicle characteristic may be used as a basis for moving from the first position and the first direction ($d_1$) to the second position and the second direction ($d_2$), including, for example, a vehicle speed or a vehicle speed command, a vehicle acceleration or a vehicle acceleration command, a vehicle load (e.g., number and/or weight of occupants and cargo), a vehicle weight (e.g., an unloaded vehicle weight or a gross vehicle weight), a towed load weight, or the like. Any suitable vehicle cabin characteristic may be used as a basis for moving from the first position and the first direction ($d_1$) to the second position and the second direction ($d_2$), including, for example, a vehicle cabin temperature or a vehicle cabin temperature command, a vehicle cabin fan or a vehicle cabin fan command, a vehicle cabin air conditioning system condition (e.g., on/off) or a vehicle cabin air conditioning system condition command, a vehicle cabin infotainment system condition (e.g., on/off/sleep) or vehicle cabin infotainment system condition command, a vehicle seat temperature or a vehicle seat temperature command, a vehicle interior light condition (e.g., on/off) or a vehicle interior light command, or the like. Any suitable vehicle environmental characteristic (e.g., characteristic of the environment the vehicle is in) may be used as a basis for moving from the first position and the first direction ($d_1$) to the second position and the second direction ($d_2$), including, for example, a temperature of the environment, a precipitation condition of the environment (e.g., the presence or absence of rain, ice, snow, sleet, slush), a wind speed or direction, a roadway type (e.g., asphalt, cement, gravel, dirt, mud), or the like.

Figure 4B:
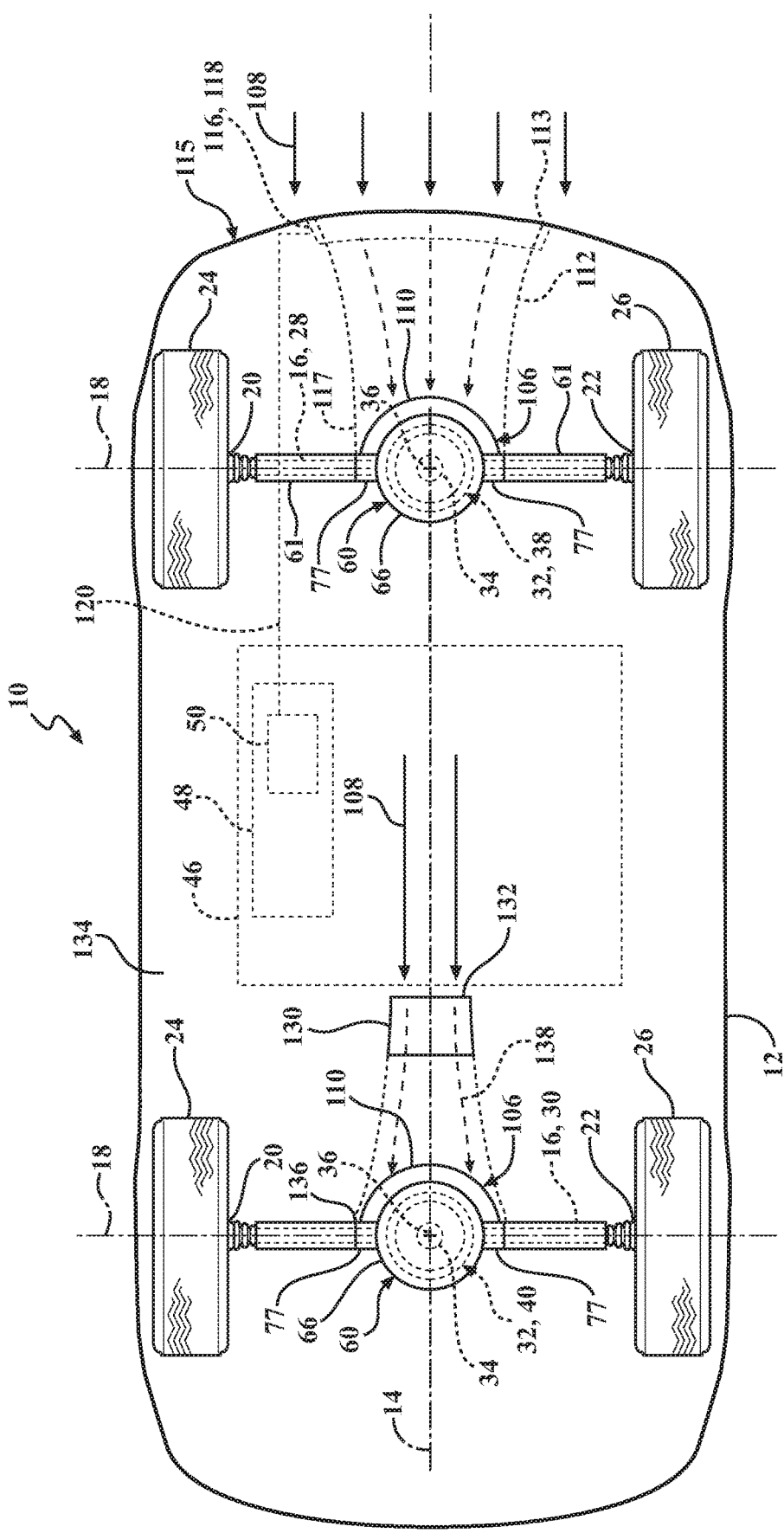
FIG. 4B is a schematic bottom view of the electric vehicle of FIG. 4B.

Referring to FIGS. 4A and 4B, in one embodiment, a heat dissipater 106, such as an axially-extending heat dissipater, is disposed on the selectively movable electric propulsion motor 32 facing toward the front of the electric vehicle 10 and extends along the motor axis 36. The heat dissipater 106 may comprise any suitable heat dissipater, including active heat dissipaters, such as various forms and types of closed loop, fluid-filled radiators that are filled with a recirculating heat transfer fluid or thermoelectric coolers, and also including passive heat dissipaters, such as various conductive metals formed to include a plurality of spaced apart heat transfer fins. The heat dissipater 106 is configured to extract heat generated by operation of the selectively movable electric propulsion motor 32, receive a vertically oriented cooling airflow 108, and dissipate the extracted heat by transferring it to the vertically oriented cooling airflow 108 through convection, conduction and radiation as is known in the art. In one embodiment, the axially extending heat dissipater 106 comprises a primary heat removal portion 110 that faces a front of the vehicle and is configured for air cooling from the vertically oriented cooling airflow 108 received from the front 115 of the electric vehicle 10. In one embodiment, the vertically oriented cooling airflow 108 is directed within a front air duct 112 disposed within the vehicle chassis 12 that extends from a front end 113 proximate the vehicle front to a motor end 117 proximate the selectively movable electric propulsion motor 32, the front air duct 112 comprising a vertically-extending section proximate the motor end 117 to provide a vertically-extending airflow 119 to the primary heat removal portion. In one embodiment, the electric vehicle 10 also comprises a selectively openable and closable airflow shutter 114 that is disposed proximate to and in fluid communication with the front end of the front air duct 112 and that is configured to selectively control the vertically oriented cooling airflow 108 within the front air duct 112. In one embodiment, the selectively openable and closable airflow shutter 114 comprises a plurality of individual shutter panels 121 joined together by a mechanical linkage or linkages 123 (e.g., disposed on the ends of the panels) that may be actuated by a shutter actuator 116 so that the shutter panels 121 may be partially opened/closed or completely opened/closed. In one embodiment, the shutter actuator 116 comprises an electric actuator, such as an electric motor or electric solenoid, that may be controlled by an shutter actuator position control input that may be provided as a control signal and may be transmitted either wirelessly or through a wired connection 120 to the shutter actuator 116 in a conventional manner in conjunction with a control algorithm that is executed as a computer program by a vehicle controller 48, such as the motor controller 50. In one embodiment, the vertically oriented cooling airflow 108 is also directed within a rear air duct 130 that is disposed within the vehicle chassis 12 that extends from an inlet end 132 proximate the bottom 134 of the vehicle chassis 12 to a rear motor end 136 proximate the selectively movable electric propulsion motor 32. The rear air duct 130 also comprises a rear vertically-extending section proximate the rear motor end 136 to provide a rear vertically-extending airflow 138 to the primary heat removal portion 110.

Referring to FIGS. 1-15, and particularly FIGS. 7-15, certain embodiments of electric vehicles 10 and hybrid electric vehicles 10 that include selectively movable electric propulsion motors 32 are disclosed. These electric vehicles 10 and hybrid electric vehicles 10 may include any of the elements described above and illustrated in FIGS. 1-6 in any combination. These embodiments of the electric vehicles 10 and hybrid electric vehicles 10 of FIGS. 7-15 are illustrated schematically without illustration of many of the elements described above in FIGS. 1-6, or are described by making reference to the elements of FIGS. 1-6, in order to simplify the description and illustration of the embodiments.

Referring to FIGS. 7A, 7B, and 8-15, in certain embodiments the electric vehicles 10 and hybrid electric vehicles 10 comprise the vehicle chassis 12 extending along the longitudinal axis 14 and a rotatable vehicle drive axle 16 disposed along the transverse axis or axes 18 and having opposed axle ends 20, 22 that are configured for attachment of a pair of opposed drive wheels 24, 26 as described above. The electric vehicles 10 and hybrid electric vehicles 10 also comprise the selectively movable electric propulsion motor 32 comprising the rotatable motor shaft 34 rotatable about the motor axis 36, the selectively movable electric propulsion motor 32 configured to be mounted within the vehicle chassis 12 and operatively coupled to the rotatable vehicle drive axle 16 and opposed drive wheels 24, 26. The selectively movable electric propulsion motor 32 and the motor axis 36 are configured to be oriented in a substantially vertical direction and movable with reference to the rotatable vehicle drive axle 16 as described herein. These embodiments comprise at least one selectively movable electric propulsion motor 32, and in several embodiments as illustrated in FIGS. 7A, 7B, and 8-15 comprise a plurality of selectively movable electric propulsion motors 32.

The electric vehicles 10 and hybrid electric vehicles 10 of these embodiments also comprise a selectively movable differential 60, or, alternately, selectively movable differential 60', disposed on the rotatable vehicle drive axle 16 and configured to operatively couple motive power of the selectively movable electric propulsion motor 32 that is transmitted to the rotatable motor shaft 34 to the rotatable vehicle drive axle 16. The selectively movable differential 60, or, alternately, selectively movable differential 60', may comprise any suitable type of differential, including an open differential as illustrated in FIG. 3, as well as other types of differentials including various locking differentials, welded/spool differentials, limited slip differentials (LSDs), such as mechanical clutch LSDs (e.g., one-way, one and a half-way, and two-way) and viscous (LSDs), torsen differentials, active differentials, and torque vectoring differentials.

The electric vehicles 10 and hybrid electric vehicles 10 of these embodiments also comprise a motor actuator 62 operatively coupled to the selectively movable electric propulsion motor 32 and the vehicle chassis 12 as described herein, the motor actuator is configured to selectively move the selectively movable electric propulsion motor 32 and the motor axis 36 from a first position comprising a first direction ($d_1$) of the motor axis 36 to a second position comprising a second direction ($d_2$) of the motor axis 36, the second position being separated from the first position by an angle ($\alpha$) as described herein.

The first direction ($d_1$) and the second direction ($d_2$) of the motor axis 36 may be disposed so as to be movable in a lateral plane or a longitudinal plane, and the rotatable vehicle drive axle 16 may comprise the front axle 28 or the rear axle 30.

In certain embodiments, the first direction ($d_1$) and the second direction ($d_2$) and the motor axis 36 are disposed and movable in a longitudinal plane that extends in a direction defined, for example, by the longitudinal axis 14 or longitudinal direction (L) and the vertical direction (V) as shown in FIGS. 7A and 8-15, for example. The orientation and direction of the longitudinal plane can be understood to be represented in the respective bottom views by longitudinal axis 14. In certain other embodiments, the first direction ($d_1$) and the second direction ($d_2$) and the motor axis 36 are disposed in a lateral or transverse plane that extends in a direction defined, for example by the transverse motor axis 19 or transverse direction (T) and the vertical direction (V) as illustrated in FIG. 7B, for example. The orientation and direction of the lateral plane can be understood to be represented in the respective bottom views by transverse motor axis 19.

The lateral movement of the selectively movable electric propulsion motor 32 may be accomplished in the various embodiments of FIGS. 7A, 7B, and 8-15, for example, as shown in an exemplary manner in FIG. 7B by moving the selectively movable electric propulsion motor 32 and motor axis and the selectively movable differential 60' forward (FIG. 7B) or rearward (not shown) of the rotatable vehicle drive axle 16 and transverse axis 18. The selectively movable differential 60' may have essentially the same construction as selectively movable differential 60 shown in FIG. 3, except that it has a single rotatable output shaft rather than rotatable vehicle drive axles 16 as outputs, as found in selectively movable differential 60, and a single protruding cylindrical axle portion 77' rotatably joined to output axle housing by a single bearing 75 (see FIG. 6) as described herein to allow rotation of the selectively movable electric propulsion motor 32 about the output shaft axis by a motor actuator 62 (see FIG. 2A). The rotatable output shaft acts as an input drive shaft to a differential that may be of conventional construction and operation and is configured to be operatively attached to the rotatable vehicle drive axle 16 in a conventional manner. The differential may comprise any suitable type of differential, including an open differential as illustrated in FIG. 3, as well as other types of differentials including various locking differentials, welded/spool differentials, limited slip differentials (LSDs), such as mechanical clutch LSDs, (e.g., one-way, one and a half-way, and two-way) and viscous LSDs, torsen differentials, active differentials, and torque vectoring differentials. Thus, the motive power of the selectively movable electric propulsion motor 32 is transferred to the rotatable vehicle drive axle 16 through the selectively movable differential 60' and rotatable output shaft to differential.

In one embodiment of the electric vehicle 10 the first direction ($d_1$) and the second direction ($d_2$) are disposed in a lateral plane as illustrated in FIG. 7B. This embodiment comprises two selectively movable electric propulsion motors 32 disposed on one rotatable vehicle drive axle 16, which comprises a front axle 28. In addition to the selectively movable electric propulsion motor 32 with the first direction ($d_1$) and the second direction ($d_2$) disposed in a lateral plane, selectively movable differential 60', motor actuator 62 (see FIG. 2A), the embodiment of FIG. 7B comprises a second selectively movable electric propulsion motor 32 comprising a second rotatable motor shaft 34 rotatable about a second motor axis 36 on the same rotatable vehicle drive axle 16. One of ordinary skill will understand that reference to the selectively movable electric propulsion motor 32 and second selectively movable electric propulsion motor 32 and their elements and the components attached to them is merely indicative that there are two of them with their elements and the components attached to them, and that their relative positions on the rotatable vehicle drive axle 16 are interchangeable. The second selectively movable electric propulsion motor 32 is configured to be mounted within the vehicle chassis 12 laterally spaced apart from the selectively movable electric propulsion motor 32 and operatively coupled to the rotatable vehicle drive axle 16 and opposed drive wheels 24, 26. The second selectively movable electric propulsion motor 32 and the second motor axis 36 are configured to be oriented in a substantially vertical direction and movable in a lateral plane with reference to the rotatable vehicle drive axle 16. This embodiment also comprises a second selectively movable differential 60' disposed on the rotatable vehicle drive axle 16 and configured to operatively couple motive power of the second selectively movable electric propulsion motor 32 that is transmitted to the second rotatable motor shaft 34 to the rotatable vehicle drive axle 16. This embodiment also comprises a second motor actuator 62 (see FIG. 2A) operatively coupled to the second selectively movable electric propulsion motor 32 and the vehicle chassis 12. The second motor actuator 62 (see FIG. 2A) is configured to selectively move the selectively movable electric propulsion motor 32 and the second motor axis 36 from a first position comprising a first direction ($d_1$) of the second motor axis 36 to a second position comprising a second direction ($d_2$) of the second motor axis 36, the second position being separated from the first position of the second motor axis 36 by an angle ($\alpha$). The first direction ($d_1$) and second direction ($d_2$) of the second motor axis 36 are also disposed in a second lateral plane. In one embodiment of the electric vehicle 10, as illustrated in FIG. 7B, the selectively movable electric propulsion motor 32 and the second selectively movable electric propulsion motor 32 are configured to be moved and positioned independently, and may be moved and positioned to affect the vehicle performance as described herein. The selectively movable electric propulsion motor 32 and the second selectively movable electric propulsion motor 32 may be the same (e.g., same motor capacity, motor type, torque output, and the like) or may be different. One of ordinary skill will understand that any of the embodiments of FIG. 8-15 may alternately also comprise a selectively movable electric propulsion motor 32 that is movable in a lateral plane as described above.

Figure 7A:
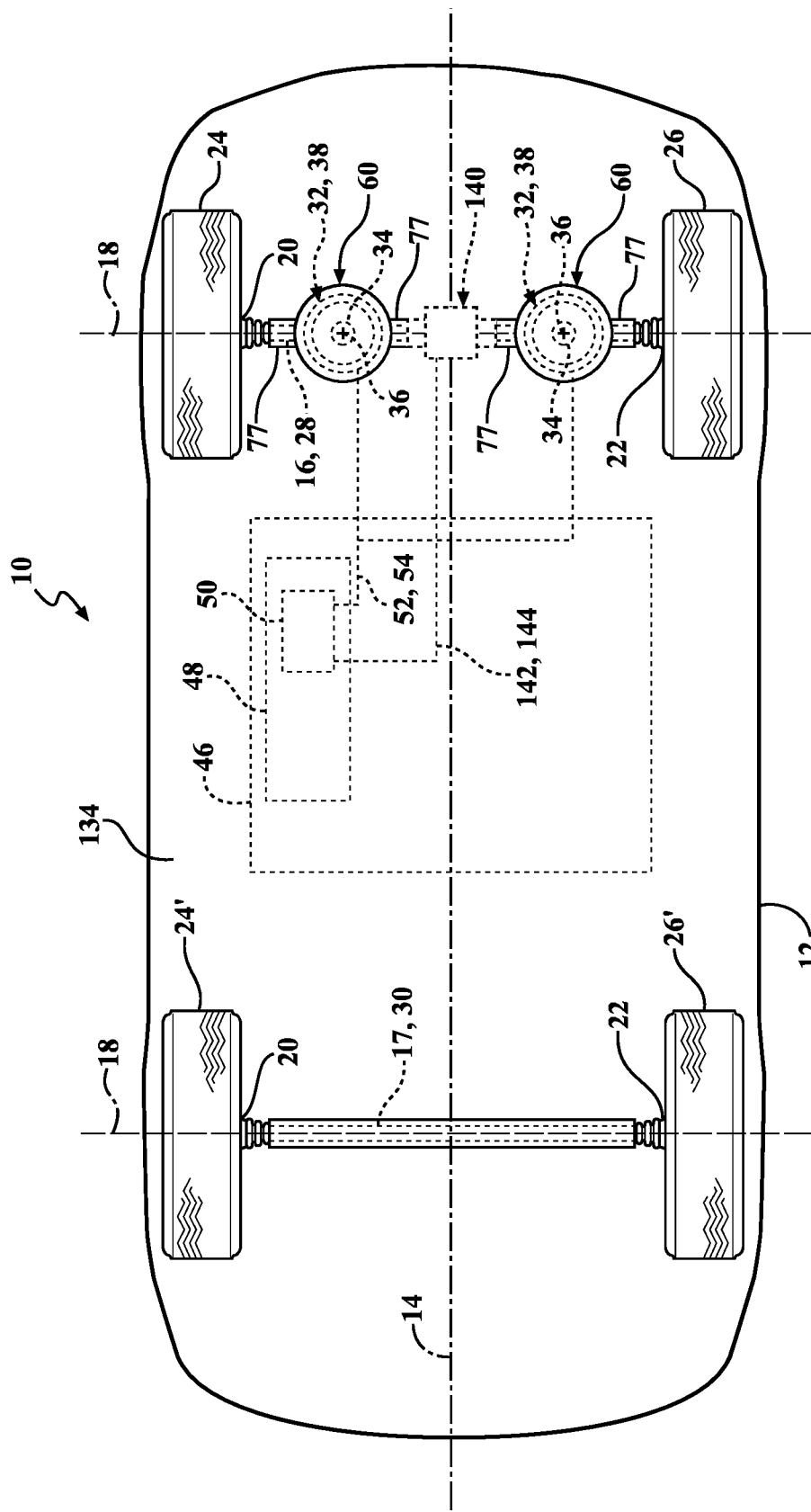
FIG. 7A is a schematic bottom view of an embodiment an electric vehicle comprising two selectively movable vertical electric propulsion motors operatively coupled to a front rotatable vehicle drive axle, the vehicle comprising a front wheel drive (FWD) vehicle, the selectively movable vertical electric propulsion motors configured for movement in respective longitudinal planes.
Figure 7B:
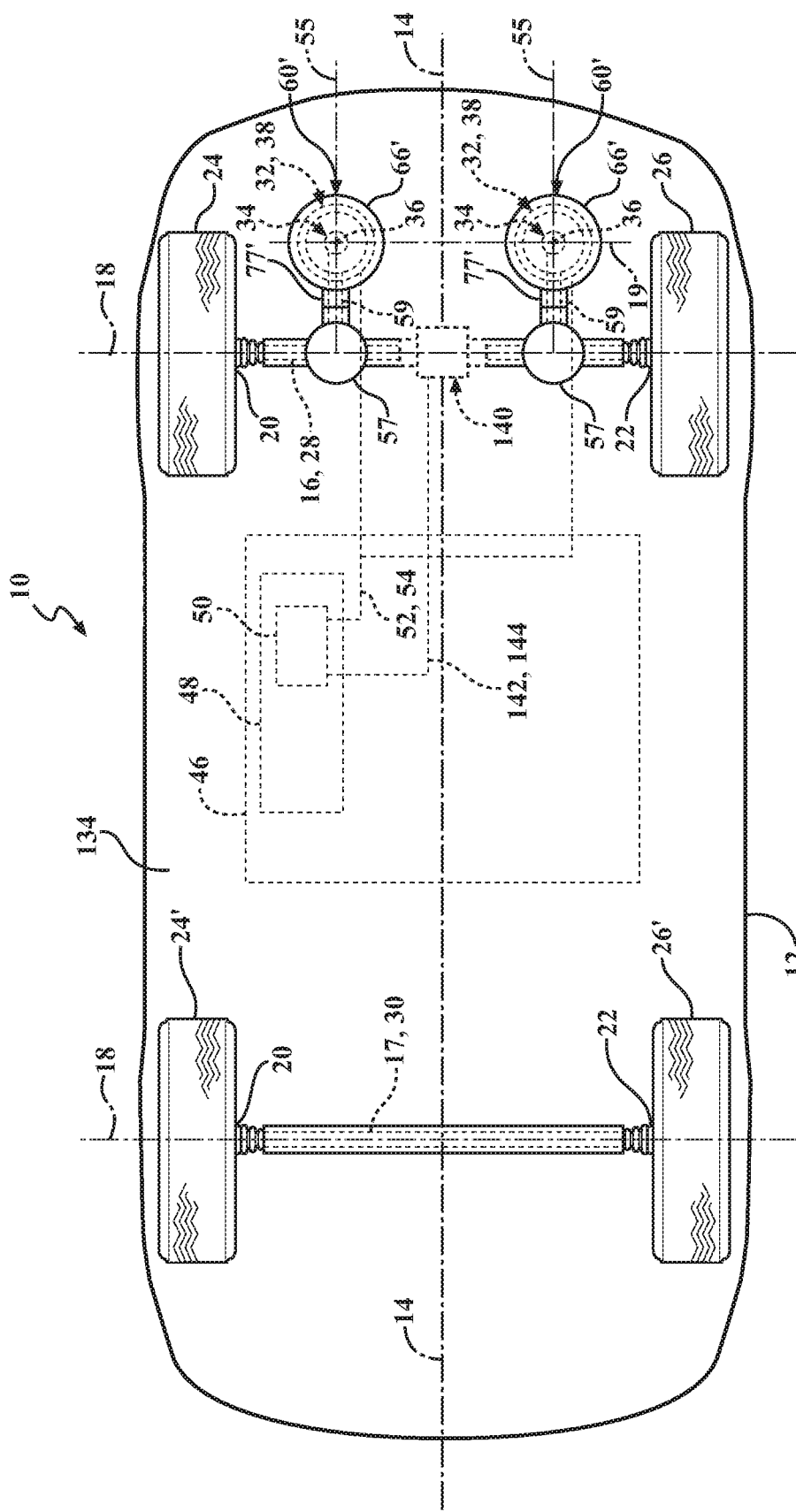
FIG. 7B is a schematic bottom view of an embodiment an electric vehicle comprising two selectively movable vertical electric propulsion motors operatively coupled to a front rotatable vehicle drive axle, the vehicle comprising a front wheel drive (FWD) vehicle, the selectively movable vertical electric propulsion motors configured for movement in respective lateral planes.
Figure 8:
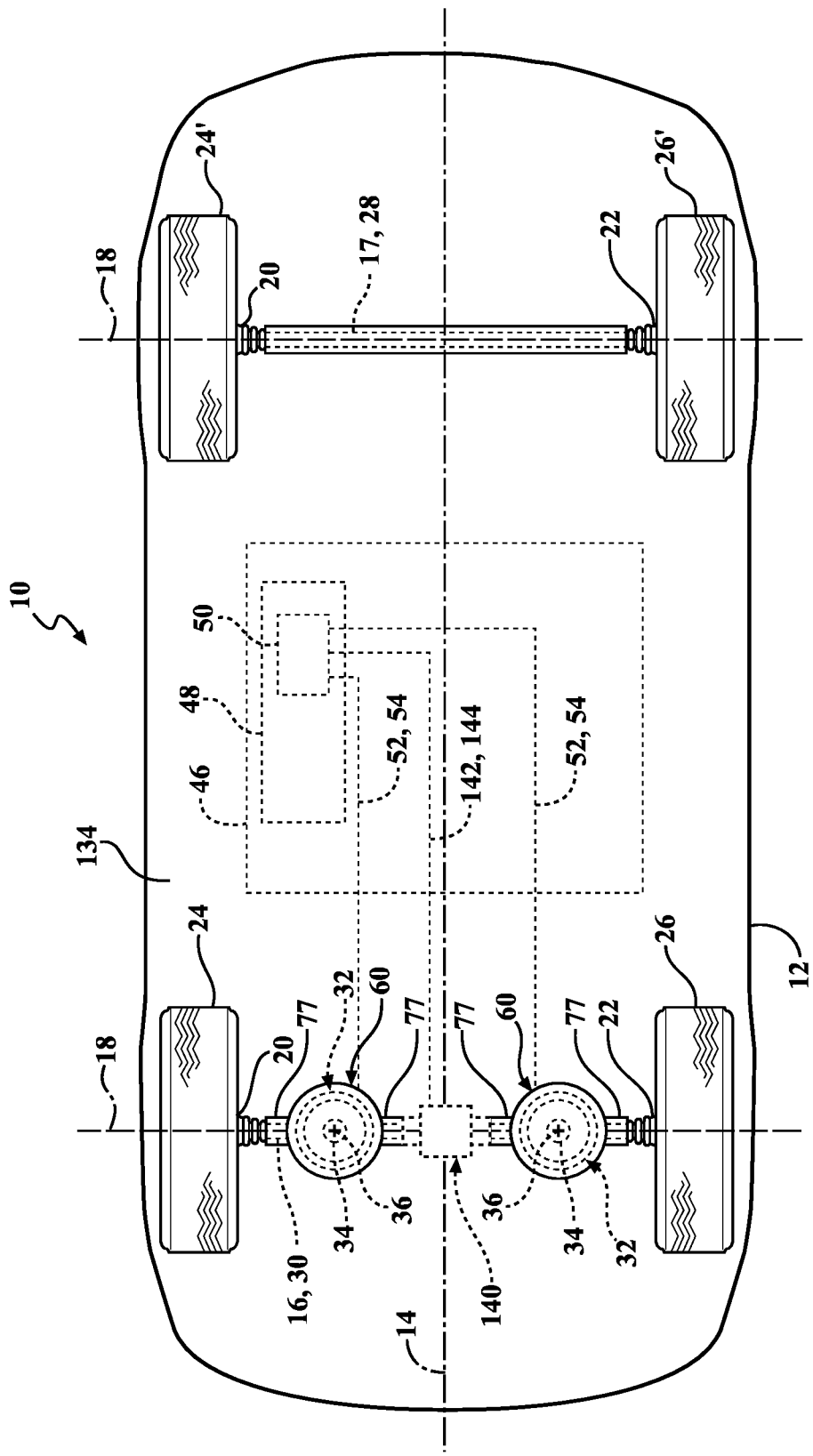
FIG. 8 is a schematic bottom view of an embodiment an electric vehicle comprising two selectively movable vertical electric propulsion motors operatively coupled to a rear rotatable vehicle drive axle, the vehicle comprising a rear wheel drive (RWD) vehicle.
Figure 9:
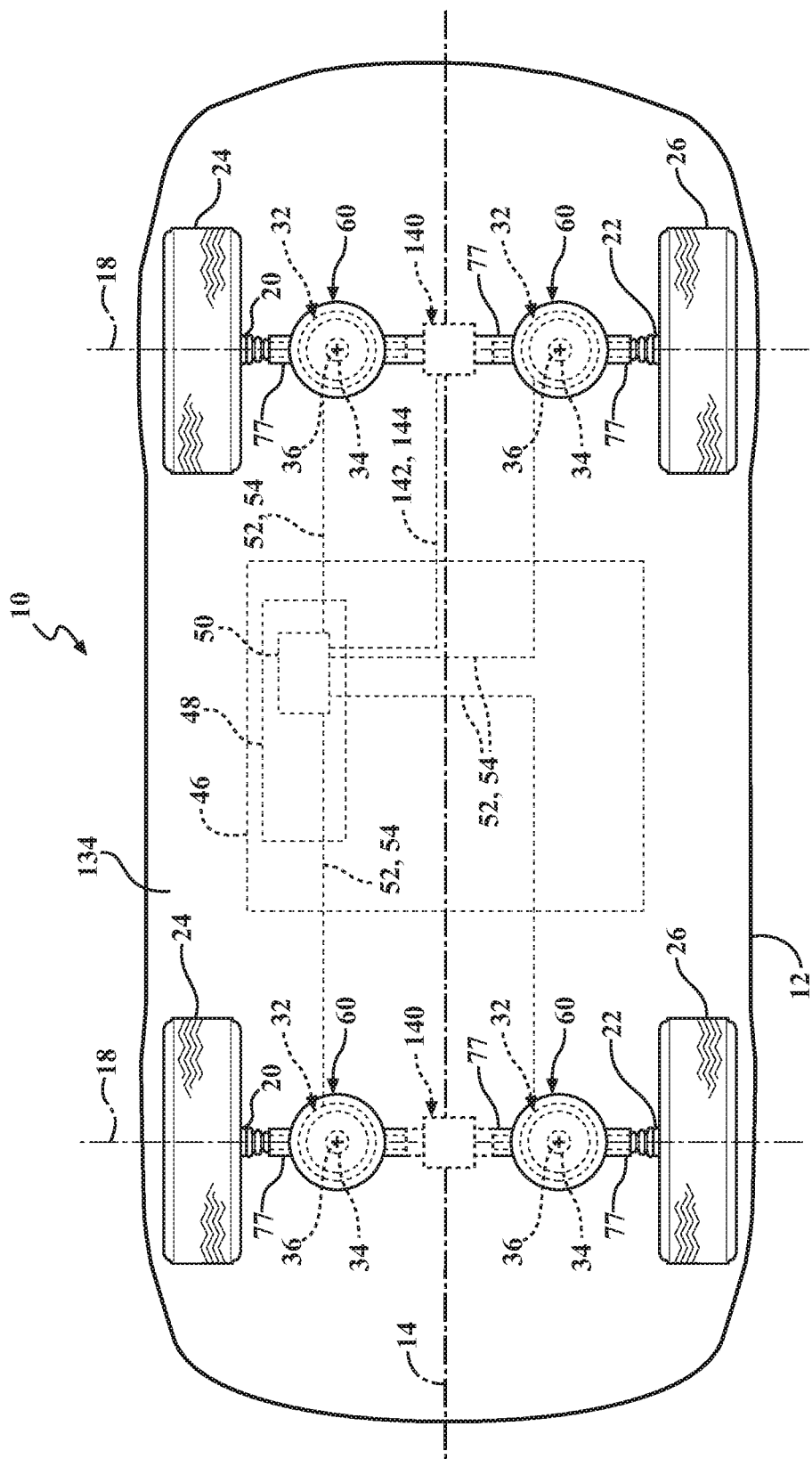
FIG. 9 is a schematic bottom view of an embodiment an electric vehicle comprising two selectively movable vertical electric propulsion motors operatively coupled to a front rotatable vehicle drive axle and two selectively movable vertical electric propulsion motors operatively coupled to a rear rotatable vehicle drive axle, the vehicle comprising an all-wheel drive (AWD) or four-wheel drive (4WD) vehicle.

In certain embodiments of the electric vehicle 10 the first direction ($d_1$) and the second direction ($d_2$) are disposed in a longitudinal plane as illustrated, for example, in FIGS. 7A, 8, and 9. These embodiments comprise at least two selectively movable electric propulsion motors 32 disposed on one rotatable vehicle drive axle 16, which comprises the front axle 28 (e.g., FIG. 7A) in an FWD electric vehicle 10, or the rear axle 30 (e.g., FIG. 8) in an RWD electric vehicle 10, or both the front axle 28 and the rear axle 30 (e.g., FIG. 9) in an AWD or 4WD vehicle. In addition to the selectively movable electric propulsion motor 32 with the first direction ($d_1$) and the second direction ($d_2$) disposed in a longitudinal plane, selectively movable differential 60, motor actuator 62 (see FIG. 2A), the embodiments of FIGS. 7A, 8, and 9 comprise a second selectively movable electric propulsion motor 32 comprising a second rotatable motor shaft 34 rotatable about a second motor axis 36 on the same rotatable vehicle drive axle 16. One of ordinary skill will understand that reference to the selectively movable electric propulsion motor 32 and second selectively movable electric propulsion motor 32 and their elements and the components attached to them is merely indicative that there are two of them with their elements and the components attached to them, and that their relative positions on the rotatable vehicle drive axle 16 are interchangeable. The second selectively movable electric propulsion motor 32 is configured to be mounted within the vehicle chassis 12 laterally spaced apart from the selectively movable electric propulsion motor 32 and operatively coupled to the rotatable vehicle drive axle 16 and opposed drive wheels 24, 26. The second selectively movable electric propulsion motor 32 and the second motor axis 36 are configured to be oriented in a substantially vertical direction and movable with reference to the rotatable vehicle drive axle 16. This embodiment also comprises a second selectively movable differential 60 disposed on the rotatable vehicle drive axle 16 and configured to operatively couple motive power of the second selectively movable electric propulsion motor 32 that is transmitted to the second rotatable motor shaft 34 to the rotatable vehicle drive axle 16. This embodiment also comprises a second motor actuator 62 (see FIG. 2A) operatively coupled to the second selectively movable electric propulsion motor 32 and the vehicle chassis 12. The second motor actuator 62 (see FIG. 2A) is configured to selectively move the selectively movable electric propulsion motor 32 and the second motor axis 36 from a first position comprising a first direction ($d_1$) of the second motor axis 36 to a second position comprising a second direction ($d_2$) of the second motor axis 36, the second position being separated from the first position of the second motor axis 36 by an angle ($\alpha$). The first direction ($d_1$) and the second direction ($d_2$) of the second motor axis 36 are disposed in a second longitudinal plane. In the embodiments of the electric vehicle 10 illustrated in FIGS. 7A, 8, and 9 the selectively movable electric propulsion motor 32 and the second selectively movable electric propulsion motor 32 are configured to be moved and positioned independently, and may be moved and positioned to affect the vehicle performance as described herein. The selectively movable electric propulsion motor 32 and the second selectively movable electric propulsion motor 32 may be the same or may be different as described herein.

In certain embodiments, including the embodiments of FIGS. 7A, 7B, 8 and 9, the rotatable vehicle drive axle 16 may comprise a discontinuous axle and the selectively movable differential 60, or alternately the selectively movable differential 60', and second selectively movable differential 60, or alternately the second selectively movable differential 60', are configured to be operatively coupled to respective ones of the opposed drive wheels 24, 26. Alternately, in certain other embodiments, including the embodiments of FIGS. 7A, 7B, 8, and 9, the rotatable vehicle drive axle 16 may comprise a continuous axle and the selectively movable differential 60, or alternately the selectively movable differential 60', and second selectively movable differential 60, or alternately the second selectively movable differential 60', are configured to be operatively coupled to respective ones of the opposed drive wheels 24, 26 and are configured to be operatively coupled to one another through a clutch 140. The clutch 140 may comprise any suitable type of clutch, including various wet (e.g., hydraulic or electrohydraulic clutches) as well as various one-way or two-way clutches, including various selectable clutches, including electrically selectable or actuable, one-way clutches 140 or two-way clutches 140. The power may be supplied to an electrically selectable or actuable clutch 140 by any suitable electrical power and/or signal communication device 142, such as a clutch power bus 144 that comprises an electrical conductor configured to electrically communicate electrical power from a suitable vehicle controller 48. The clutch 140 may be used to control the combination of the torque outputs of the selectively movable electric propulsion motor 32 and second selectively movable electric propulsion motor 32 and control the torque outputs to the respective opposed drive wheels 24, 26. For example, the clutch 140 allows the torque output of the selectively movable electric propulsion motor 32 and/or the second selectively movable electric propulsion motor 32 to be provided to the opposed drive wheels 24, 26 in any proportion. As such, either the selectively movable electric propulsion motor 32 or the second selectively movable electric propulsion motor 32 may provide torque to both of the opposed drive wheels 24, 26 without the contribution of the other. Similarly, the clutch 140 may be used to provide the entire torque contribution of both the selectively movable electric propulsion motor 32 and the second selectively movable electric propulsion motor 32 to either of the opposed drive wheels 24, 26, or to divide their combined torque outputs between the opposed drive wheels 24, 26 in any proportion, including equally.

Referring to the embodiment of FIG. 9, the electric vehicle 10 may comprise a second rotatable vehicle drive axle longitudinally spaced apart from the rotatable vehicle drive axle that is disposed along a second transverse axis 18 and that has opposed second axle ends 20, 22 that are configured for attachment of a pair of opposed second drive wheels 24, 26. Again, reference to rotatable vehicle drive axle and second rotatable vehicle drive axle and their elements and the components attached to them is merely indicative that there are two of them with their elements and the components attached to them, and that their relative positions on the electric vehicle as the front axle or the rear axle are interchangeable. This embodiment comprises a third selectively movable electric propulsion motor 32 comprising a rotatable third motor shaft 34 rotatable about a third motor axis 36. The third selectively movable electric propulsion motor 32 is configured to be mounted within the vehicle chassis 12 and operatively coupled to the second rotatable vehicle drive axle 16 and opposed second drive wheels 24, 26. The third selectively movable electric propulsion motor 32 and the third motor axis 36 are configured to be oriented in a substantially vertical direction and movable with reference to the second rotatable vehicle drive axle. This embodiment comprises a third selectively movable differential 60 disposed on the second rotatable vehicle drive axle and configured to operatively couple motive power of the third selectively movable electric propulsion motor 32 that is transmitted to the third rotatable motor shaft 34 to the second rotatable vehicle drive axle. This embodiment also comprises a third motor actuator 62 (see FIG. 2A) operatively coupled to the third selectively movable electric propulsion motor 32 and the vehicle chassis 12. The third motor actuator 62 (see FIG. 2A) is configured to selectively move the third selectively movable electric propulsion motor 32 and the third motor axis 36 from a first position comprising a first direction ($d_1$) of the third motor axis 36 to a second position comprising a second direction ($d_2$) of the third motor axis 36, the second position being separated from the first position by an angle ($\alpha$), the first direction ($d_1$) and the second direction ($d_2$) of the third motor axis 36 disposed in a third longitudinal plane. Thus, FIG. 9 illustrates a three motor configuration with the selectively movable electric propulsion motor 32 and second selectively movable electric propulsion motor 32 on one rotatable vehicle drive axle and the third selectively movable electric propulsion motor 32 on another rotatable vehicle drive axle. A three motor configuration may be used for any number of vehicle applications, including to provide a two-wheel drive vehicle by energizing only one of the rotatable vehicle drive axles (e.g., front axle to provide an FWD electric vehicle 10 or rear axle to provide an RWD electric vehicle 10) for certain driving conditions (e.g., city driving, dry roads, or light vehicle loads), and then in addition selectively energizing the other of the rotatable vehicle drive axles to provide an AWD electric vehicle 10 for certain other driving conditions (e.g., highway or off-road driving, wet, snow, or ice covered roads, heavy vehicle loads, or towing). A three motor configuration may be used for example, for relatively small to medium gross vehicle weight vehicles, such as small to mid-size SUVs, mid-size and light duty full-size pickup trucks, minivans vans, and the like.

Referring to the embodiment of FIG. 9, the electric vehicle 10 may further comprise a fourth selectively movable electric propulsion motor 32 comprising a fourth rotatable motor shaft 34 rotatable about a fourth motor axis 36. The fourth selectively movable electric propulsion motor 32 is configured to be mounted within the vehicle chassis 12 laterally spaced apart from the third selectively movable electric propulsion motor 32 and operatively coupled to the second rotatable vehicle drive axle and opposed second drive wheels 24, 26. The fourth selectively movable electric propulsion motor 32 and the fourth motor axis 36 are configured to be oriented in a substantially vertical direction and movable with reference to the second rotatable vehicle drive axle. This embodiment comprises a fourth selectively movable differential 60 disposed on the second rotatable vehicle drive axle and configured to operatively couple motive power of the fourth selectively movable electric propulsion motor 32 that is transmitted to the fourth rotatable motor shaft 34 to the second rotatable vehicle drive axle. This embodiment also comprises a fourth motor actuator 62 (see FIG. 2A) operatively coupled to the fourth selectively movable electric propulsion motor 32 and the vehicle chassis 12, the fourth motor actuator configured to selectively move the fourth selectively movable electric propulsion motor 32 and the fourth motor axis 36 from a first position comprising a first direction ($d_1$) of the fourth motor axis 36 to a second position comprising a second direction ($d_2$) of the fourth motor axis 36, the second position being separated from the first position of the fourth motor axis 36 by an angle ($\alpha$), the first direction ($d_1$), and second direction ($d_2$) of the fourth motor axis 36 disposed in a fourth longitudinal plane. In the embodiments of the electric vehicle 10 illustrated in FIG. 9, the third selectively movable electric propulsion motor 32 and the fourth selectively movable electric propulsion motor 32 are configured to be moved and positioned independently, and may be moved and positioned to affect the vehicle performance as described herein. The third selectively movable electric propulsion motor 32 and the fourth selectively movable electric propulsion motor 32 may be the same or may be different as described herein, and may be the same as or different from the selectively movable electric propulsion motor 32 and the second selectively movable electric propulsion motor 32. A four motor configuration may be used for any number of vehicle applications, including to provide a two-wheel drive vehicle by energizing only one of the rotatable vehicle drive axles (e.g., front axle to provide an FWD electric vehicle 10 or rear axle to provide an RWD electric vehicle 10) for certain driving conditions (e.g., city driving, dry roads, or light vehicle loads), and then in addition selectively energizing the other of the rotatable vehicle drive axles to provide an AWD electric vehicle 10 for certain other driving conditions (e.g., highway or off-road driving, wet, snow, or ice covered roads, heavy vehicle loads, or towing). A four motor configuration may be used for example, for relatively large gross vehicle weight vehicles, such as large SUVs, full-size pickup trucks, cargo vans, and the like.

In certain embodiments, including the embodiments of FIG. 9, the second rotatable vehicle drive axle may comprise a discontinuous axle and the third selectively movable differential 60, or alternately the third selectively movable differential 60', and fourth selectively movable differential 60, or alternately the fourth selectively movable differential 60', are configured to be operatively coupled to respective ones of the opposed drive wheels 24, 26. Alternately, in certain other embodiments, including the embodiments of FIG. 9, the rotatable vehicle drive axle may comprise a continuous axle and the third selectively movable differential 60, or alternately the third selectively movable differential 60', and fourth selectively movable differential 60, or alternately the fourth selectively movable differential 60', are configured to be operatively coupled to respective ones of the opposed drive wheels 24, 26 and are configured to be operatively coupled to one another through a second clutch 140. The second clutch 140 may also comprise any suitable type of clutch as described herein, and may be the same as or different from the clutch 140. The second clutch 140 may be powered, operated, and controlled in the same manner as described herein for clutch 140.

The selectively movable electric propulsion motor 32, as well as the second selectively movable electric propulsion motor 32, third selectively movable electric propulsion motor 32, and fourth selectively movable electric propulsion motor 32, may all be powered and controlled as described herein for selectively movable electric propulsion motor 32, and may be powered and controlled independently, or dependently in any combination.

Referring to the embodiments of FIGS. 10-15, the electric vehicle 10 comprising the selectively movable electric propulsion motor 32 described herein may further comprise an internal combustion engine 35 that is configured to be disposed within the vehicle chassis 12.

Figure 10:
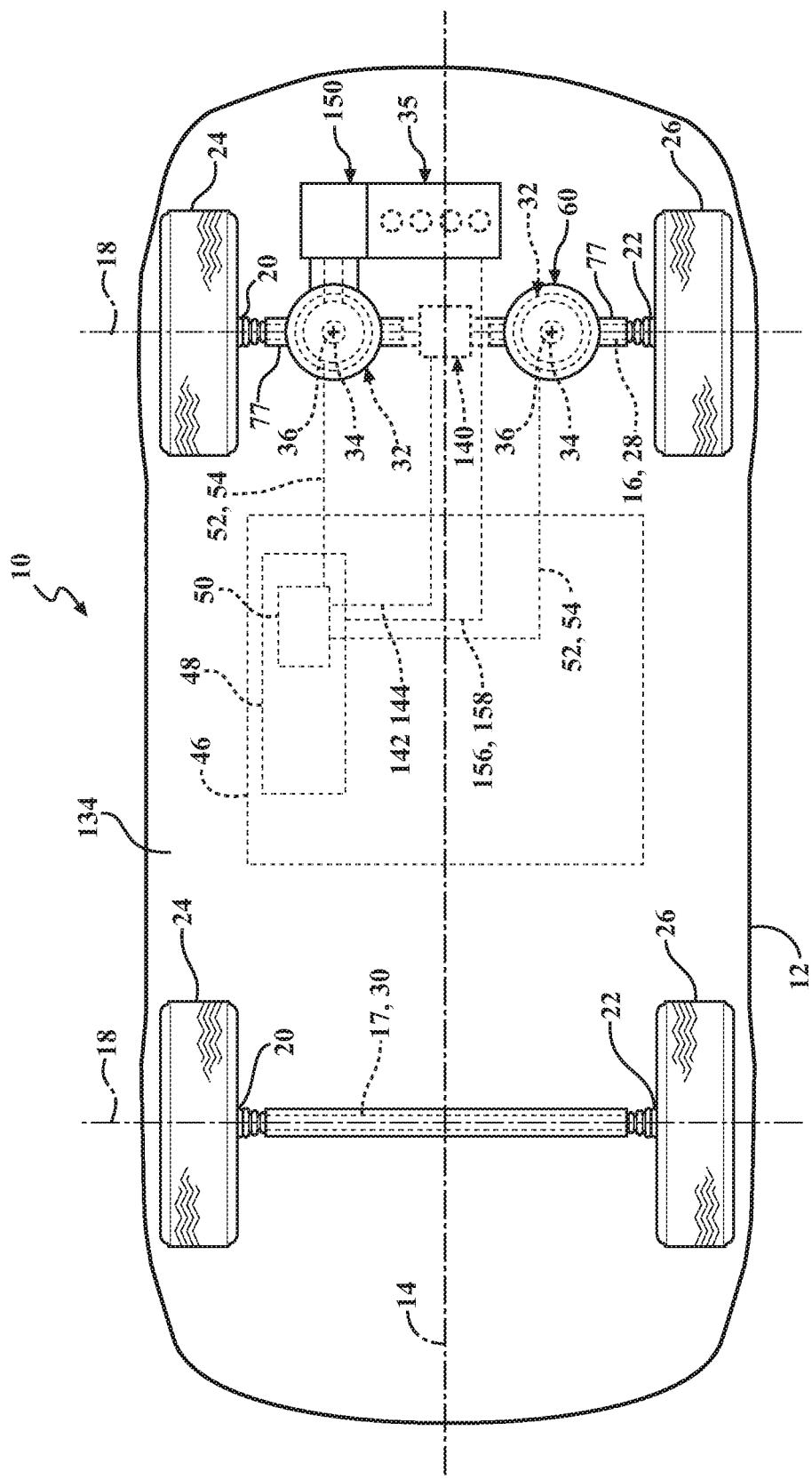
FIG. 10 is a schematic bottom view of an embodiment a hybrid electric vehicle comprising a selectively movable vertical electric propulsion motor and an internal combustion engine operatively coupled to a front rotatable vehicle drive axle, the vehicle comprising a FWD vehicle.
Figure 11:
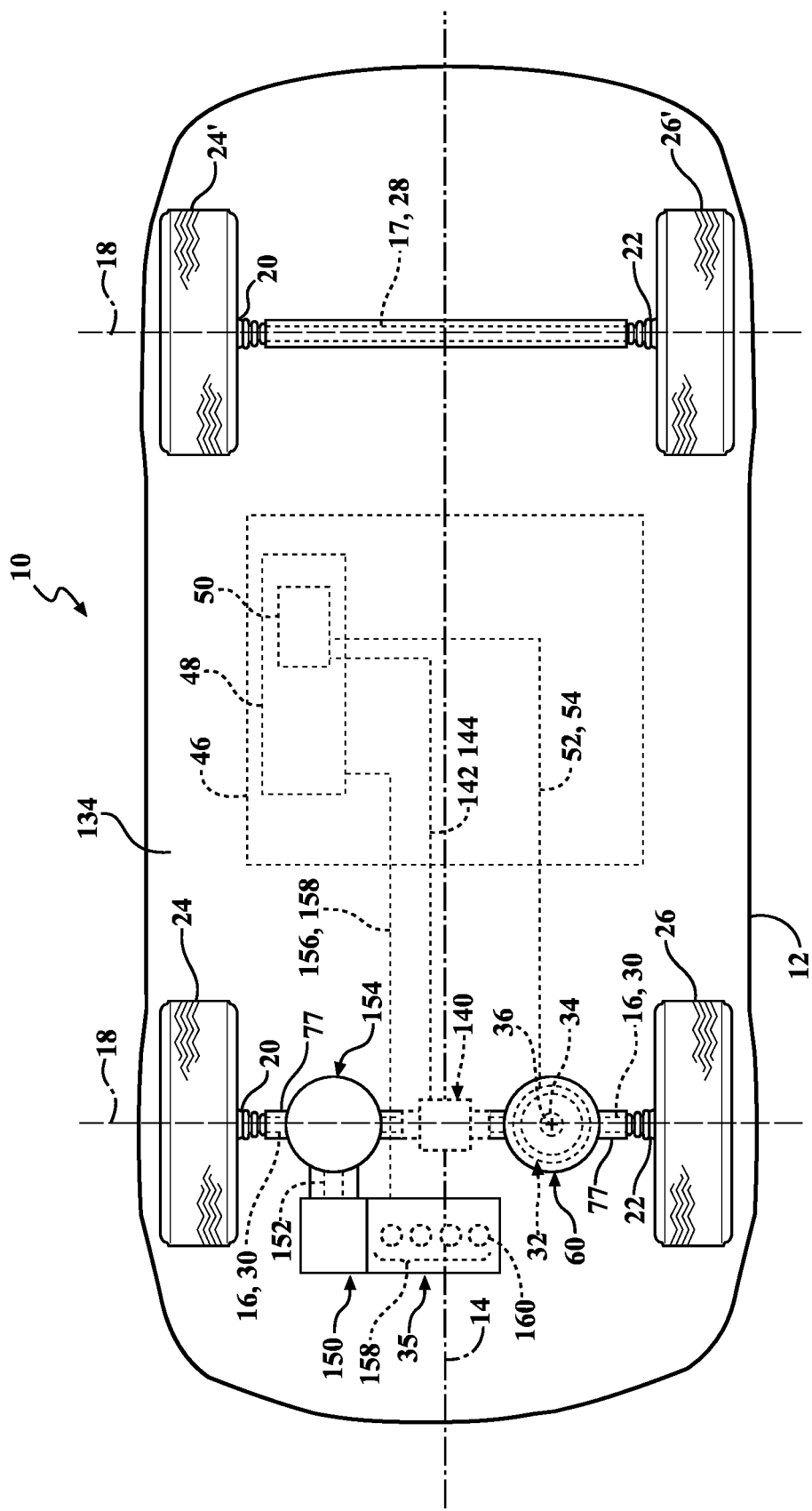
FIG. 11 is a schematic bottom view of an embodiment a hybrid electric vehicle comprising a selectively movable vertical electric propulsion motor and an internal combustion engine operatively coupled to a rear rotatable vehicle drive axle, the vehicle comprising an RWD vehicle.

Referring to FIGS. 10 and 11, in one embodiment, the internal combustion engine 35 is disposed proximate to and is configured to provide motive power to the rotatable vehicle drive axle 16 together with the selectively movable electric propulsion motor 32. The internal combustion engine 35 comprises a row or bank 158, or a plurality of rows or banks 158, of cylinders 160. The internal combustion engine may comprise any suitable type of internal combustion engine 35 with any suitable number of cylinders 160 (e.g., 4-10), including various diesel and gasoline engine configurations, and may be mounted with the cylinder bank or banks 158 oriented transversely as shown in FIGS. 10 and 11 or longitudinally (not shown). The operation of the internal combustion engine 35 may be controlled using a vehicle controller 48 in a conventional manner. The rotatable vehicle drive axle 16 may comprise the front axle 28 (FIG. 10) or the rear axle 30 (FIG. 11). The internal combustion engine 35 may be operatively coupled to the rotatable vehicle drive axle 16 through the transmission 150 that provides a torque output through the rotatable drive shaft 152 to the engine differential 154 that may be of conventional construction and operation and is configured to be operatively attached to the rotatable vehicle drive axle 16 in a conventional manner. The engine differential 154 may comprise any suitable type of differential, including an open differential as illustrated in FIG. 3, as well as other types of differentials including various locking differentials, welded/spool differentials, limited slip differentials (LSDs), such as mechanical clutch LSDs (e.g., one-way, one and a half-way, and two-way) and viscous LSDs, torsen differentials, active differentials, and torque vectoring differentials. Thus, the motive power of the internal combustion engine 35 is transferred to the rotatable vehicle drive axle 16 through the transmission 150 and rotatable drive shaft 152 to engine differential 154.

Figure 12:
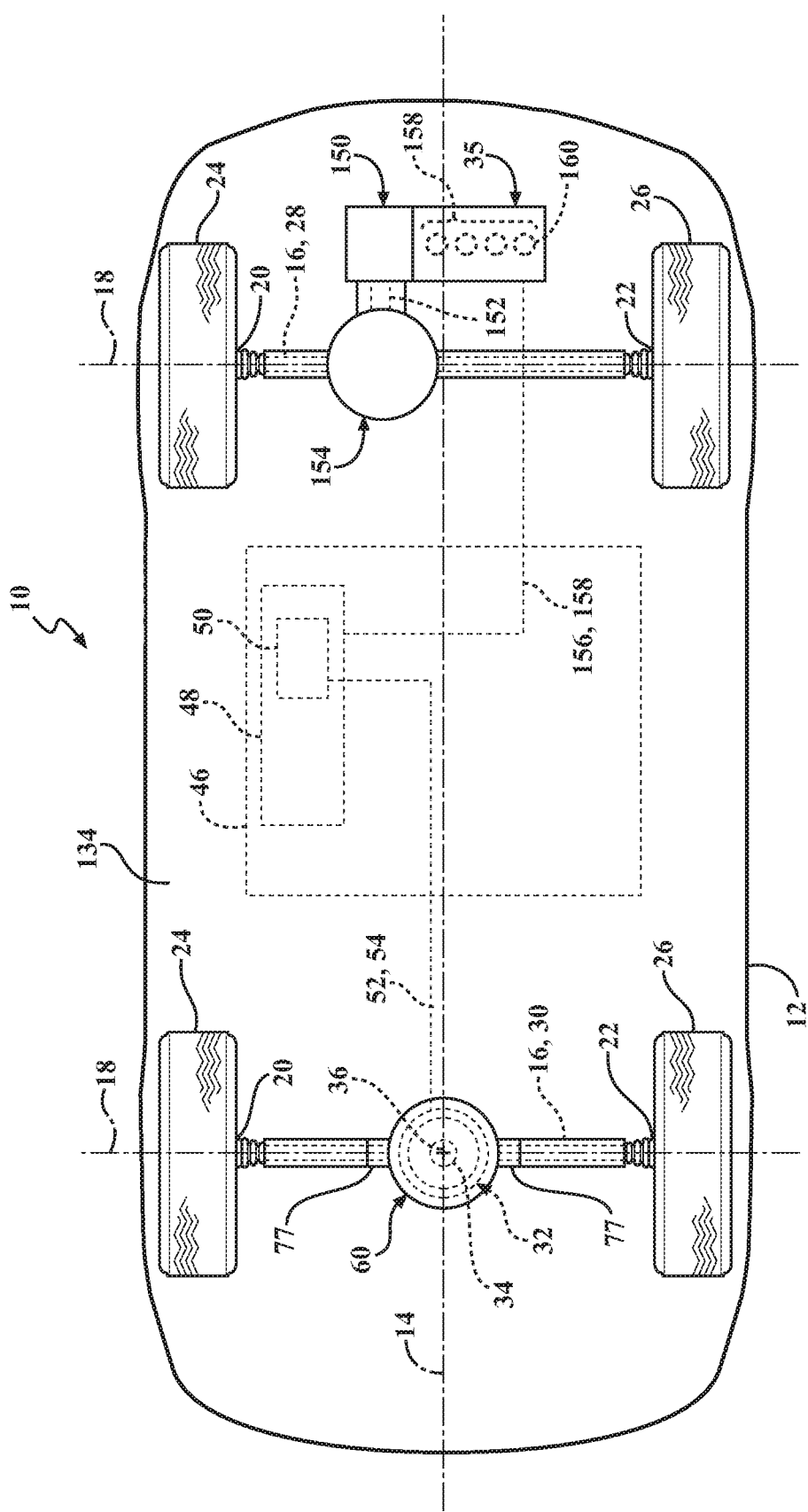
FIG. 12 is a schematic bottom view of an embodiment a hybrid electric vehicle comprising an internal combustion engine operatively coupled to a front rotatable vehicle drive axle and a selectively movable vertical electric propulsion motor operatively coupled to a rear rotatable vehicle drive axle, the hybrid electric vehicle comprising an AWD or 4WD vehicle.

In certain embodiments, including the embodiments of FIGS. 11 and 12, the rotatable vehicle drive axle 16 may comprise a discontinuous axle and the selectively movable differential 60 and engine differential 154 are configured to be operatively coupled to respective ones of the opposed drive wheels 24, 26. Alternately, in certain other embodiments, including the embodiments of FIGS. 11 and 12, the rotatable vehicle drive axle 16 may comprise a continuous axle and the selectively movable differential 60 and the engine differential 154 are configured to be operatively coupled to respective ones of the opposed drive wheels 24, 26 and are configured to be operatively coupled to one another through the clutch 140. The clutch 140 may also comprise any suitable type of clutch as described herein, and may be powered, operated, and controlled in the same manner as described herein.

Figure 13:
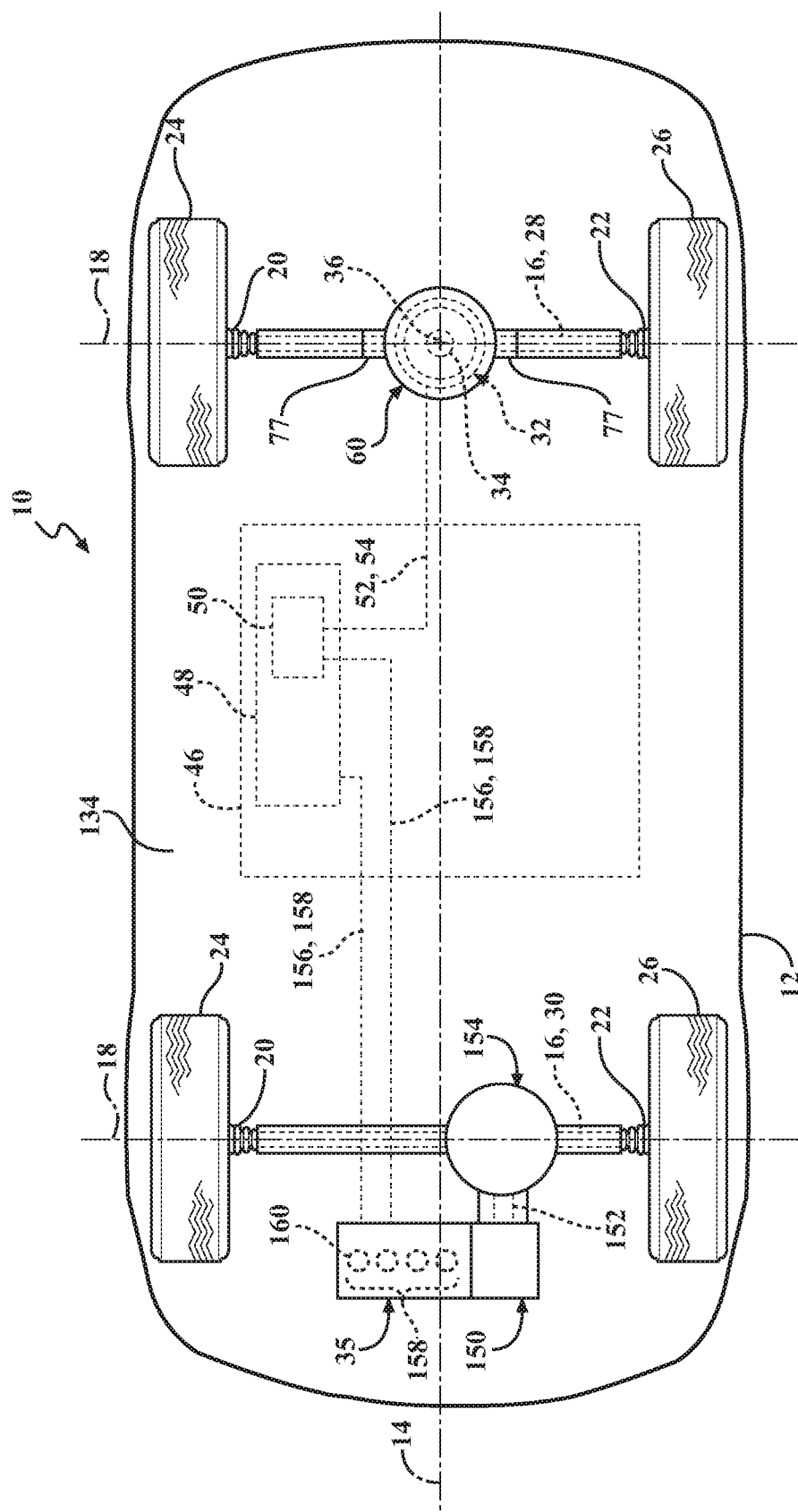
FIG. 13 is a schematic bottom view of an embodiment a hybrid electric vehicle comprising a selectively movable vertical electric propulsion motor operatively coupled to a rear rotatable vehicle drive axle and an internal combustion engine operatively coupled to a rear rotatable vehicle drive axle, the hybrid electric vehicle comprising an AWD or 4WD vehicle.

Referring to FIGS. 12 and 13, in one embodiment of an electric vehicle 10 that comprises the selectively movable electric propulsion motor 32 and the internal combustion engine 35 configured to be disposed within the vehicle chassis 12, the electric vehicle 10 further comprises a second rotatable vehicle drive axle 16. The internal combustion engine 35 is disposed proximate to and is configured to provide motive power to the second rotatable vehicle drive axle 16 and may be operatively coupled to the second rotatable vehicle drive axle 16 through the transmission 150, rotatable drive shaft 152, and engine differential 154 as described herein. The selectively movable electric propulsion motor 32 may be operatively coupled to the front axle 28 (FIG. 13) or the rear axle 30 (FIG. 12) and the second rotatable vehicle drive axle 16 may be operatively coupled to the rear axle 28 or the front axle 30, respectively.

Figure 14:
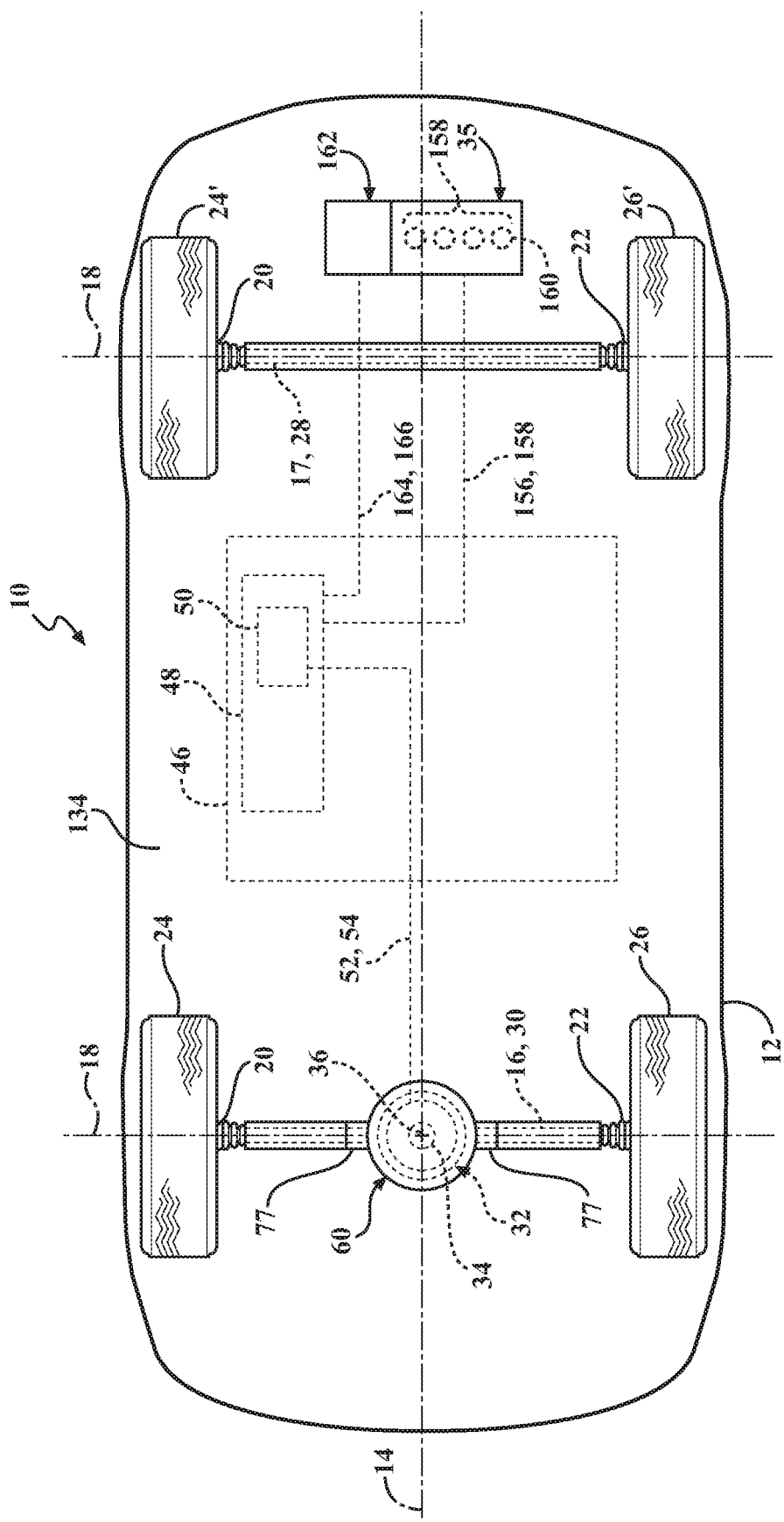
FIG. 14 is a schematic bottom view of an embodiment a hybrid electric vehicle comprising a selectively movable vertical electric propulsion motor operatively coupled to a rear rotatable vehicle drive axle and an internal combustion engine proximate the front axle operatively coupled to a generator, the vehicle comprising an RWD vehicle.
Figure 15:
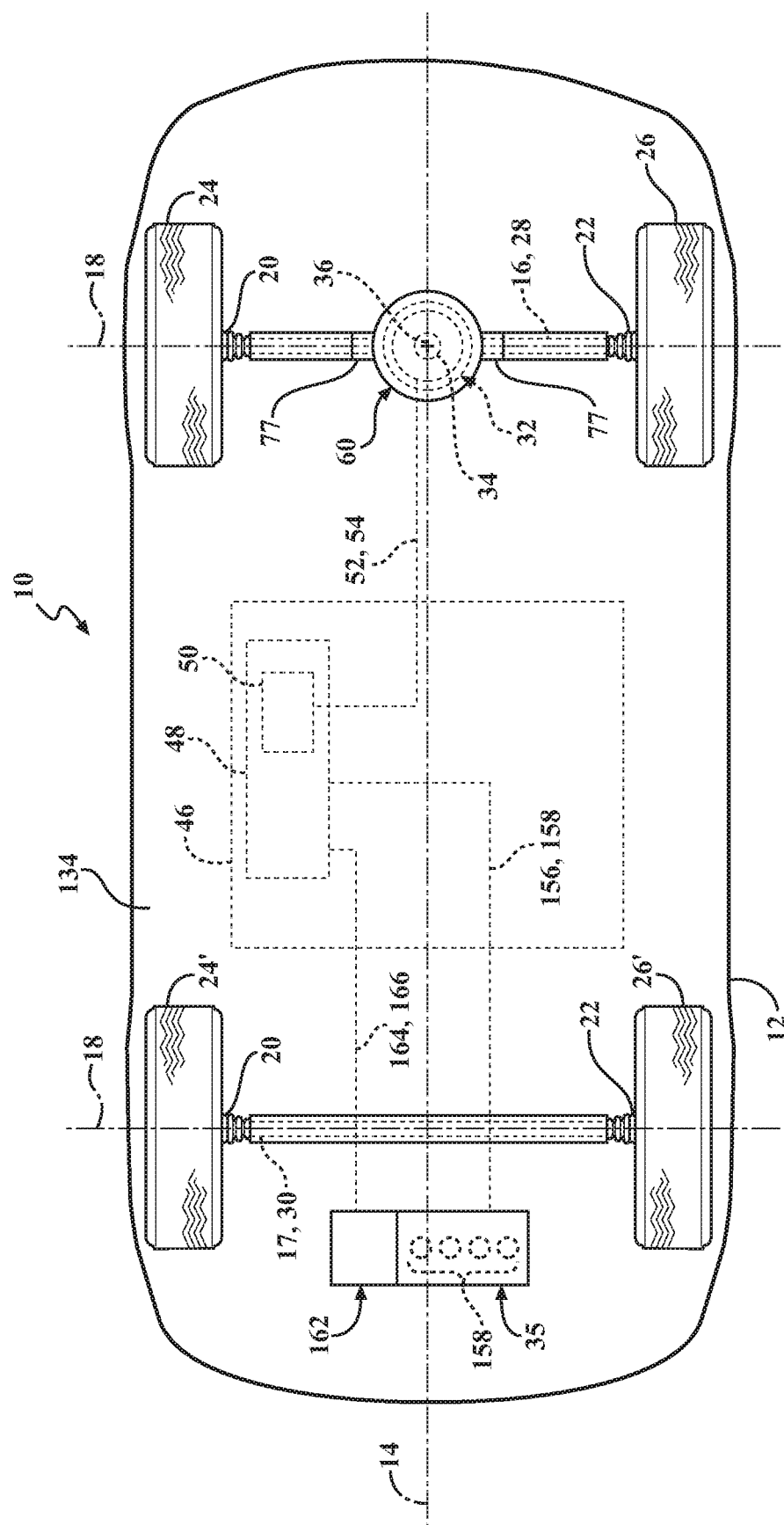
FIG. 15 is a schematic bottom view of an embodiment a hybrid electric vehicle comprising a selectively movable vertical electric propulsion motor operatively coupled to a front rotatable vehicle drive axle and an internal combustion engine proximate the rear axle operatively coupled to a generator, the vehicle comprising an FWD vehicle.

Referring to FIGS. 14 and 15, in one embodiment of an electric vehicle 10 that comprises the selectively movable electric propulsion motor 32 and the internal combustion engine 35 configured to be disposed within the vehicle chassis 12, the electric vehicle 10 further comprises a rotatable vehicle driven axle 17 (i.e., an axle that is not provided with a source of motive power or unpowered), and the internal combustion engine 35 is disposed proximate to and is configured to provide motive power to an electric generator 162 as illustrated in FIGS. 14 and 15. The rotatable vehicle drive axle 16 may comprise the front axle 28 (FIG. 15) or the rear axle 30 (FIG. 14) and the electric generator 162 is disposed proximate the rotatable vehicle driven axle 17 serving as a rear axle 30 or a front axle 28, respectively. The power generated by the internal combustion engine 35 and electric generator 162 may be supplied to the vehicle battery 46 by any suitable electrical power and/or signal communication device 164, such as a generator power bus 166, that comprises an electrical conductor configured to electrically communicate electrical power from the electric generator 162 to the vehicle battery 46. The electrical power and/or signal communication device 164, such as a generator power bus 166, may provide the electric power to the battery 46 through any suitable controller, such as vehicle controller 48, or alternately through the motor controller 50.

In one embodiment of an electric vehicle 10 that comprises the selectively movable electric propulsion motor 32 and the internal combustion engine 35 that are configured to be disposed within the vehicle chassis 12, the internal combustion engine 35 is disposed proximate to the rotatable drive axle 16 as shown in FIGS. 11 and 12, but rather than being operatively coupled to the rotatable vehicle drive axle 16 as shown in FIGS. 11 and 12, the internal combustion engine 35 is operatively coupled to, and configured to provide motive power to, an electric generator 162 in the manner illustrated schematically in FIGS. 14 and 15. The rotatable vehicle drive axle 16 may comprise the front axle 28 (FIG. 12) or the rear axle 30 (FIG. 11). The power generated by the internal combustion engine 35 and electric generator 162 may be supplied to the vehicle battery 46 by any suitable electrical power and/or signal communication device 164, such as a generator power bus 166, that comprises an electrical conductor configured to electrically communicate electrical power from the electric generator 162 to the vehicle battery 46. The electrical power and/or signal communication device 164, such as a generator power bus 166, may provide the electric power to the battery 46 through any suitable controller, such as vehicle controller 48, or alternately through the motor controller 50.

Figure 16:
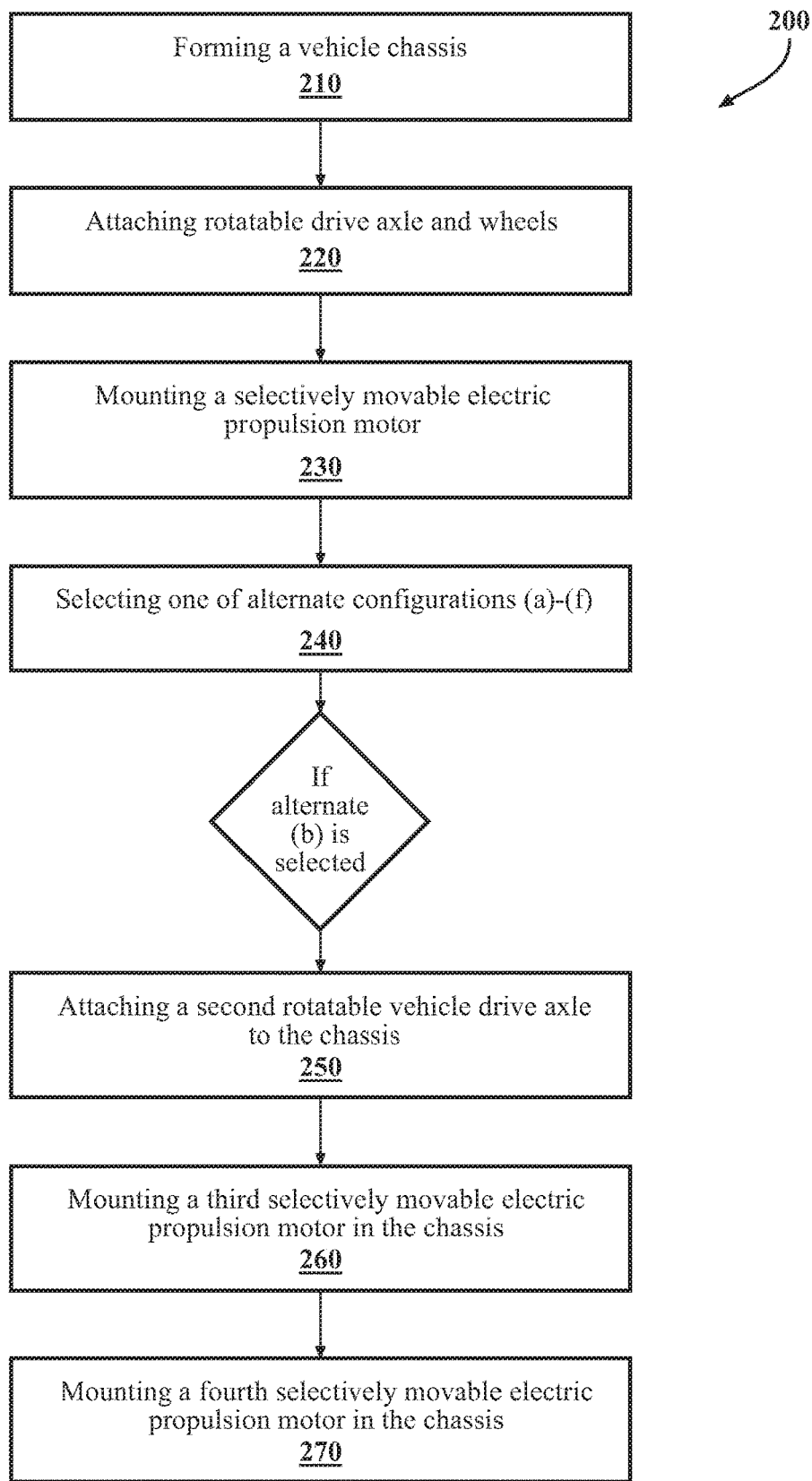
FIG. 16 is a flowchart of an embodiment of a method of making an electric vehicle as described herein.

Referring to FIG. 16, a method of making 200 an electric vehicle 10 is also disclosed. The method of making 200 comprises forming 210 a vehicle chassis 12 extending along a longitudinal axis 14. Forming 210 of the vehicle chassis 12 may be performed using conventional chassis components and assembly methods, including unibody and chassis-on-frame components and assembly methods. The method of making 200 also includes attaching 220 a rotatable vehicle drive axle 16 to the vehicle chassis 12 that is disposed along a transverse axis 18 and having opposed axle ends 20, 22 that are configured for attachment to a pair of opposed drive wheels 24, 26 as described herein. Attaching 220 the rotatable vehicle drive axle 16 to the vehicle chassis 12 may be performed using conventional attachments, including selectively attachable and detachable bolted connections.

The method of making 200 also comprises mounting 230 a selectively movable electric propulsion motor 32 within the vehicle chassis 12. The selectively movable electric propulsion motor 32 comprising a rotatable motor shaft 34 rotatable about a motor axis 36, the selectively movable electric propulsion motor 32 operatively coupled to the rotatable vehicle drive axle 16 and opposed drive wheels 24, 26, the motor axis 36 configured to be oriented in a substantially vertical direction and movable with reference to the rotatable vehicle drive axle 16 from a first position comprising a first direction ($d_1$) of the motor axis 36 to a second position comprising a second direction ($d_2$) of the motor axis 36, the second position being separated from the first position by an angle ($\alpha$), wherein the first direction ($d_1$) and the second direction ($d_2$) are disposed in a lateral plane or a longitudinal plane, and wherein the rotatable vehicle drive axle 16 comprises a front axle 28 or a rear axle 30; and selecting 240 one of the following alternate configurations:

Alternate configuration (a) wherein the first direction ($d_1$) and the second direction ($d_2$) are disposed in the lateral plane, mounting a second selectively movable electric propulsion motor 32 within the vehicle chassis 12 laterally spaced apart from the selectively movable electric propulsion motor 32, the second selectively movable electric propulsion motor 32 comprising a second rotatable motor shaft 34 rotatable about the second motor axis 36, the second selectively movable electric propulsion motor operatively coupled to the rotatable vehicle drive axle 16 and opposed drive wheels 24, 26, the second motor axis 36 configured to be oriented in a substantially vertical direction and movable with reference to the rotatable vehicle drive axle 16 from a first position comprising a first direction ($d_1$) of the second motor axis 36 to a second position comprising a second direction ($d_2$) of the second motor axis 36, the second position being separated from the first position by an angle ($\alpha$), wherein the first direction ($d_1$) of the second motor axis 36 and the second direction ($d_2$) of the second motor axis 36 are disposed in a lateral plane.

Alternate configuration (b) wherein the first direction ($d_1$) and the second direction ($d_2$) are disposed in the longitudinal plane, comprising mounting a second selectively movable electric propulsion motor 32 within the vehicle chassis 12 laterally spaced apart from the selectively movable electric propulsion motor 32, the second selectively movable electric propulsion motor 32 comprising a second rotatable motor shaft 34 rotatable about the second motor axis 36, the second selectively movable electric propulsion motor 32 operatively coupled to the rotatable vehicle drive axle 16 and opposed drive wheels 24, 26, the second motor axis 36 configured to be oriented in a substantially vertical direction and movable with reference to the rotatable vehicle drive axle 16 from a first position comprising a first direction ($d_1$) of the second motor axis 36 to a second position comprising a second direction ($d_2$) of the second motor axis 36, the second position being separated from the first position by an angle ($\alpha$), wherein the first direction ($d_1$) of the second motor axis 36 and the second direction ($d_2$) of the second motor axis 36 are disposed in a second longitudinal plane.

Alternate configuration (c) that comprises disposing an internal combustion engine 35 proximate to the rotatable vehicle drive axle 16, the internal combustion engine 35 configured to provide motive power to the rotatable vehicle drive axle 16, wherein the rotatable vehicle drive axle 16 comprises a front axle 28 or a rear axle 30.

Alternate configuration (d) that comprises disposing an internal combustion engine 35 proximate to the rotatable vehicle drive axle 16, the internal combustion engine 35 configured to provide motive power to an electric generator 162, wherein the rotatable vehicle drive axle 16 comprises a front axle 28 or a rear axle 30.

Alternate configuration (e) that comprises disposing an internal combustion engine 35 proximate to a second rotatable vehicle drive axle 16 that is attached to the vehicle chassis 12 and longitudinally spaced apart from the rotatable vehicle drive axle 16, the internal combustion engine 35 configured to provide motive power to the second rotatable vehicle drive axle 16, wherein the rotatable vehicle drive axle 16 comprises a front axle 28 or a rear axle 30 and the second rotatable vehicle drive axle 16 comprises a rear axle 30 or a front axle 28, respectively.

Alternate configuration (f) that comprises disposing an internal combustion engine 35 proximate to a rotatable vehicle driven axle 17 that is attached to the vehicle chassis 12 and longitudinally spaced apart from the rotatable vehicle drive axle 16, the internal combustion engine 35 configured to provide motive power to an electric generator 162, wherein the rotatable vehicle drive axle 16 comprises a front axle 28 or a rear axle 30 and the rotatable vehicle driven axle 17 comprises a rear axle 30 or a front axle 28, respectively.

The method of making 200 an electric vehicle 10 comprising alternate (b) may further comprise attaching 250 a second rotatable vehicle drive axle 16 to the vehicle chassis 12 disposed along a second transverse axis 18 longitudinally spaced apart from the first transverse axis 18 and having opposed second axle ends 20, 22 that are configured for attachment to a pair of opposed second drive wheels 24, 26.

The method of making 200 an electric vehicle 10 wherein selecting 240 comprises selecting alternate (b) may further comprise mounting 260 a third selectively movable electric propulsion motor 32 within the vehicle chassis 12, the third selectively movable electric propulsion motor 32 comprising a third rotatable motor shaft 34 rotatable about a third motor axis 36, the third selectively movable electric propulsion motor 32 operatively coupled to the second rotatable vehicle drive axle 16 and opposed second drive wheels 24, 26, the third motor axis 36 configured to be oriented in a substantially vertical direction and movable with reference to the second rotatable vehicle drive axle 16 from a first position comprising a first direction ($d_1$) of the third motor axis 36 to a second position comprising a second direction ($d_2$) of the third motor axis 36, the second position being separated from the first position by an angle ($\alpha$), wherein the first direction ($d_1$) of the third motor axis 36 and the second direction ($d_2$) of the third motor axis 36 are disposed in a third longitudinal plane.

The method of making 200 an electric vehicle 10 wherein selecting 240 comprises selecting alternate (b) and mounting 260 may further comprise mounting 270 a fourth selectively movable electric propulsion motor 32 within the vehicle chassis 12 laterally spaced apart from the third movable electric propulsion motor 32, the fourth selectively movable electric propulsion motor 32 comprising a fourth rotatable motor shaft 34 rotatable about a fourth motor axis 36, the fourth selectively movable electric propulsion motor 32 operatively coupled to the second rotatable vehicle drive axle 16 and opposed second drive wheels 24, 26, the fourth motor axis 36 configured to be oriented in a substantially vertical direction and movable with reference to the second rotatable vehicle drive axle 16 from a first position comprising a first direction ($d_1$) of the fourth motor axis 36 to a second position comprising a second direction ($d_2$) of the fourth motor axis 36, the second position being separated from the first position by an angle ($\alpha$), wherein the first direction ($d_1$) of the fourth motor axis 36 and the second direction ($d_2$) of the fourth motor axis 36 are disposed in a fourth longitudinal plane.

Figure 17:
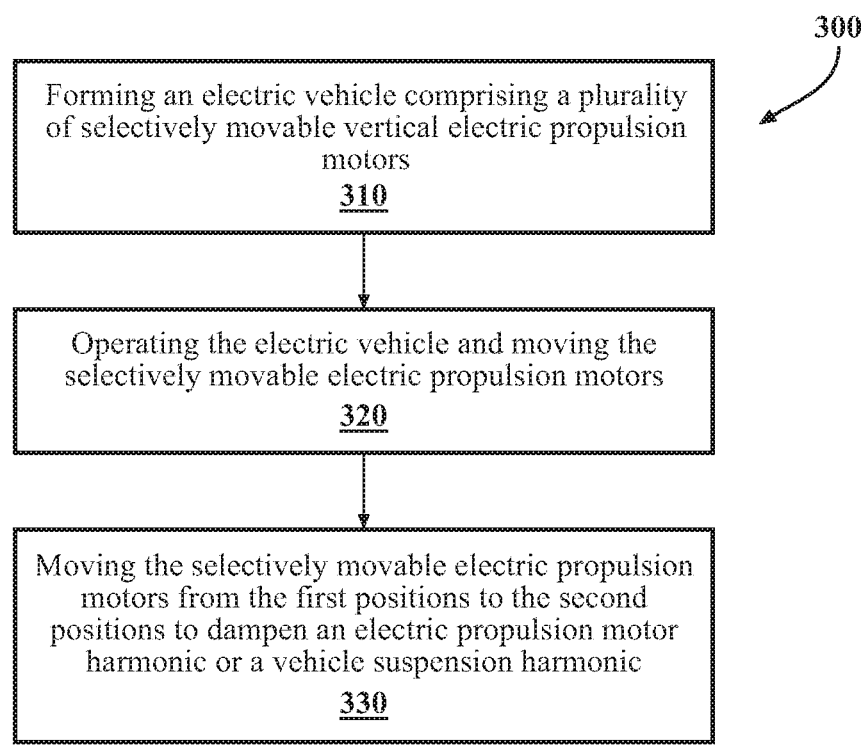
FIG. 17 is a flowchart of an embodiment of a method of using an electric vehicle as described herein.

Referring to FIG. 17, a method of using 300 an electric vehicle 10 is also disclosed. The method of using 300 comprises forming 310 an electric vehicle 10 comprising a vehicle chassis 12 extending along a longitudinal axis 14 and a rotatable vehicle drive axle 16 disposed along a transverse axis 18 and having opposed axle ends 20, 22 that are configured for attachment of a pair of opposed drive wheels 24, 26, and a plurality of selectively movable electric propulsion motors 32 comprising respective rotatable motor shafts 34 rotatable about respective motor axes 36, the selectively movable electric propulsion motors 32 configured to be mounted within the vehicle chassis 12 laterally spaced apart and operatively coupled to the rotatable vehicle drive axle 16 and opposed drive wheels 24, 26, the respective motor axes 36 configured to be oriented in respective substantially vertical directions, the selectively movable electric propulsion motors 32 and the respective motor axes 36 also configured to be selectively movable while the vehicle is stationary or in motion from respective first positions comprising a respective first directions ($d_1$) of the motor axes 36 to respective second positions comprising respective second directions ($d_2$) of the motor axes 36, the respective second positions being separated from the respective first positions by respective angles ($\alpha$).

The method of using 300 also comprises operating 320 the electric vehicle 10 and moving the selectively movable electric propulsion motors 32 from the respective first positions to the respective second positions while the electric vehicle 10 is operating.

The method of using 300, wherein the electric vehicle 10 further comprises a vehicle suspension 98 (see FIG. 1), and wherein moving the selectively movable electric propulsion motors 32 and the respective motor axes 36 from the respective first positions to the respective second positions dampens an electric propulsion motor harmonic or a vehicle suspension harmonic as described herein.

Referring to FIGS. 1, 21-2C, 3, 4A, 4B, 5, 6, 7A, 7B, and 8-23, and particularly to FIGS. 18-23, a rotatable drive axle assembly 15 for an electric vehicle 10 is disclosed in a number of embodiments. The embodiments of the rotatable drive axle assembly 15 include at least one rotatable vehicle drive axle 16, selectively movable differential 60, and selectively movable electric propulsion motor 32. These components of the assembly and the other components discussed below are all as and the other components as described herein. In FIGS. 18-22, the elements illustrated with the dashed lines indicate portions of the rotatable drive axle assembly 15 that are movable longitudinally by rotation about the transverse axis as described herein and also illustrated by the curved arrows in these figures. Elements illustrated with the solid lines indicate portions of the rotatable drive axle assembly 15 that are not movable longitudinally (when the vehicle is not in motion) by rotation about the transverse axis as described herein.

Referring to FIG. 18, in one embodiment, the rotatable drive axle assembly 15 comprises a rotatable vehicle drive axle 16 configured to be disposed along the transverse axis 18 of an electric vehicle 10 and having an axle end 20, 22

(i.e., one of opposed axle ends 20, 22), that is configured for attachment of a drive wheel (i.e. one of drive wheels 24, 26), respectively, as described herein. The rotatable drive axle assembly 15 also comprises a selectively movable differential 60 configured to be disposed on the rotatable vehicle drive axle 16 and configured to operatively couple motive power of a selectively movable electric propulsion motor 32 comprising a rotatable motor shaft 34 rotatable about a motor axis 36 to the rotatable vehicle drive axle 16 and the drive wheel 24, 26, as described herein. The selectively movable electric propulsion motor 32 and the motor axis 36 are configured to be oriented in a substantially vertical direction and movable with reference to the rotatable vehicle drive axle 16, as described herein. This embodiment of the rotatable drive axle assembly 15 may be used, for example, in one corner of the vehicle, that is one of the sides of the front axle 28 or rear axle 30. While it is possible to provide propulsion of the electric vehicle 10 from one corner only while providing driven axles 17 in the other corners, this embodiment of the rotatable drive axle assembly 15 is also extendable to the other corners of the electric vehicle 10.

Thus, referring to FIGS. 18 and 19, in another embodiment of the rotatable drive axle assembly 15, the rotatable drive axle assembly 15 of FIG. 18 may further comprise a second rotatable vehicle drive axle 16 configured to be laterally spaced apart from the rotatable vehicle drive axle 16 and configured to be disposed along the transverse axis 18 and having an opposed second axle end 20, 22 (i.e., the other of opposed axle ends 20, 22) that is configured for attachment of an opposed second drive wheel (i.e., the other of opposed drive wheels 24, 26), as described herein. The rotatable vehicle drive axle 16 and the second rotatable vehicle drive axle 16 comprise discontinuous independent axles in that they do not extend laterally continuously across the width of the electric vehicle 10 between the opposed drive wheels 24, 26 along the transverse axis 18. The rotatable vehicle drive axle 16 and the second rotatable vehicle drive axle 16 are configured to provide motive power independently to the opposed drive wheels 24, 26 as a front axle 28 or rear axle 30. This embodiment may also further comprise a second selectively movable differential 60 configured to be disposed inwardly of the second drive wheel 24, 26 on the second rotatable vehicle drive axle 16 and configured to operatively couple motive power of a second selectively movable electric propulsion motor 32 that is transmitted to a second rotatable motor shaft 34 to the second rotatable vehicle drive axle 16 and the second drive wheel 24, 26, as described herein. The rotatable vehicle drive axle 16 and second rotatable drive axle 16 may comprise the front axle 28, the rear axle 30, or both the front axle 28 and the rear axle 30 of the electric vehicle 10 to provide the vehicle with FWD, RWD, or AWD or 4WD, respectively. In this embodiment of the rotatable drive axle assembly 15, the selectively movable electric propulsion motor 32 and the second selectively movable electric propulsion motor 32 may be configured to be moved independently and configured to couple motive power independently to the drive wheel 24, 26 and the second drive wheel 24, 26, respectively. Thus, the selectively movable electric propulsion motor 32 and motor axis 36 are configured to be independently movable from a first position comprising a first direction ($d_1$) of the motor axis 36 to a second position comprising a second direction ($d_2$) of the motor axis 36, the second position being separated from the first position of the motor axis 36 by an angle ($\alpha$), and the second selectively movable electric propulsion motor 32 and second motor axis 36 are configured to be independently movable from a first position comprising a first direction ($d_1$) of the second motor axis 36 to a second position comprising a second direction ($d_2$) of the second motor axis 36, the second position being separated from the first position of the second motor axis 36 by an angle ($\alpha$). This embodiment of the rotatable drive axle assembly 15 may be used in any suitable electric vehicle 10, including, for example, the embodiments of the electric vehicle 10 of FIGS. 7-9 that include the rotatable vehicle drive axle 16 and the second rotatable vehicle drive axle 16 and that do not include the optional clutch 140.

Figure 20:
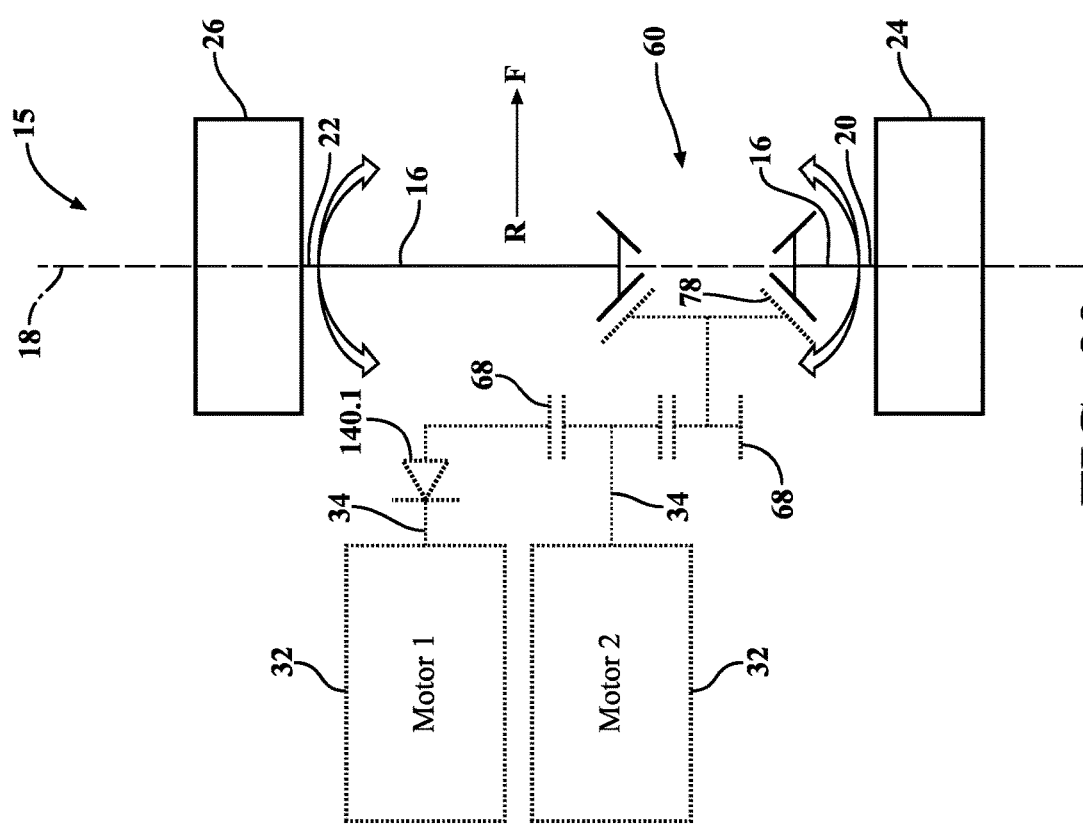
FIG. 20 is a schematic diagram of a third embodiment of a rotatable drive axle assembly for an electric vehicle, as described herein.

Referring to FIGS. 18 and 20, in one embodiment of the rotatable drive axle assembly 15, the rotatable drive axle assembly 15 of FIG. 18 may further comprise a second selectively movable electric propulsion motor 32 comprising a second rotatable motor shaft 34 rotatable about a second motor axis 36 and a selectable one-way clutch 140.1 operatively coupled to the second motor shaft 34. The rotatable vehicle drive axle 16 is a continuous axle in that it extends laterally continuously across the width of the electric vehicle 10 between the opposed drive wheels 24, 26 and comprises a plurality of separate rotatable shaft portions that extend outwardly from the selectively movable differential 60 in opposite directions along the transverse axis 18 toward the opposed drive wheels 24, 26 and is configured to provide motive power to the opposed drive wheels 24, 26. The second selectively movable electric propulsion motor 32 and the second motor axis 36 are configured to be oriented in a substantially vertical direction and movable with reference to the rotatable vehicle drive axle 16 together and in conjunction with the selectively movable electric propulsion motor 32 and the motor axis 36. In this embodiment, the axle end 20, 22 (one of opposed axle ends 20, 22) of the rotatable vehicle drive axle 16 of FIG. 18 comprises a pair of opposed axle ends (20, 22) and the drive wheel 24, 26 (one of opposed drive wheels 24, 26 comprises a pair of opposed drive wheels, and the selectively movable differential 60 disposed on the rotatable vehicle drive axle 32 is configured to operatively couple motive power of the selectively movable electric propulsion motor 32 and motive power of the second selectively movable electric propulsion motor 32 to the rotatable vehicle drive axle 16 and the opposed drive wheels 24, 26, and the selectable one-way clutch 140.1 is configured to be selectively engaged and disengaged to couple and decouple the second selectively movable electric propulsion motor 32 and selectively movable differential 60. This embodiment of the rotatable drive axle assembly 15 may be used in any suitable electric vehicle 10, including, for example, the embodiments of the electric vehicle 10 of FIGS. 1, 4A, 4B, and 12-15 as described herein to provide the additional motive power of the second selectively movable electric propulsion motor 32. The use of the selectable one-way clutch 140.1 allows the motive power of the electric vehicle 10 to be increased by coupling the second selectively movable electric propulsion motor 32 to the drive wheels 24, 26 when the selectable one-way clutch 140.0 is engaged and the second selectively movable electric propulsion motor 32 is energized and operated, and allows the electrical efficiency of the electric vehicle 10 to be improved when the selectable one-way clutch 140.1 is disengaged and the second selectively movable electric propulsion motor 32 is deenergized by decoupling the second selectively movable electric propulsion motor 32 and the second motor shaft 34 from the selectively movable differential 60, since coupled rotation of the second selectively movable electric propulsion motor 32 when it is not energized comprises a parasitic loss of motive power of the electric vehicle 10. In one embodiment, the motor shaft 34 and second motor shaft 34 may be coupled to the selectively movable differential 60 through a gear train that includes one or more idler gears or reduction gears in a conventional manner. In the embodiment of FIGS. 18 and 20, the selectively movable electric propulsion motor 32 and motor axis 36 and the second selectively movable electric propulsion motor 32 and second motor axis 36 are configured to be movable together in conjunction with one another from a first position comprising a first direction ($d_1$) of the motor axis 36 and the second motor axis 36 to a second position comprising a second direction ($d_2$) of the motor axis 36 and the second motor axis 36, the second position being separated from the first position of the motor axis 36 and second motor axis 36 by an angle ($\alpha$) as described herein. The selectable one-way clutch 140.1 may be an electrically actuated and controlled one-way clutch as described herein. When engaged, the selectable one-way clutch 140.1 enables transfer of torque from the selectively movable electric propulsion motor 32 through the motor shaft 34 to the selectively movable differential 60, but does not permit torque transfer in the opposite direction.

Figure 21:
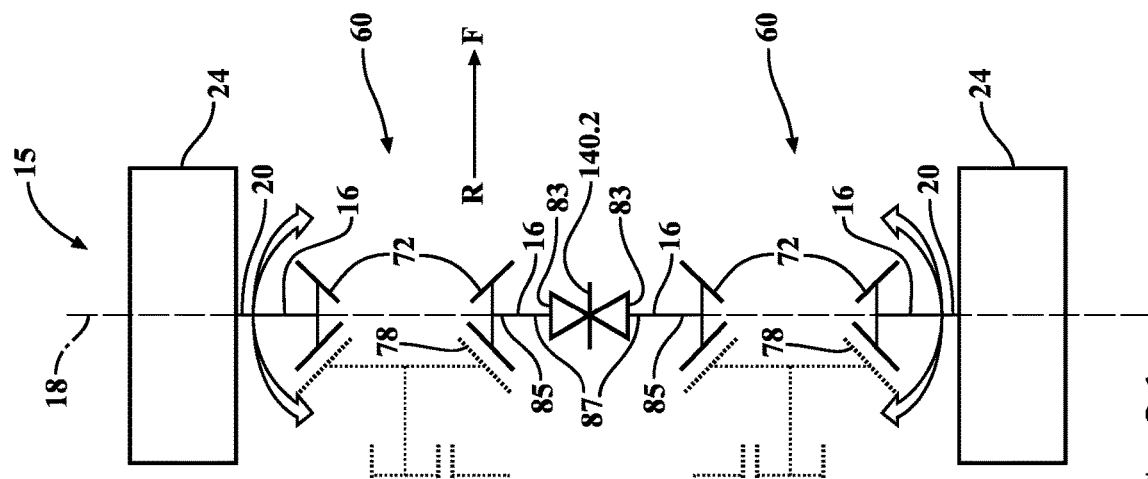
FIG. 21 is a schematic diagram of a fourth embodiment of a rotatable drive axle assembly for an electric vehicle, as described herein.

Referring to FIG. 21, one embodiment of the rotatable drive axle assembly 15 for an electric vehicle 10 comprises a rotatable vehicle drive axle 16 configured to be laterally spaced apart from the rotatable vehicle drive axle 16 and configured to be disposed along a transverse axis 18 of an electric vehicle 10 having an axle end 20, 22 (one of opposed axle ends 20, 22) that is configured for attachment of a drive wheel (one of opposed drive wheels 24, 26). This embodiment also comprises a selectively movable differential 60 configured to be disposed on the rotatable vehicle drive axle 16 and configured to operatively couple motive power of a selectively movable electric propulsion motor 32 comprising a rotatable motor shaft 34 rotatable about a motor axis 36 to the rotatable vehicle drive axle 16 and the drive wheel 24, 26, and the selectively movable electric propulsion motor 32 and the motor axis 36 are configured to be oriented in a substantially vertical direction and movable with reference to the rotatable vehicle drive axle 16 as described herein. This embodiment also comprises a second rotatable vehicle drive axle 16 configured to be disposed along the transverse axis 18 and having a opposed second axle end 20, 22 (the other of opposed axle ends 20, 22) that is configured for attachment of a second drive wheel 24, 26 (the other of opposed drive wheels 24, 26), the second drive wheel 24, 26 disposed opposite the drive wheel 24, 26 along the transverse axis 18. This embodiment also comprises a second selectively movable differential 60 configured to be disposed on the second rotatable vehicle drive axle 16 and configured to operatively couple motive power of a second selectively movable electric propulsion motor 32 comprising a second rotatable motor shaft 34 rotatable about a second motor axis 36 to the second rotatable vehicle drive axle 16 and the second drive wheel 24, 26, the second selectively movable electric propulsion motor 32 and the second motor axis 36 configured to be oriented in a substantially vertical direction and movable with reference to the second rotatable vehicle drive axle 16. This embodiment also comprises a selectable two-way clutch 140.2 configured to be disposed between the selectively movable differential 60 and the second selectively movable differential 60 comprising a coupling 83 and an opposed second coupling 83 that couple the selectable two-way clutch to the rotatable transfer axle 16 or second rotatable transfer axle 16. Any suitable coupling may be used for coupling 83 and an opposed second coupling 83 including conventional coupling. This embodiment also comprises a rotatable transfer axle 16 configured to be disposed along the transverse axis 18 comprising an outer end 85 that is operatively coupled to the selectively movable differential and an inner end 87 that is operatively coupled to the coupling 83 of the selectable two-way clutch 140.2. This embodiment also comprises a second rotatable transfer axle 16 configured to be disposed along the transverse axis 18 comprising a second outer end 85 that is operatively coupled to the second selectively movable differential 60 and a second inner end 87 that is operatively coupled to the second coupling 83 of the selectable two-way clutch 140.2, wherein the selectable two-way clutch 140.2 is configured to be selectively engaged and disengaged to couple and decouple the rotatable transfer axle 16 and the second rotatable transfer axle 16. In this embodiment, when the selectable two-way clutch 140.2 is disengaged, the selectively movable electric propulsion motor 32 and second selectively movable electric propulsion motor 32 are configured to provide motive power independently to the drive wheel 24, 26 and the second drive wheel 24, 26, respectively, and when the selectable two-way clutch 140.2 is engaged, either or both of the selectively movable electric propulsion motor 32 and the second selectively movable electric propulsion motor 32 are configured when energized and operated to provide motive power to the drive wheel 24, 26 and the second drive wheel 24, 26. This embodiment of the rotatable drive axle assembly 15 may be used in any suitable electric vehicle 10, including, for example, the embodiments of the electric vehicle 10 of FIGS. 7A, 7B, 8, and 9, that include the rotatable vehicle drive axle 16 and the second rotatable vehicle drive axle 16 and that do include the optional clutch 140, which in this embodiment comprises selectable two-way clutch 140.2. When engaged, the selectable two-way clutch 140.2 enables transfer of torque from either or both of the rotatable transfer axle 16' and the second rotatable transfer axle 16' to the opposed drive wheels 24, 26.

This embodiment may further comprise a selectable one-way clutch 140.1 operatively coupled to the motor shaft 34. The selectable one-way clutch 140.1 is configured to be selectively engaged and disengaged to selectively couple and decouple the selectively movable electric propulsion motor 32 and selectively movable differential 60. When a selectable one-way clutch 140.1 is operatively coupled to the motor shaft 34, this embodiment may further comprise a second selectable one-way clutch 140.1 operatively coupled to the second motor shaft 34. The second selectable one-way clutch 140.1 is configured to be selectively engaged and disengaged to selectively couple and decouple the second selectively movable electric propulsion motor 32 and the second selectively movable differential 60. The use of the selectable one-way clutch 140.1 and/or the second selectable one-way clutch 140.1 allows the motive power of the electric vehicle 10 to be increased by coupling the selectively movable electric propulsion motor 32 and/or the second selectively movable electric propulsion motor 32 to the drive wheels 24, 26 when the respective selectable one-way clutch 140.1 and/or second selectable one-way clutch 140.1 is/are engaged and the respective selectively movable electric propulsion motor 32 and/or second selectively movable electric propulsion motor 32 is energized and operated, and allows the electrical efficiency of the electric vehicle 10 to be improved when the selectable one-way clutch 140.1 and/or second selectable one-way clutch 140.1 is/are disengaged and the respective selectively movable electric propulsion motor 32 and/or second selectively movable electric propulsion motor 32 is deenergized by decoupling the respective selectively movable electric propulsion motor 32 and/or second selectively movable electric propulsion motor 32 and the respective motor shaft 34 and/or second motor shaft 34 from the selectively movable differential 60, since coupled rotation of the selectively movable electric propulsion motor 32 and/or second selectively movable electric propulsion motor 32 when it/they is/are not energized comprise a parasitic loss of motive power of the electric vehicle 10.

In one embodiment, the selectively movable electric propulsion motor 32 and motor axis 36 and second selectively movable electric propulsion motor 32 and second motor axis 36 of FIG. 21 are configured to be movable in conjunction with one another from a first position comprising a first direction ($d_1$) of the motor axis 36 and the second motor axis 36 to a second position comprising a second direction ($d_2$) of the motor axis 36 and the second motor axis 36, the second position being separated from the first position of the motor axis 36 and second motor axis 36 by an angle ($\alpha$) as described herein.

In another embodiment, the selectively movable electric propulsion motor 32 and the second selectively movable electric propulsion motor 32 of FIG. 21 are configured to be moved independently from one another. In this embodiment, the selectively movable electric propulsion motor 32 and motor axis 36 are configured to be movable from a first position comprising a first direction ($d_1$) of the motor axis 36 to a second position comprising a second direction ($d_2$) of the motor axis 36, the second position being separated from the first position of the motor axis 36 by an angle ($\alpha$), and the second selectively movable electric propulsion motor 32 and second motor axis 36 are configured to be independently movable from a first position comprising a first direction ($d_1$) of the second motor axis 36 to a second position comprising a second direction ($d_2$) of the second motor axis 36, the second position being separated from the first position of the second motor axis 36 by an angle ($\alpha$). In this embodiment, the first position comprising the first direction ($d_1$) of the motor axis 36 and the first position comprising the first direction ($d_1$) of the second motor axis 36 are the same or different, and the second position comprising the second direction ($d_2$) of the motor axis 36 and the second position comprising the second direction ($d_2$) of the second motor axis 36 are the same or different, and wherein the angle ($\alpha$) of the first motor axis 36 and the angle ($\alpha$) of the second motor axis 36 are the same or different as has been described herein.

Figure 22:
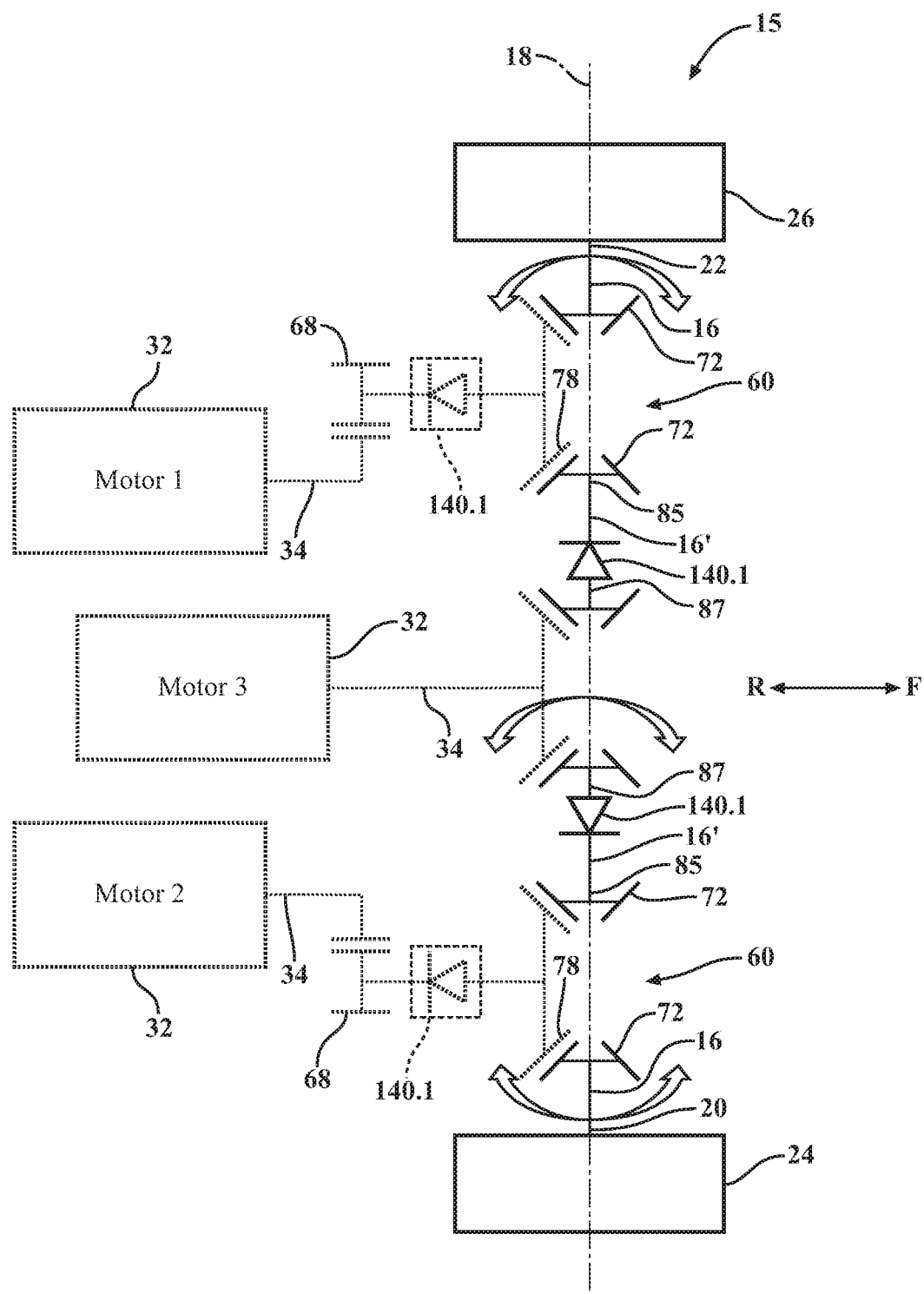
FIG. 22 is a schematic diagram of a fifth embodiment of a rotatable drive axle assembly for an electric vehicle, as described herein.

Referring to FIG. 22, one embodiment of the rotatable drive axle assembly 15 for an electric vehicle 10 comprises a rotatable vehicle drive axle 16 configured to be disposed along a transverse axis 18 of an electric vehicle 10 and having an axle end 20, 22 (one of opposed axle ends 20, 22) that is configured for attachment of a drive wheel 24, 26 (one of opposed drive wheels 24, 26). This embodiment also comprises a selectively movable differential 60 configured to be disposed on the rotatable vehicle drive axle 16 and configured to operatively couple motive power of a selectively movable electric propulsion motor 32 comprising a rotatable motor shaft 34 rotatable about a motor axis 36 to the rotatable vehicle drive axle 16 and the drive wheel 24, 26 (one of opposed drive wheels 24, 26), as described herein. The selectively movable electric propulsion motor 32 and the motor axis 36 are configured to be oriented in a substantially vertical direction and movable with reference to the rotatable vehicle drive axle 16, as described herein. This embodiment also comprises a second rotatable vehicle drive axle 16 configured to be laterally spaced apart from the rotatable vehicle drive axle 16 and configured to be disposed along the transverse axis 18 and having a second axle end 20, 22 (the other of opposed axle ends 20, 22) that is configured for attachment to a second drive wheel 24, 26 (the other of opposed drive wheels 24, 26), the second drive wheel 24, 26 disposed opposite the drive wheel 24, 26 along the transverse axis 18. This embodiment also comprises a second selectively movable differential 60 configured to be disposed on the second rotatable vehicle drive axle 16 and configured to operatively couple motive power of a second selectively movable electric propulsion motor 32 comprising a second rotatable motor shaft 34 rotatable about a second motor axis 36 to the second rotatable vehicle drive axle 16 and the second drive wheel 24, 26, as described herein. The second selectively movable electric propulsion motor 32 and the second motor axis 36 are configured to be oriented in a substantially vertical direction and movable with reference to the second rotatable vehicle drive axle 16, as described herein. This embodiment also comprises a rotatable transfer axle 16' configured to be disposed along the transverse axis 18 and operatively coupled to a selectable one-way clutch 140.1 comprising an outer end 85 that is operatively coupled to the selectively movable differential 60 and an inner end. This embodiment also comprises a second rotatable transfer axle 16' configured to be disposed along the transverse axis 18 and operatively coupled to a second selectable one-way clutch 140.1 comprising a second outer end 85 that is operatively coupled to the second selectively movable differential 60 and a second inner end. This embodiment also comprises a third selectively movable differential 60 configured to be disposed on and operatively coupled on one side to the inner end 87 of the rotatable transfer axle 16' and disposed on and operatively coupled on an opposed side to the second inner end 87 of the second rotatable transfer axle 16'. The third selectively movable differential 60 is configured to operatively couple motive power of a third selectively movable electric propulsion motor 32 comprising a third rotatable motor shaft 34 rotatable about a third motor axis 36 to the rotatable transfer axle 16' and the second rotatable transfer axle 16'. The third selectively movable electric propulsion motor 32 and the third motor axis 36 are configured to be oriented in a substantially vertical direction and movable with reference to the rotatable transfer axle 16' and the second rotatable transfer axle 16'. The selectively movable electric propulsion motor 32 and the motor axis 36 also configured to be movable with reference to the rotatable transfer axle 16' and the second selectively movable electric propulsion motor 32 and the second motor axis 36 are also configured to be movable with reference to the second rotatable transfer axle 16'. The selectable one-way clutch 140.1 is configured to be selectively engaged and disengaged to selectively couple and decouple the rotatable transfer axle 16' and the second selectable one-way clutch 140.1 is configured to be selectively engaged and disengaged to selectively couple and decouple the second rotatable transfer axle 16'. The selectable one-way clutch 140.1 and the second selectable one-way clutch 140.1 may be selectively engaged and disengaged to couple and decouple the rotatable transfer axle 16' and the second rotatable transfer axle 16', respectively, either separately or together. When only one of the selectable one-way clutch 140.1 or the second selectable one-way clutch 140.1 is engaged, the motive power of the third selectively movable electric propulsion motor 32 is transferred to the respective one of the rotatable transfer axle 16' and the second rotatable transfer axle 16' providing torque vectoring to the respective one of the opposed drive wheels 24, 26. When both the selectable one-way clutch 140.1 or the second selectable one-way clutch 140.1 are engaged, the motive power of the third selectively movable electric propulsion motor 32 is transferred to both the rotatable transfer axle 16' and the second rotatable transfer axle 16', which provides torque vectoring to both of the opposed drive wheels 24, 26, although the torque vectors to the opposed drive wheels 24, 26 may be different depending on the operating outputs of the selectively movable electric propulsion motor 32 and second selectively movable electric propulsion motor 32, for example. This embodiment may also optionally comprise a third selectable one-way clutch 140.1 operatively coupled to the motor shaft 34, wherein the third selectable one-way clutch 140.1 is configured to be selectively engaged and disengaged to selectively couple and decouple the motor shaft 34 and the selectively movable differential 60, respectively. This embodiment may also optionally comprise a fourth selectable one-way clutch 140.1 operatively coupled to the second motor shaft 34, wherein the fourth selectable one-way clutch 140.1 is configured to be selectively engaged and disengaged to selectively couple and decouple the second motor shaft 34 and the second selectively movable differential 60, respectively. In this embodiment, when the selectable one-way clutch 140.1 and the second selectable one-way clutch 140.1 are disengaged, the selectively movable electric propulsion motor 32 and second selectively movable electric propulsion motor 32 are configured to provide motive power independently to the drive wheel 24, 26 (one of opposed drive wheels 24, 26) and the second drive wheel 24, 26 (the other of opposed drive wheels 24, 26), respectively.

Referring to FIG. 22, in one embodiment of the rotatable drive axle assembly 15, the selectively movable electric propulsion motor 32, the second selectively movable electric propulsion motor 32, and the third selectively movable electric propulsion motor 32 of FIG. 22 are configured to be moved independently from one another. In this embodiment, the selectively movable electric propulsion motor 32 and motor axis 36 are configured to be movable from a first position comprising a first direction ($d_1$) of the motor axis 36 to a second position comprising a second direction ($d_2$) of the motor axis 36, the second position being separated from the first position of the motor axis 36 by an angle ($\alpha$), and the second selectively movable electric propulsion motor 32 and second motor axis 36 are configured to be independently movable from a first position comprising a first direction ($d_1$) of the second motor axis 36 to a second position comprising a second direction ($d_2$) of the second motor axis 36, the second position being separated from the first position of the second motor axis 36 by an angle ($\alpha$), and the third selectively movable electric propulsion motor 32 and third motor axis 36 are configured to be independently movable from a first position comprising a first direction ($d_1$) of the third motor axis 36 to a second position comprising a second direction ($d_2$) of the third motor axis 36, the second position being separated from the first position of the third motor axis 36 by an angle ($\alpha$). In this embodiment, the first position comprising the first direction ($d_1$) of the motor axis 36, the first position comprising the first direction ($d_1$) of the second motor axis 36, and the first position comprising the first direction ($d_1$) of the third motor axis 36 may be the same or different from one another; and the second position comprising the second direction ($d_2$) of the motor axis 36, the second position comprising the second direction ($d_2$) of the second motor axis 36, and the second position comprising the second direction ($d_2$) of the third motor axis 36 may be the same or different; wherein the angle ($\alpha$) of the first motor axis 36, the angle ($\alpha$) of the second motor axis 36, and the angle ($\alpha$) of the third motor axis 36 may be the same or different, as described herein.

Referring to FIGS. 22 and 23, in one embodiment of the rotatable drive axle assembly 15 of FIG. 22 may be operated provide a plurality of driving modes, comprising the modes listed FIG. 23, namely a Hard Right Turn, Hard Left Turn and Hard Acceleration modes. In this embodiment, when the selectable one-way clutch 140.1 (SF1), the third selectable one-way clutch 140.1 (SF3), and the fourth selectable one-way clutch 140.1 (SF4) are engaged and the second selectable one-way clutch 140.1 (SF2) is disengaged, the selectively movable electric propulsion motor 32 (Motor 1 or M1) and the third selectively movable electric propulsion motor 32 (Motor 3 or M3) are configured to provide motive power to the drive wheel 26 (drive wheel 26 selected as the drive wheel 26 of the opposed drive wheels 24, 26 for purpose of this example) and turn the electric vehicle 10 in the direction of the opposed second drive wheel 24 (drive wheel 24 identified as the second drive wheel of the opposed drive wheels 24, 26 for purpose of this example), thereby providing a hard right turn by providing extra torque to the left wheel 24 to push the electric vehicle 10 to the right. Similarly, when the second selectable one-way clutch 140.1 (SF2), the third selectable one-way clutch 140.1 (SF3), and the fourth selectable one-way clutch 140.1 (SF4) are engaged and the one-way clutch 140.1 (SF1) is disengaged, the selectively movable electric propulsion motor 32 (Motor 1 or M1) is configured to provide motive power to the drive wheel 26 and turn the electric vehicle 10 in the direction of the opposed second drive wheel 24, thereby providing a hard right turn by reducing torque to the right wheel 26 to pull the electric vehicle 10 to the right. In this embodiment, when the second selectable one-way clutch 140.1, the third selectable one-way clutch 140.1, and the fourth selectable one-way clutch 140.1 are engaged and the one-way clutch 140.1 is disengaged, the second selectively movable electric propulsion motor 32 (Motor 2 or M2) and the third selectively movable electric propulsion motor 32 (Motor 3 or M3) are configured to provide motive power to the second drive wheel 24 and turn the electric vehicle 10 in the direction of the drive wheel 26, thereby providing a hard left turn by providing extra torque to the right wheel 26 to push the electric vehicle 10 to the left. Similarly, when the selectable one-way clutch 140.1 (SF1), the third selectable one-way clutch 140.1 (SF3), and the fourth selectable one-way clutch 140.1 (SF4) are engaged and the second selectable one-way clutch 140.1 (SF2) is disengaged, the second selectively movable electric propulsion motor 32 (Motor 2 or M2) is configured to provide motive power to the opposed second drive wheel 24 and turn the electric vehicle 10 in the direction of the drive wheel 26, thereby providing a hard left turn by reducing torque to the left wheel 24 to pull the electric vehicle 10 to the left. In this embodiment, when both the selectable one-way clutch 140.1 (SF1), the second selectable one-way clutch 140.1 (SF2), the third selectable one-way clutch 140.1 (SF3), the and fourth selectable one-way clutch 140.1 (SF4) are engaged, the selectively movable electric propulsion motor 32 (Motor 1 or M1), the second selectively movable electric propulsion motor 32 (Motor 2 or M2), and the third selectively movable electric propulsion motor 32 (Motor 3 or M3) are configured to provide motive power to both the drive wheel 26 and the second drive wheel 24 and promote rapid acceleration of the electric vehicle 10.

The terms "a" and "an" herein do not denote a limitation of quantity, but rather denote the presence of at least one of the referenced items. The modifier "about" used in connection with a quantity is inclusive of the stated value and has the meaning dictated by the context (e.g., includes the degree of error associated with measurement of the particular quantity).

Furthermore, unless otherwise limited all ranges disclosed herein are inclusive and combinable (e.g., ranges of "up to about 25 weight percent (wt. %), more particularly about 5 wt. % to about 20 wt. % and even more particularly about 10 wt. % to about 15 wt. %" are inclusive of the endpoints and all intermediate values of the ranges, e.g., "about 5 wt. % to about 25 wt. %, about 5 wt. % to about 15 wt. %", etc.). The use of "about" in conjunction with a listing of items is applied to all of the listed items, and in conjunction with a range to both endpoints of the range. Finally, unless defined otherwise, technical and scientific terms used herein have the same meaning as is commonly understood by one of skill in the art to which this invention belongs. The suffix "(s)" as used herein is intended to include both the singular and the plural of the term that it modifies, thereby including one or more of that term (e.g., the metal(s) includes one or more metals). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments.

It is to be understood that the use of "comprising" in conjunction with the components or elements described herein specifically discloses and includes the embodiments that "consist essentially of" the named components (i.e., contain the named components and no other components that significantly adversely affect the basic and novel features disclosed), and embodiments that "consist of" the named components (i.e., contain only the named components).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A rotatable drive axle for an electric vehicle, comprising:
    a rotatable vehicle drive axle configured to be disposed along a transverse axis of an electric vehicle and having an axle end that is configured for attachment to a drive wheel; and
    a selectively movable differential configured to be disposed on the rotatable vehicle drive axle and configured to operatively couple motive power of a selectively movable electric propulsion motor comprising a rotatable motor shaft rotatable about a motor axis to the rotatable vehicle drive axle and the drive wheel, the selectively movable electric propulsion motor and the motor axis configured to be oriented in a substantially vertical direction and movable with reference to the rotatable vehicle drive axle.

2. The rotatable drive axle for the electric vehicle of claim 1, further comprising:
    a second rotatable vehicle drive axle configured to be laterally spaced apart from the rotatable vehicle drive axle and configured to be disposed along the transverse axis and having an opposed second axle end that is configured for attachment to an opposed second drive wheel; and
    a second selectively movable differential configured to be disposed inwardly of the opposed second drive wheel on the second rotatable vehicle drive axle and configured to operatively couple motive power of a second selectively movable electric propulsion motor that is transmitted to a second rotatable motor shaft to the second rotatable vehicle drive axle and the opposed second drive wheel.

3. The rotatable drive axle for the electric vehicle of claim 2, wherein the selectively movable electric propulsion motor and the second selectively movable electric propulsion motor are configured to be moved independently and are configured to couple motive power independently to the drive wheel and the opposed second drive wheel, respectively.

4. The rotatable drive axle for the electric vehicle of claim 3, wherein the selectively movable electric propulsion motor and the motor axis are configured to be movable from a first position comprising a first direction ($d_1$) of the motor axis to a second position comprising a second direction ($d_2$) of the motor axis, the second position of the motor axis being separated from the first position of the motor axis by an angle ($\alpha$) of the motor axis, and wherein the second selectively movable electric propulsion motor and a second motor axis are configured to be movable from a first position comprising a first direction ($d_1$) of the second motor axis to a second position comprising a second direction ($d_2$) of the second motor axis, the second position of the second motor axis being separated from the first position of the second motor axis by an angle ($\alpha$) of the second motor axis.

5. The rotatable drive axle for the electric vehicle of claim 1, further comprising a second selectively movable electric propulsion motor comprising a second rotatable motor shaft rotatable about a second motor axis and a selectable one-way clutch operatively coupled to the second rotatable motor shaft, the second selectively movable electric propulsion motor and the second motor axis configured to be oriented in a substantially vertical direction and movable with reference to the rotatable vehicle drive axle in conjunction with the selectively movable electric propulsion motor and the motor axis, wherein the axle end of the rotatable vehicle drive axle comprises a pair of opposed axle ends and the drive wheel comprises a pair of opposed drive wheels, and wherein the selectively movable differential disposed on the rotatable vehicle drive axle is configured to operatively couple motive power of the selectively movable electric propulsion motor and motive power of the second selectively movable electric propulsion motor to the rotatable vehicle drive axle and the opposed drive wheels, and wherein the selectable one-way clutch is configured to be selectively engaged and disengaged to selectively couple and decouple the second selectively movable electric propulsion motor and the selectively movable differential.

6. The rotatable drive axle for the electric vehicle of claim 5, wherein the selectively movable electric propulsion motor and the motor axis and the second selectively movable electric propulsion motor and the second motor axis are configured to be movable from a first position comprising a first direction ($d_1$) of the motor axis and the second motor axis to a second position comprising a second direction ($d_2$) of the motor axis and the second motor axis, the second position being separated from the first position of the motor axis and the second motor axis by an angle ($\alpha$).

7. A rotatable drive axle for an electric vehicle, comprising:
- a rotatable vehicle drive axle configured to be disposed along a transverse axis of an electric vehicle and having an axle end that is configured for attachment to a drive wheel;
- a selectively movable differential configured to be disposed on the rotatable vehicle drive axle and configured to operatively couple motive power of a selectively movable electric propulsion motor comprising a rotatable motor shaft rotatable about a motor axis to the rotatable vehicle drive axle and the drive wheel, the selectively movable electric propulsion motor and the motor axis configured to be oriented in a substantially vertical direction and movable with reference to the rotatable vehicle drive axle;
- a second rotatable vehicle drive axle configured to be laterally spaced apart from the rotatable vehicle drive axle and configured to be disposed along the transverse axis and having a second axle end that is configured for attachment to a second drive wheel, the second drive wheel disposed opposite the drive wheel along the transverse axis;
- a second selectively movable differential configured to be disposed on the second rotatable vehicle drive axle and configured to operatively couple motive power of a second selectively movable electric propulsion motor comprising a second rotatable motor shaft rotatable about a second motor axis to the second rotatable vehicle drive axle and the second drive wheel, the second selectively movable electric propulsion motor and the second motor axis configured to be oriented in a substantially vertical direction and movable with reference to the second rotatable vehicle drive axle;
- a selectable two-way clutch configured to be disposed between the selectively movable differential and the second selectively movable differential comprising a coupling and an opposed second coupling;
- a rotatable transfer axle configured to be disposed along the transverse axis comprising an outer end that is operatively coupled to the selectively movable differential and an inner end that is operatively coupled to the coupling of the selectable two-way clutch; and
- a second rotatable transfer axle configured to be disposed along the transverse axis comprising a second outer end that is operatively coupled to the second selectively movable differential and a second inner end that is operatively coupled to the opposed second coupling of the selectable two-way clutch, wherein the selectable two-way clutch is configured to be selectively engaged and disengaged to selectively couple and decouple the rotatable transfer axle and the second rotatable transfer axle.

8. The rotatable drive axle for the electric vehicle of claim 7, wherein when the selectable two-way clutch is disengaged, the selectively movable electric propulsion motor and the second selectively movable electric propulsion motor are configured to provide motive power independently to the drive wheel and the second drive wheel, respectively, and wherein when the selectable two-way clutch is engaged, either or both of the selectively movable electric propulsion motor and the second selectively movable electric propulsion motor are configured to provide motive power to the drive wheel and the second drive wheel.

9. The rotatable drive axle for the electric vehicle of claim 7, further comprising a selectable one-way clutch operatively coupled to the rotatable motor shaft, and wherein the selectable one-way clutch is configured to be selectively engaged and disengaged to selectively couple and decouple the selectively movable electric propulsion motor and the selectively movable differential.

10. The rotatable drive axle for the electric vehicle of claim 9, further comprising a second selectable one-way clutch operatively coupled to the second rotatable motor shaft, and wherein the second selectable one-way clutch is configured to be selectively engaged and disengaged to selectively couple and decouple the second selectively movable electric propulsion motor and the second selectively movable differential.

11. The rotatable drive axle for the electric vehicle of claim 7, wherein the selectively movable electric propulsion motor and the motor axis and the second selectively movable electric propulsion motor and the second motor axis are configured to be movable in conjunction with one another from a first position comprising a first direction ($d_1$) of the motor axis and the second motor axis to a second position comprising a second direction ($d_2$) of the motor axis and the second motor axis, the second position being separated from the first position of the motor axis and the second motor axis by an angle ($\alpha$).

12. The rotatable drive axle for the electric vehicle of claim 7, wherein the selectively movable electric propulsion motor and the second selectively movable electric propulsion motor are configured to be moved independently.

13. The rotatable drive axle for the electric vehicle of claim 12, wherein the selectively movable electric propulsion motor and the motor axis are configured to be movable from a first position comprising a first direction ($d_1$) of the motor axis to a second position comprising a second direction ($d_2$) of the motor axis, the second position of the motor axis being separated from the first position of the motor axis by an angle ($\alpha$) of the motor axis, and wherein the second selectively movable electric propulsion motor and the second motor axis are configured to be movable from a first position comprising a first direction ($d_1$) of the second motor axis to a second position comprising a second direction ($d_2$) of the second motor axis, the second position of the second motor axis being separated from the first position of the second motor axis by an angle ($\alpha$) of the second motor axis.

14. The rotatable drive axle for the electric vehicle of claim 13, wherein the first position comprising the first direction ($d_1$) of the motor axis and the first position comprising the first direction ($d_1$) of the second motor axis are the same or different, and wherein the second position comprising the second direction ($d_2$) of the motor axis and the second position comprising the second direction ($d_2$) of the second motor axis are the same or different, and wherein the angle ($\alpha$) of the motor axis and the angle ($\alpha$) of the second motor axis are the same or different.

15. A rotatable drive axle for an electric vehicle, comprising:
- a rotatable vehicle drive axle configured to be disposed along a transverse axis of an electric vehicle and having a wheel end that is configured for attachment to a drive wheel;
- a selectively movable differential configured to be disposed on the rotatable vehicle drive axle and configured to operatively couple motive power of a selectively movable electric propulsion motor comprising a rotatable motor shaft rotatable about a motor axis to the rotatable vehicle drive axle and the drive wheel, the selectively movable electric propulsion motor and the motor axis configured to be oriented in a substantially vertical direction and movable with reference to the rotatable vehicle drive axle;

a second rotatable vehicle drive axle configured to be laterally spaced apart from the rotatable vehicle drive axle and configured to be disposed along the transverse axis and having a second axle end that is configured for attachment to a second drive wheel, the second drive wheel disposed opposite the drive wheel along the transverse axis;

a second selectively movable differential configured to be disposed on the second rotatable vehicle drive axle and configured to operatively couple motive power of a second selectively movable electric propulsion motor comprising a second rotatable motor shaft rotatable about a second motor axis to the second rotatable vehicle drive axle and the second drive wheel, the second selectively movable electric propulsion motor and the second motor axis configured to be oriented in a substantially vertical direction and movable with reference to the second rotatable vehicle drive axle;

a rotatable transfer axle configured to be disposed along the transverse axis and operatively coupled to a selectable one-way clutch comprising an outer end that is operatively coupled to the selectively movable differential and an inner end;

a second rotatable transfer axle configured to be disposed along the transverse axis and operatively coupled to a second selectable one-way clutch comprising a second outer end that is operatively coupled to the second selectively movable differential and a second inner end; and a third selectively movable differential configured to be disposed on and operatively coupled on one side to the inner end of the rotatable transfer axle and disposed on and operatively coupled on an opposed side to the second inner end of the second rotatable transfer axle, the third selectively movable differential configured to operatively couple motive power of a third selectively movable electric propulsion motor comprising a third rotatable motor shaft rotatable about a third motor axis to the rotatable transfer axle and the second rotatable transfer axle, the third selectively movable electric propulsion motor and the third motor axis configured to be oriented in a substantially vertical direction and movable with reference to the rotatable transfer axle and the second rotatable transfer axle, the selectively movable electric propulsion motor and the motor axis also configured to be movable with reference to the rotatable transfer axle and the second selectively movable electric propulsion motor and the second motor axis also configured to be movable with reference to the second rotatable transfer axle, wherein the selectable one-way clutch is configured to be selectively engaged and disengaged to couple and decouple the rotatable transfer axle and the second selectable one-way clutch is configured to be selectively engaged and disengaged to couple and decouple the second rotatable transfer axle.

16. The rotatable drive axle for the electric vehicle of claim 15, further comprising a third selectable one-way clutch operatively coupled to the third rotatable motor shaft, wherein the third selectable one-way clutch is configured to be selectively engaged and disengaged to selectively couple and decouple the third rotatable motor shaft and the third selectively movable differential.

17. The rotatable drive axle for the electric vehicle of claim 16, further comprising a fourth selectable one-way clutch operatively coupled to the second rotatable motor shaft, wherein the fourth selectable one-way clutch is configured to be selectively engaged and disengaged to selectively couple and decouple the second selectively movable electric propulsion motor and the second selectively movable differential.

18. The rotatable drive axle for the electric vehicle of claim 15, wherein the selectively movable electric propulsion motor, the second selectively movable electric propulsion motor, and the third selectively movable electric propulsion motor are configured to be moved independently.

19. The rotatable drive axle for the electric vehicle of claim 15, wherein when the selectable one-way clutch and the second selectable one-way clutch are disengaged, the selectively movable electric propulsion motor and the second selectively movable electric propulsion motor are configured to provide motive power independently to the drive wheel and the second drive wheel, respectively.

20. The rotatable drive axle for the electric vehicle of claim 17, wherein when the selectable one-way clutch, the third selectable one-way clutch, and the fourth selectable one-way clutch are engaged and the second selectable one-way clutch is disengaged, the selectively movable electric propulsion motor and the third selectively movable electric propulsion motor are configured to provide motive power to the drive wheel and turn the electric vehicle in a direction of the second drive wheel; and wherein when the second selectable one-way clutch, the third selectable one-way clutch, and the fourth selectable one-way clutch are engaged and the one-way clutch is disengaged, the selectively movable electric propulsion motor is configured to provide motive power to the drive wheel and turn the electric vehicle in the direction of the second drive wheel; and wherein when the second selectable one-way clutch, the third selectable one-way clutch, and the fourth selectable one-way clutch are engaged and the one-way clutch is disengaged, the second selectively movable electric propulsion motor and the third selectively movable electric propulsion motor are configured to provide motive power to the second drive wheel and turn the electric vehicle in a direction of the drive wheel; and wherein when the selectable one-way clutch, the third selectable one-way clutch, and the fourth selectable one-way clutch are engaged and the second selectable one-way clutch is disengaged, the second selectively movable electric propulsion motor is configured to provide motive power to the second drive wheel and turn the electric vehicle in the direction of the drive wheel; and wherein when the selectable one-way clutch, the second selectable one-way clutch, the third selectable one-way clutch, and the fourth selectable one-way clutch are engaged, the selectively movable electric propulsion motor, the second selectively movable electric propulsion motor, and the third selectively movable electric propulsion motor are configured to provide motive power to both the drive wheel and the second drive wheel and promote rapid acceleration of the electric vehicle.

* * * * *